(12) United States Patent     (10) Patent No.: US 9,341,529 B2
Nishikage et al.     (45) Date of Patent: May 17, 2016

(54) PRESSURE SENSOR AND METHOD FOR MANUFACTURING PRESSURE SENSOR

(75) Inventors: Haruhiko Nishikage, Kyoto (JP); Toma Fujita, Kyoto (JP)

(73) Assignee: ROHM CO., LTD, Kyoto (JP)

( * ) Notice: Subject to any disclaimer, the term of this patent is extended or adjusted under 35 U.S.C. 154(b) by 200 days.

(21) Appl. No.: 13/503,574

(22) PCT Filed: Nov. 4, 2010

(86) PCT No.: PCT/JP2010/069550
§ 371 (c)(1),
(2), (4) Date: Apr. 23, 2012

(87) PCT Pub. No.: WO2011/055734
PCT Pub. Date: May 12, 2011

(65) Prior Publication Data
US 2012/0205653 A1     Aug. 16, 2012

(30) Foreign Application Priority Data

| Nov. 4, 2009 | (JP) | 2009-252903 |
| Nov. 10, 2009 | (JP) | 2009-256759 |
| Nov. 10, 2009 | (JP) | 2009-256760 |
| Nov. 12, 2009 | (JP) | 2009-258710 |

(51) Int. Cl.
| H01L 29/04 | (2006.01) |
| H01L 29/10 | (2006.01) |
| H01L 31/036 | (2006.01) |
| G01L 9/00 | (2006.01) |

(52) U.S. Cl.
CPC ............. *G01L 9/0047* (2013.01); *G01L 9/0045* (2013.01); *G01L 9/0054* (2013.01)

(58) Field of Classification Search
CPC ............................ H01L 29/84; B81C 1/00158
USPC ................................ 257/414, 419; 438/50, 51
See application file for complete search history.

(56) References Cited

U.S. PATENT DOCUMENTS

| 5,698,785 | A | * | 12/1997 | Rich et al. .................. 73/514.33 |
| 5,883,420 | A | * | 3/1999 | Mirza et al. .................... 257/419 |
| 5,919,548 | A | * | 7/1999 | Barron et al. .................. 428/138 |
| 5,963,788 | A | * | 10/1999 | Barron et al. ................... 438/48 |
| 6,012,336 | A | * | 1/2000 | Eaton .................. B81C 1/00246 73/754 |
| 6,087,701 | A | * | 7/2000 | Bergstrom et al. ........... 257/414 |

(Continued)

FOREIGN PATENT DOCUMENTS

| JP | 63-175482 | 7/1988 |
| JP | 6-302834 | 10/1994 |

(Continued)

*Primary Examiner* — John C Ingham
*Assistant Examiner* — Ismail Muse
(74) *Attorney, Agent, or Firm* — Hamre, Schumann, Mueller & Larson, P.C.

(57) ABSTRACT

A pressure sensor 1 comprises a semiconductor substrate 10, insulating layers 21, 22, 23 formed on the semiconductor substrate 10, a semiconductor layer 30 formed on the semiconductor substrate 10 with the insulating layers 21, 23 intervening therebetween, and a cavity portion 13 provided between the semiconductor substrate 10 and the semiconductor layer 30. The portion of the semiconductor layer 30 which overlaps the cavity portion 13 as viewed in a lamination direction serves as a movable portion 31. The cavity portion 13 is surrounded by the insulating layers 22, 23. With this arrangement, the pressure sensor 1 can be manufactured easily with high precision.

8 Claims, 77 Drawing Sheets

(56) References Cited

U.S. PATENT DOCUMENTS

| | | | |
|---|---|---|---|
| 6,373,115 B1* | 4/2002 | Kolb | G01P 15/0802 257/414 |
| 6,465,784 B1* | 10/2002 | Kimata | 250/332 |
| 6,483,111 B1* | 11/2002 | Ishikawa et al. | 250/338.4 |
| 6,541,298 B2* | 4/2003 | Iida et al. | 438/54 |
| 6,541,834 B1* | 4/2003 | Shie et al. | 257/419 |
| 6,645,820 B1* | 11/2003 | Peng et al. | 438/372 |
| 6,777,682 B2* | 8/2004 | Ishikawa et al. | 250/338.4 |
| 7,067,810 B2* | 6/2006 | Shigenaka et al. | 250/332 |
| 7,923,790 B1* | 4/2011 | Quevy et al. | 257/415 |
| 8,304,848 B2* | 11/2012 | Suzuki et al. | 257/429 |
| 2001/0028035 A1* | 10/2001 | Iida et al. | 250/338.4 |
| 2002/0139933 A1* | 10/2002 | Iida et al. | 250/338.1 |
| 2003/0005774 A1* | 1/2003 | Suzuki et al. | 73/724 |
| 2004/0259286 A1* | 12/2004 | Dehe et al. | 438/50 |
| 2005/0052724 A1* | 3/2005 | Suzuki | G01H 9/00 359/305 |
| 2005/0178967 A1* | 8/2005 | Nakaki et al. | 250/339.04 |
| 2005/0224714 A1* | 10/2005 | Akin et al. | 250/332 |
| 2006/0032039 A1* | 2/2006 | Rangsten et al. | 29/593 |
| 2006/0258039 A1* | 11/2006 | Lutz et al. | 438/50 |
| 2007/0145274 A1* | 6/2007 | Iida | 250/338.4 |
| 2007/0184624 A1* | 8/2007 | Mueller et al. | 438/303 |
| 2007/0202628 A1* | 8/2007 | Wuertz | B81C 1/00246 438/53 |
| 2009/0020419 A1* | 1/2009 | Suzuki et al. | 204/400 |
| 2009/0026561 A1* | 1/2009 | Reichenbach et al. | 257/416 |
| 2009/0146059 A1* | 6/2009 | Nakaki | 250/338.4 |
| 2009/0200680 A1* | 8/2009 | Shinohara et al. | 257/773 |
| 2009/0206422 A1* | 8/2009 | Illing | B81C 1/00158 257/419 |
| 2009/0261445 A1* | 10/2009 | Sugino | 257/463 |
| 2009/0266987 A1* | 10/2009 | Honda et al. | 250/338.4 |
| 2009/0275166 A1* | 11/2009 | Iinuma | 438/72 |
| 2009/0321641 A1* | 12/2009 | Park et al. | 250/338.4 |
| 2010/0025584 A1* | 2/2010 | Sasaki et al. | 250/338.4 |
| 2011/0002359 A1* | 1/2011 | Benzel et al. | 374/178 |
| 2011/0073978 A1* | 3/2011 | Fujiwara et al. | 257/440 |
| 2011/0211613 A1* | 9/2011 | Herrmann et al. | 374/178 |
| 2011/0317387 A1* | 12/2011 | Pan et al. | 361/782 |
| 2012/0228497 A1* | 9/2012 | Suzuki et al. | 250/332 |
| 2012/0241613 A1* | 9/2012 | Ishii et al. | 250/330 |
| 2013/0026604 A1* | 1/2013 | Hsin et al. | 257/603 |

FOREIGN PATENT DOCUMENTS

| | | |
|---|---|---|
| JP | 9-186347 | 7/1997 |
| JP | 2850558 | 11/1998 |

* cited by examiner

PRESSURE SENSOR AND METHOD FOR MANUFACTURING PRESSURE SENSOR

TECHNICAL FIELD

The present invention relates to a pressure sensor manufactured by a semiconductor manufacturing technique, and to a method for manufacturing such a pressure sensor.

BACKGROUND ART

FIG. 154 shows a process step of a method for manufacturing a conventional pressure sensor 901, which is disclosed in Patent Document 1. As shown in FIG. 154, to manufacture the pressure sensor 901, two semiconductor substrates 191 and 192 are bonded together, with a cavity portion 193 and an insulating layer 194 intervening between the substrates. By subsequently abrading the semiconductor substrate 192, a silicon diaphragm is provided on a portion 195 overlapping the cavity portion 193 in the vertical direction. The pressure sensor 901 detects changes in pressure by detecting changes in capacitance between the silicon diaphragm and the semiconductor substrate 191.

However, as described above, to manufacture the pressure sensor 901, two semiconductor substrates 191 and 192 need to be prepared and bonded together. Besides, processing to form a wiring and an electrode needs to be performed with respect to each of the semiconductor substrates 191 and 192. Thus, the manufacturing process is complicated, resulting in a high manufacturing cost of the pressure sensor 901.

FIG. 155 shows a conventional capacitive pressure sensor 903, which is disclosed in Patent Document 1. As shown in FIG. 155, the pressure sensor 903 includes a base substrate 391 in the form of a flat plate, an oxide film 392, a movable electrode 393, insulating layers 394, 395, metal wirings 396, 397, and a cavity portion 398. The base substrate 391 is made of silicon and has a fixed electrode 391a on the surface, in which boron ions are implanted and dispersed. The movable electrode 393 is formed by implanting and dispersing boron ions into part of a material substrate of made of silicon, and then removing remaining portions. The movable electrode is supported by the oxide film 392. The movable electrode 393 is formed to be parallel to the fixed electrode 391a by arranging the material substrate in parallel to the base substrate 391. The insulating layer 394 provides insulation between the base substrate 391 and the oxide film 392. The insulating layer 395 is formed to cover the surfaces of the oxide film 392 and movable electrode 393. The cavity portion 398 is formed to separate the fixed electrode 391a and the movable electrode 393 in the direction normal to the surface of the base substrate 391 (lamination direction). The metal wiring 396 is electrically connected to the movable electrode 393, and the metal wiring 397 is electrically connected to the fixed electrode 391a. This pressure sensor 903 detects changes in pressure by detecting changes in capacitance between the fixed electrode 391a and the movable electrode 393 facing each other in the lamination direction.

In recent years, size reduction of pressure sensors is increasingly demanded with size reduction of electronic devices. On the other hand, to detect changes in capacitance more precisely, it is desirable to increase the capacitance between the fixed electrode 391a and the movable electrode 393, and for that purpose, the facing area of the fixed electrode 391a and the movable electrode 393 as viewed in the lamination direction of the base substrate 391 needs to be increased. Thus, it is difficult to reduce the area of the movable electrode 393 as viewed in the lamination direction, which hinders size reduction of the pressure sensor 903.
Patent Document 1: Japanese Patent No. 2850558

DISCLOSURE OF THE INVENTION

Problems to be Solved by the Invention

The present invention has been proposed under the circumstances described above. It is therefore an object of the present invention to provide a more precise pressure sensor that can be manufactured easily. Another object of the present invention is to provide a method for manufacturing a pressure sensor that realizes size reduction.

Means for Solving the Problems

A pressure sensor provided according to a first aspect of the present invention comprises a semiconductor substrate, an insulating layer formed on the semiconductor substrate, a semiconductor layer formed on the semiconductor substrate, with the insulating layer intervening therebetween, and a cavity portion provided between the semiconductor substrate and the semiconductor layer. The portion of the semiconductor layer which overlaps the cavity portion as viewed in a lamination direction serves as a movable portion. The cavity portion is surrounded by the insulating layer.

In a preferred embodiment, the semiconductor substrate includes a recess extending inward in the lamination direction, and the cavity portion is provided in the recess.

In a preferred embodiment, the semiconductor layer is provided outside the recess.

In a preferred embodiment, the semiconductor layer is provided in the recess.

In a preferred embodiment, the pressure sensor further comprises a first electrode electrically connected to the semiconductor layer and a second electrode electrically connected to the semiconductor substrate.

In a preferred embodiment, the semiconductor substrate is made of single-crystal silicon, the semiconductor layer is made of polycrystalline silicon, and the insulating layer is made of silicon dioxide.

A method for manufacturing a pressure sensor according to a second aspect of the present invention comprises the steps of forming a recess in a semiconductor substrate, covering an entire surface of the recess with a first insulating layer, filling the recess with a sacrificial layer after covering the recess with the first insulating layer, covering with a second insulating layer a portion of the sacrificial layer which is exposed from the first insulating layer, forming a semiconductor layer to overlap the sacrificial layer with the second insulating layer intervening therebetween, and forming a cavity portion by removing the sacrificial layer. The portion of the semiconductor layer which overlaps the cavity portion serves as a movable portion.

A method for manufacturing a pressure sensor according to a third aspect of the present invention comprises the steps of forming a recess in a semiconductor substrate, covering an entire surface of the recess with a first insulating layer, forming a sacrificial layer to fill a portion of the recess which is close to a bottom after covering the recess with the first insulating layer, covering with a second insulating layer a portion of the sacrificial layer which is exposed from the first insulating layer, forming a semiconductor layer in the recess to overlap the sacrificial layer with the second insulating layer intervening therebetween, and forming a cavity portion by removing the sacrificial layer. The semiconductor layer serves as a movable portion.

A method for manufacturing a pressure sensor according to a fourth aspect of the present invention comprises the steps of forming a first insulating layer on a surface of a semiconductor substrate, forming a recess in the first insulating layer, forming a second insulating layer on a bottom of the recess, forming a sacrificial layer in the recess, covering with a third insulating layer a portion of the sacrificial layer which is exposed from the first insulating layer, forming a semiconductor layer to overlap the sacrificial layer with the third insulating layer intervening therebetween, and forming a cavity portion by removing the sacrificial layer. The portion of the semiconductor layer which overlaps the cavity portion serves as a movable portion.

In a preferred embodiment, the step of forming a cavity portion comprises forming a vent hole penetrating the semiconductor layer and reaching the sacrificial layer, etching the sacrificial layer through the vent hole, and sealing the vent hole with an insulating material after the sacrificial layer is removed.

A pressure sensor provided according to a fifth aspect of the present invention comprises a movable portion and a piezoresistor provided at the movable portion. The pressure sensor further comprises a semiconductor substrate including a cavity portion which is open at an obverse surface, a semiconductor layer formed on the obverse surface of the semiconductor substrate and including a through-hole penetrating in a lamination direction, and a sealing member which seals the through-hole. The portion of the semiconductor layer which overlaps the cavity portion as viewed in the lamination direction serves as the movable portion, and the through-hole is formed in the movable portion.

In a preferred embodiment, the sealing member seals the end of the through-hole on the obverse surface side of the semiconductor layer in the lamination direction.

In a preferred embodiment, the sealing member is made of a different material from the semiconductor layer.

In a preferred embodiment, the semiconductor layer is made of silicon, whereas the sealing member is made of silicon dioxide.

In a preferred embodiment, the pressure sensor further comprises an oxide film provided between the semiconductor layer and the semiconductor substrate.

In a preferred embodiment, the cavity portion is open at the reverse surface of the semiconductor substrate.

In a preferred embodiment, the piezoresistor is in the form of a strip including a bend.

In a preferred embodiment, the semiconductor substrate is provided with thirteen pairs of plate-like members projecting in the lamination direction and facing each other, and the movable portion and the cavity portion are sandwiched between the pair of plate-like members.

According to a sixth aspect of the present invention, there is provided a method for manufacturing a pressure sensor comprising a movable portion and a piezoresistor provided at the movable portion. The method comprises the steps of forming a semiconductor layer on an obverse surface side of a semiconductor substrate, forming a through-hole penetrating the semiconductor layer in a lamination direction and reaching the obverse surface of the semiconductor substrate, performing etching through the through-hole to form in the semiconductor substrate a cavity portion which is open at the obverse surface, and sealing the through-hole by filling a sealing member.

In a preferred embodiment, the semiconductor layer is made by using silicon, and the sealing member is made by using silicon dioxide.

In a preferred embodiment, the method further comprises the step of forming at a reverse surface of the semiconductor substrate an opening connected to the cavity portion.

In a preferred embodiment, the method further comprises the steps of forming a groove including a bend in the movable portion and forming a piezoresistor in the groove.

According to a seventh aspect of the present invention, there is provided a pressure sensor comprising a movable electrode and a fixed electrode arranged in parallel to each other. The pressure sensor further comprises a semiconductor substrate, a first insulating layer formed on the semiconductor substrate, a semiconductor layer formed on the semiconductor substrate with the first insulating layer intervening therebetween, a second insulating layer formed on the semiconductor layer, a first cavity portion formed in the semiconductor substrate, a second cavity portion overlapping the first cavity portion as viewed in a lamination direction and formed in contact with the second insulating layer. The fixed electrode faces the second insulating layer across the second cavity portion, and the movable electrode is provided at a portion of the semiconductor layer which is sandwiched between the first cavity portion and the second cavity portion.

In a preferred embodiment, the movable electrode includes a through-hole penetrating the semiconductor layer in the lamination direction, and the pressure sensor further comprises a sealing member which seals the through-hole.

In a preferred embodiment, the sealing member is made of a different material from the semiconductor layer.

In a preferred embodiment, the semiconductor layer is made of silicon, whereas the sealing member is made of silicon dioxide.

In a preferred embodiment, the pressure sensor further comprises a third insulating layer facing the second insulating layer across the second cavity portion. The fixed electrode is provided on the third insulating layer.

In a preferred embodiment, the pressure sensor further comprises a vent hole penetrating the fixed electrode in the lamination direction, and one end of the vent hole in the lamination direction reaches the second cavity portion.

In a preferred embodiment, the pressure sensor further comprises a movable electrode terminal electrically connected to the semiconductor layer.

In a preferred embodiment, the semiconductor substrate is provided with a pair of plate-like members projecting in the lamination direction and facing each other, and the movable electrode and the second cavity portion are sandwiched between the paired plate-like members.

In a preferred embodiment, the pressure sensor further comprises a protective layer formed on the paired plate-like members and including an opening which exposes the surface of at least one of the plate-like members, and a ground electrode terminal electrically connected to the semiconductor substrate via the opening.

According to an eighth embodiment of the present invention, there is provided a method for manufacturing a pressure sensor comprising a movable electrode and a fixed electrode arranged in parallel to each other. The method comprises the steps of forming a first insulating layer on a surface of a semiconductor substrate, forming a semiconductor layer on a surface of the first insulating layer, forming a recess in the semiconductor layer, forming a second insulating layer on a bottom surface of the recess, forming at a bottom of the recess a vent hole extending in a lamination direction and penetrating the second insulating layer, the semiconductor layer and the first insulating layer, performing etching through the vent hole to form a first cavity portion in the semiconductor substrate, sealing the through-hole, forming a sacrificial layer in the recess, forming a metal layer on the sacrificial layer, forming the fixed electrode from the metal layer, and removing the sacrificial layer to form a second cavity portion.

In a preferred embodiment, the method further comprises, between the step of forming a sacrificial layer in the recess and the step of forming a metal layer on the sacrificial layer, the steps of forming a third insulating layer on a surface of the sacrificial layer, and forming in the third insulating layer a through-hole penetrating in the lamination direction. The step of forming the fixed electrode from the metal layer comprises forming the fixed electrode to expose the through-hole. The step of removing the sacrificial layer to form a second cavity portion comprises etching the sacrificial layer through the through-hole.

In a preferred embodiment, the method for manufacturing a pressure sensor further comprises the step of forming a movable electrode terminal electrically connected to the semiconductor layer.

In a preferred embodiment, the method further comprises the step of processing the semiconductor substrate into a shape including a pair of plate-like members projecting from a surface in the lamination direction and facing each other. The step of forming a recess in the semiconductor layer comprises forming the recess in such a manner that the recess is sandwiched between the plate-like members in a direction in which the plate-like members face each other.

In a preferred embodiment, the step of processing into a shape including a pair of plate-like members comprises forming a protective layer to cover portions of the semiconductor substrate which correspond to the plate-like members as viewed in a lamination direction, and thinning in the lamination direction portions of the semiconductor substrate other than the portions covered with the protective layer. The method further comprises the steps of forming in the protective layer an opening which exposes part of the semiconductor substrate, and forming a ground electrode terminal electrically connected to the semiconductor substrate via the opening.

According to a ninth aspect of the present invention, there is provided a pressure sensor comprising a movable electrode and a fixed electrode arranged in parallel to each other. The pressure sensor further comprises a semiconductor substrate insulated from the movable electrode and supporting the movable electrode. The fixed electrode and the movable electrode face each other in an in-plane direction of the semiconductor substrate.

In a preferred embodiment, the movable electrode is made of a different material from the semiconductor substrate.

In a preferred embodiment, the fixed electrode is provided on a plate-like member projecting from the semiconductor substrate in a direction perpendicular to the in-plane direction.

In a preferred embodiment, the plate-like member comprises part of the semiconductor substrate.

In a preferred embodiment, the plate-like member is made of a same material as the movable electrode.

In a preferred embodiment, the pressure sensor further comprises, between the fixed electrode and the movable electrode in the in-plane direction, a closed space shut off from outside air.

In a preferred embodiment, the pressure sensor further comprises a wall portion standing from the semiconductor substrate. In the in-plane direction, the movable electrode is arranged between the wall portion and the fixed electrode such that the distance between the fixed electrode and the movable electrode is shorter than the distance between the movable electrode and the wall portion.

In a preferred embodiment, the wall portion comprises part of the semiconductor substrate.

In a preferred embodiment, the wall portion is made of a same material as the movable electrode.

In a preferred embodiment, the pressure sensor further comprises a gas supply space capable of taking in outside air. The gas supply space is provided between the movable electrode and the wall portion in the in-plane direction. The pressure sensor further comprises a closed space shut off from outside air. The closed space is provided between the fixed electrode and the movable electrode in the in-plane direction.

In a preferred embodiment, the pressure sensor further comprises a closed space shut off from outside air. The closed space is provided between the movable electrode and the wall portion in the in-plane direction. The pressure sensor further comprises a gas supply space capable of taking in outside air. The gas supply space is provided between the fixed electrode and the movable electrode in the in-plane direction.

In a preferred embodiment, the pressure sensor further comprises an additional movable electrode and an additional fixed electrode facing each other in the in-plane direction of the semiconductor substrate, and an additional wall portion standing from the semiconductor substrate. In the in-plane direction of the semiconductor substrate, the additional movable electrode is arranged between the additional wall portion and the additional fixed electrode such that the distance between the additional fixed electrode and the additional movable electrode is shorter than the distance between the additional movable electrode and the additional wall portion. An additional gas supply space capable of taking in outside air is provided between the additional movable electrode and the additional wall portion and between the additional fixed electrode and the additional movable electrode.

In a preferred embodiment, the pressure sensor further comprises an additional movable electrode and an additional fixed electrode facing each other in the in-plane direction of the semiconductor substrate, and an additional wall portion standing from the semiconductor substrate. In the in-plane direction of the semiconductor substrate, the additional movable electrode is arranged between the additional wall portion and the additional fixed electrode such that the distance between the additional fixed electrode and the additional movable electrode is shorter than the distance between the additional movable electrode and the additional wall portion. A closed space shut off from outside air is provided between the additional movable electrode and the additional wall portion and between the additional fixed electrode and the additional movable electrode.

In a preferred embodiment, the additional wall portion comprises part of the semiconductor substrate.

In a preferred embodiment, the wall portion, the additional movable electrode and the additional wall portion are made of a same material as the movable electrode.

In a preferred embodiment, the direction in which the additional movable electrode and the additional fixed electrode face each other is same as the direction in which the movable electrode and the fixed electrode face each other.

More preferably, the wall portion and the additional wall portion face each other in the direction in which the movable electrode and the fixed electrode face each other.

According to a tenth aspect of the present invention, there is provided a method for manufacturing a pressure sensor comprising a movable electrode and a fixed electrode arranged in parallel to each other. The method comprises the steps of performing etching in a first direction with respect to a semiconductor material, forming a fixed electrode including an electrode surface perpendicular to a second direction crossing the first direction at right angles, and forming a movable electrode including an electrode surface facing the electrode surface of the fixed electrode in the second direction.

In a preferred embodiment, the step of forming a movable electrode comprises forming a semiconductor layer on a remaining portion of the semiconductor material and performing etching in the first direction with respect to the semiconductor layer. The movable electrode is formed as a remaining portion of the semiconductor layer.

In a preferred embodiment, the fixed electrode is formed as a remaining portion of the semiconductor material in the step of performing etching with respect to the semiconductor material.

In another preferred embodiment, the fixed electrode is formed as a remaining portion of the semiconductor layer in the step of performing etching with respect to the semiconductor layer.

In a preferred embodiment, the step of performing etching with respect to the semiconductor material comprises forming a wall portion including a side surface facing the electrode surface of the fixed electrode in the second direction, as a remaining portion of the semiconductor material. The step of forming a movable electrode comprises forming a movable electrode between the wall portion and the fixed electrode in the second direction at a position closer to the fixed electrode than to the wall portion.

In another preferred embodiment, the semiconductor material comprises a semiconductor substrate and a semiconductor layer formed on the semiconductor substrate. The step of performing etching with respect to the semiconductor material comprises performing etching with respect to the semiconductor layer to form the fixed electrode and the movable electrode as a remaining portion of the semiconductor layer.

In a preferred embodiment, the step of performing etching with respect to the semiconductor material comprises forming a wall portion including a side surface facing the electrode surface of the fixed electrode in the second direction, as a remaining portion of the semiconductor layer. The movable electrode is formed between the wall portion and the fixed electrode in the second direction at a position closer to the fixed electrode than to the wall portion.

Other features and advantages of the present invention will become more apparent from the detailed description given below with reference to the accompanying drawings.

BRIEF DESCRIPTION OF THE DRAWINGS

FIG. 120 is a plan view showing a step performed after the state of FIG. 119 is obtained;

FIG. 121 is a sectional view taken along lines CXXI-CXXI in FIG. 120;

FIG. 122 is a sectional view showing a step subsequent to the step of FIG. 121;

FIG. 123 is a plan view showing a step subsequent to the step of FIG. 122;

FIG. 124 is a sectional view taken along lines CXXIV-CXXIV in FIG. 123;

FIG. 125 is a plan view showing a pressure sensor according to a twelfth embodiment of the present invention;

FIG. 126 is a sectional view taken along lines CXXVI-CXXVI in FIG. 125;

FIG. 127 is a plan view showing a step of a method for manufacturing the pressure sensor shown in FIG. 126;

FIG. 128 is a sectional view taken along lines CXXVIII-CXXVIII in FIG. 127;

FIG. 129 is a sectional view showing a step subsequent to the step of FIG. 128;

FIG. 130 is a sectional view showing a step subsequent to the step of FIG. 129;

FIG. 131 is a sectional view showing a step subsequent to the step of FIG. 130;

Figure 131:
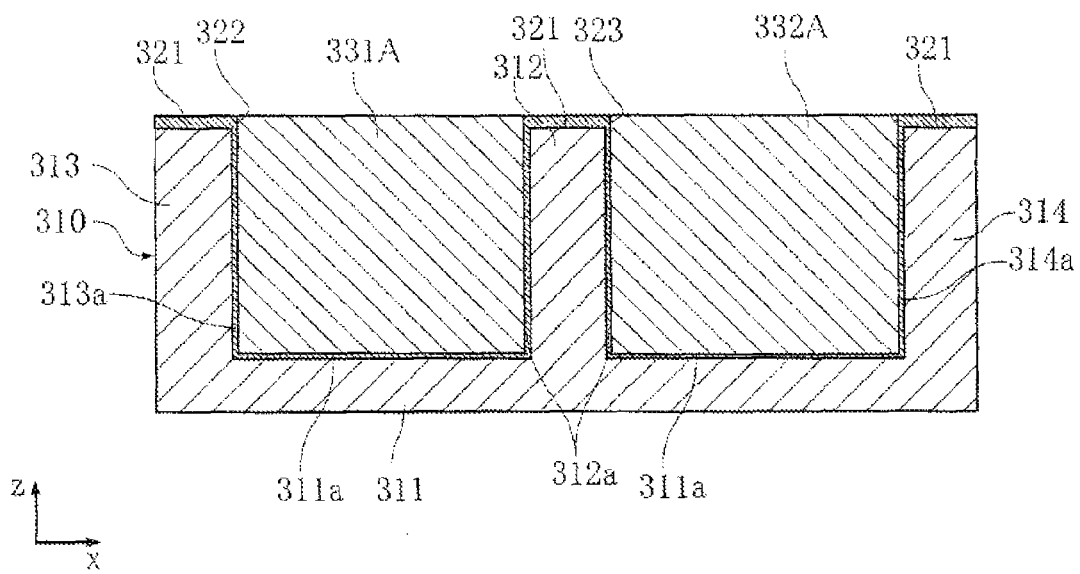
Figure 132:
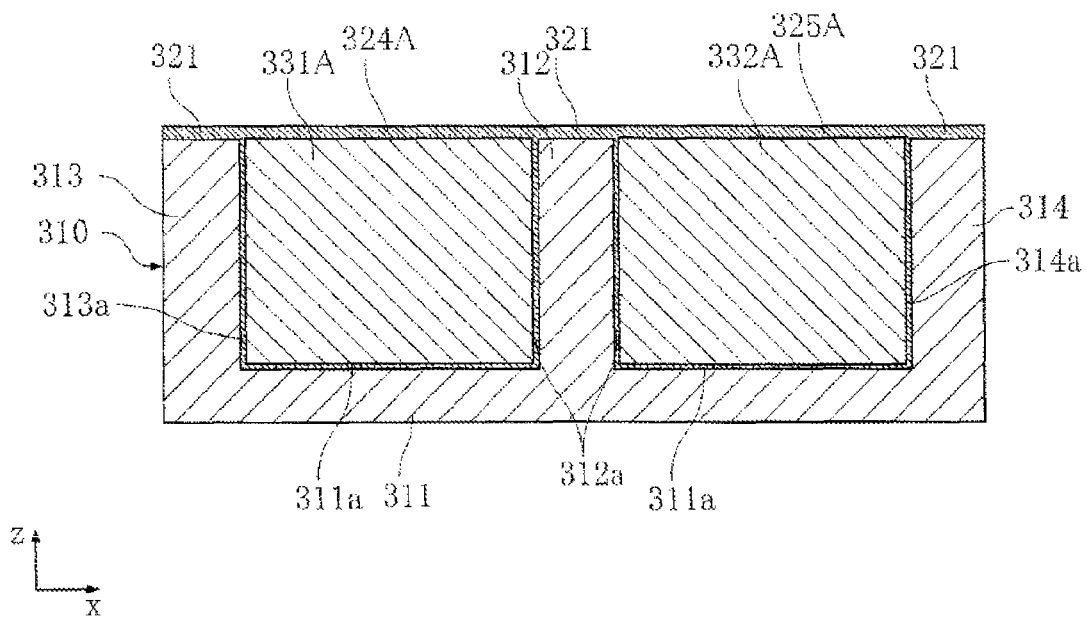
Figure 133:
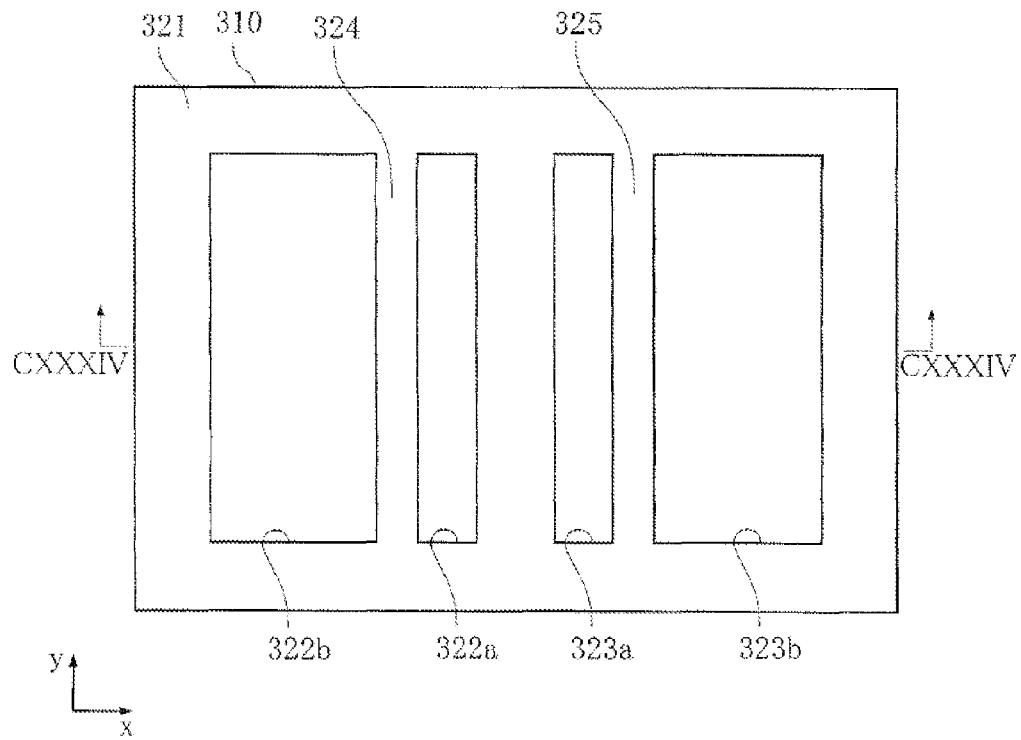
Figure 134:
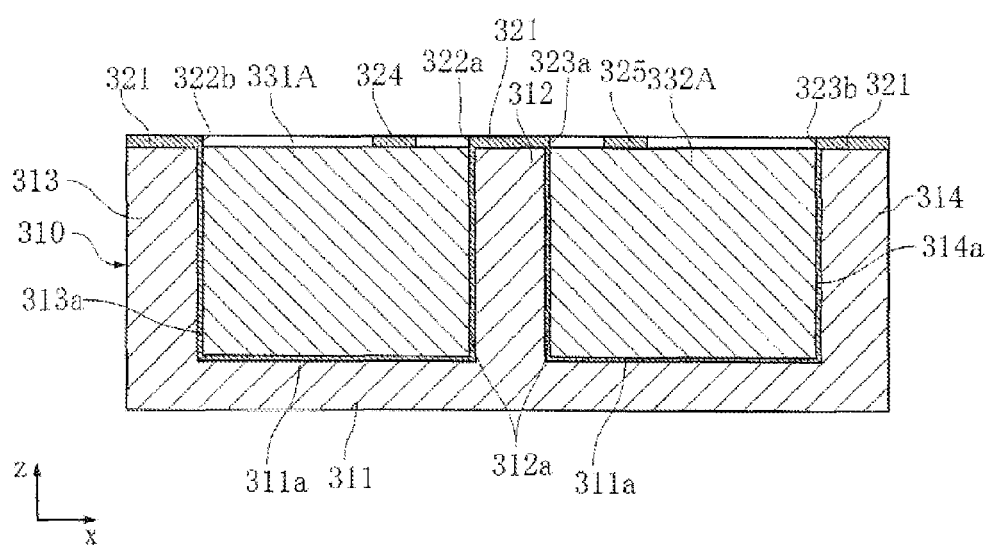
Figure 135:
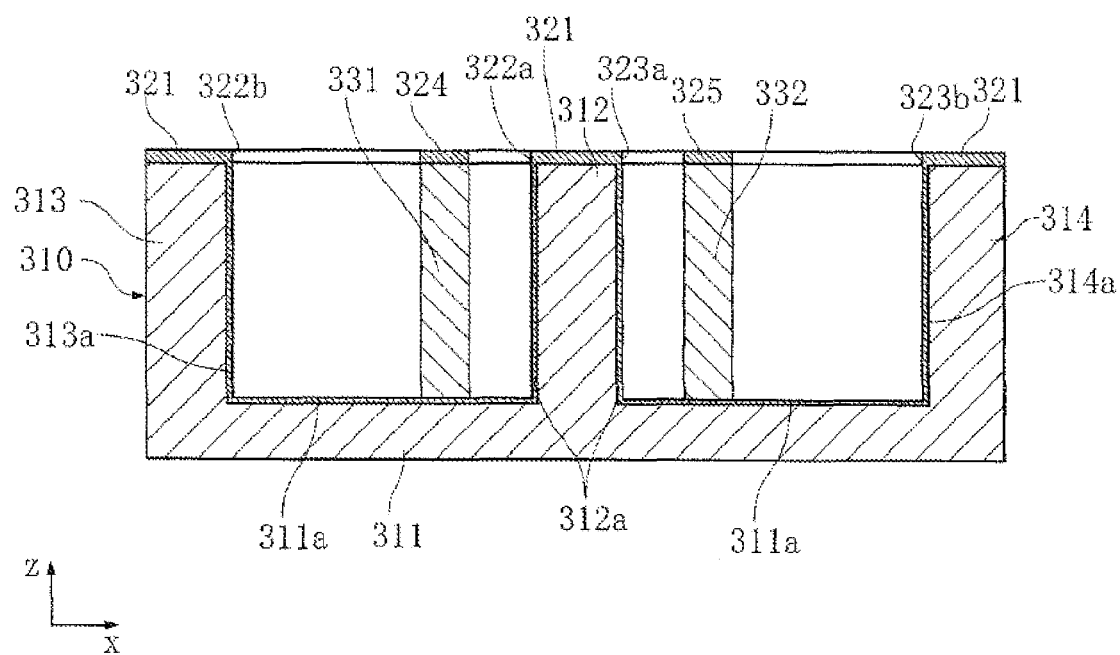
Figure 136:
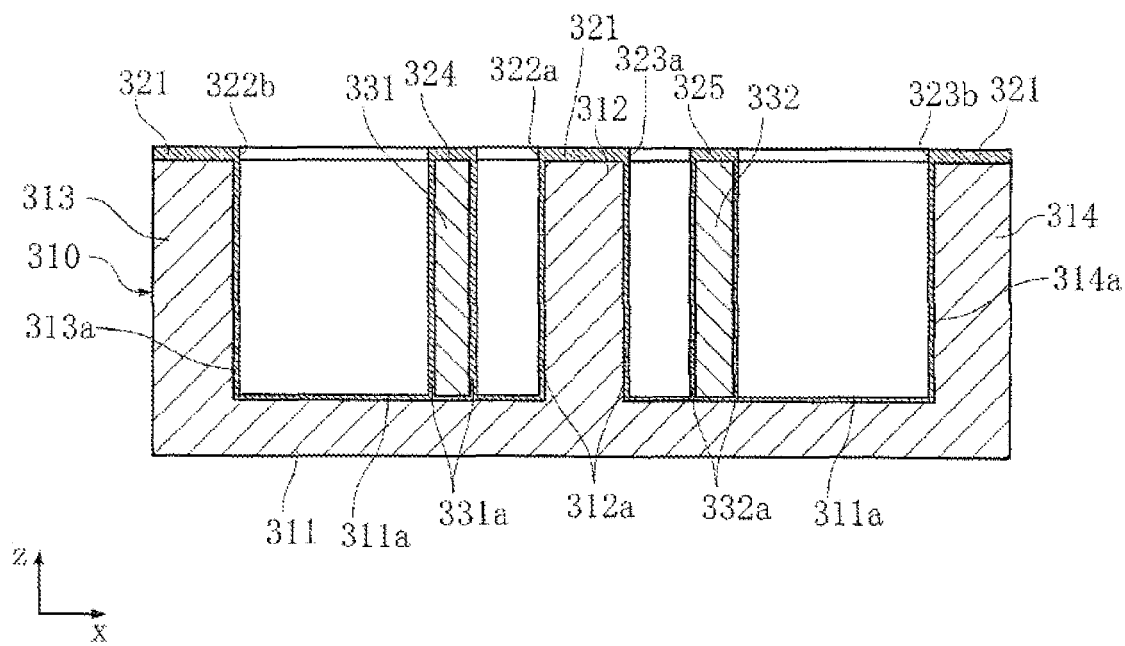
Figure 137:
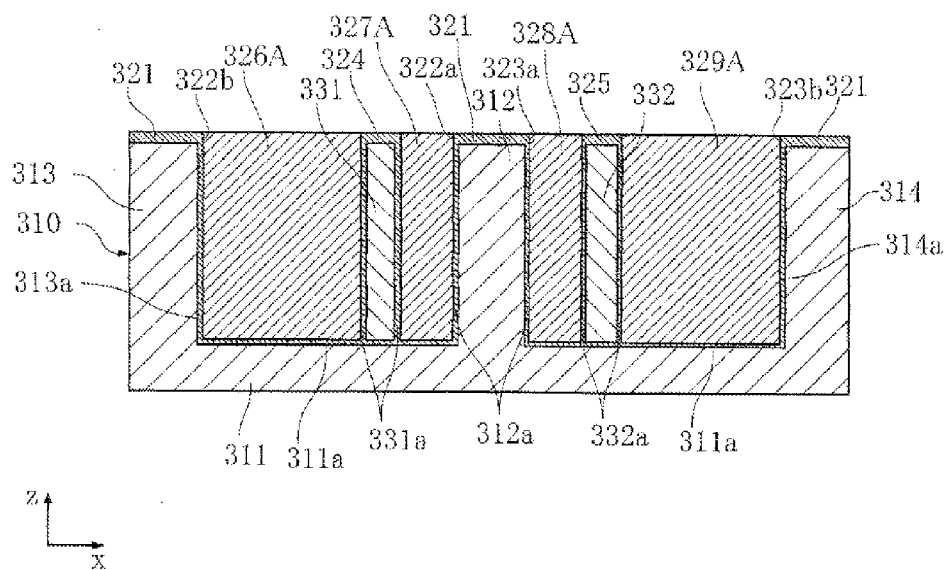
Figure 138:
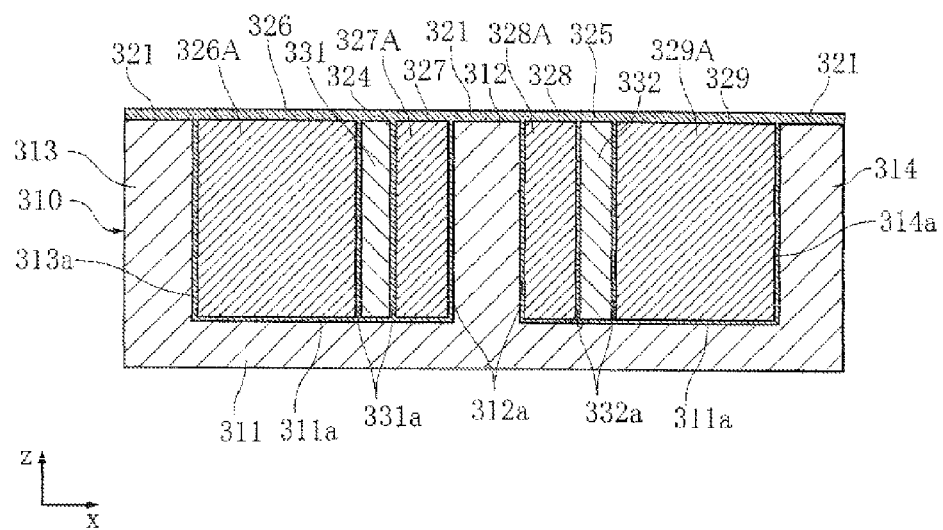
Figure 139:
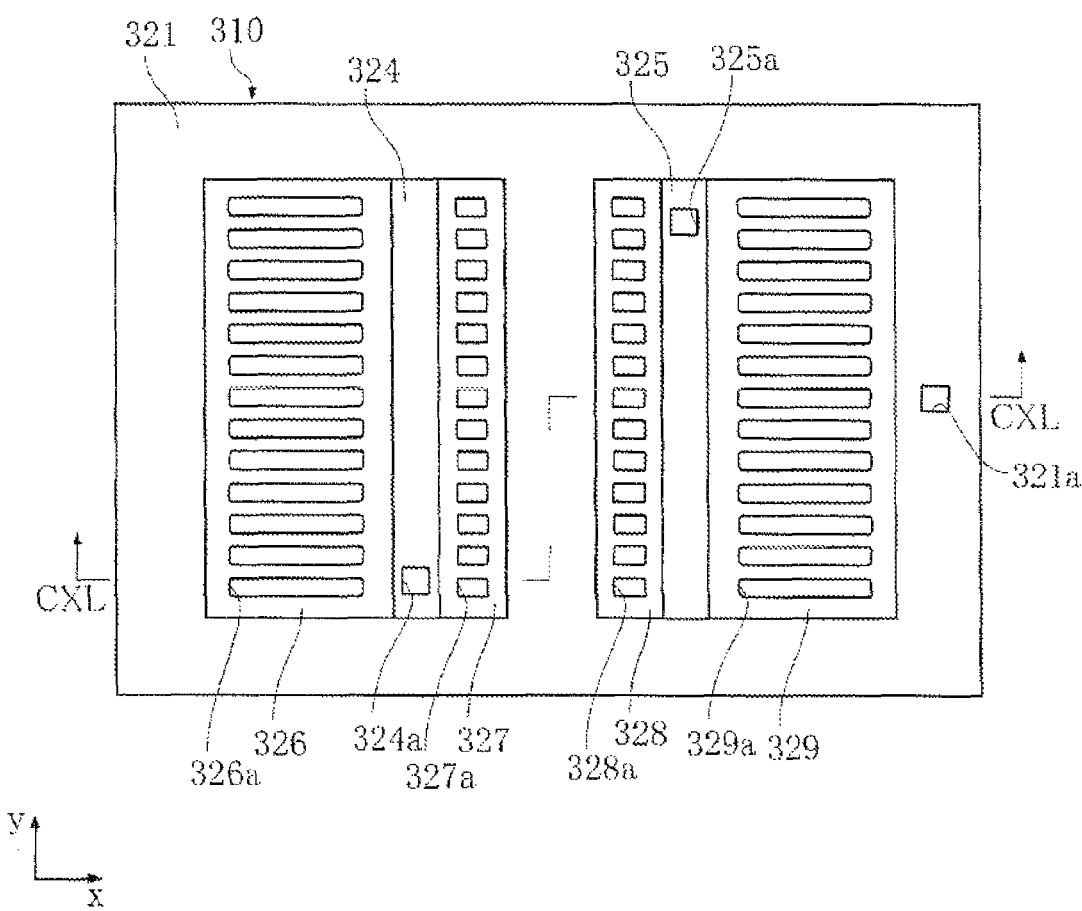
Figure 140:
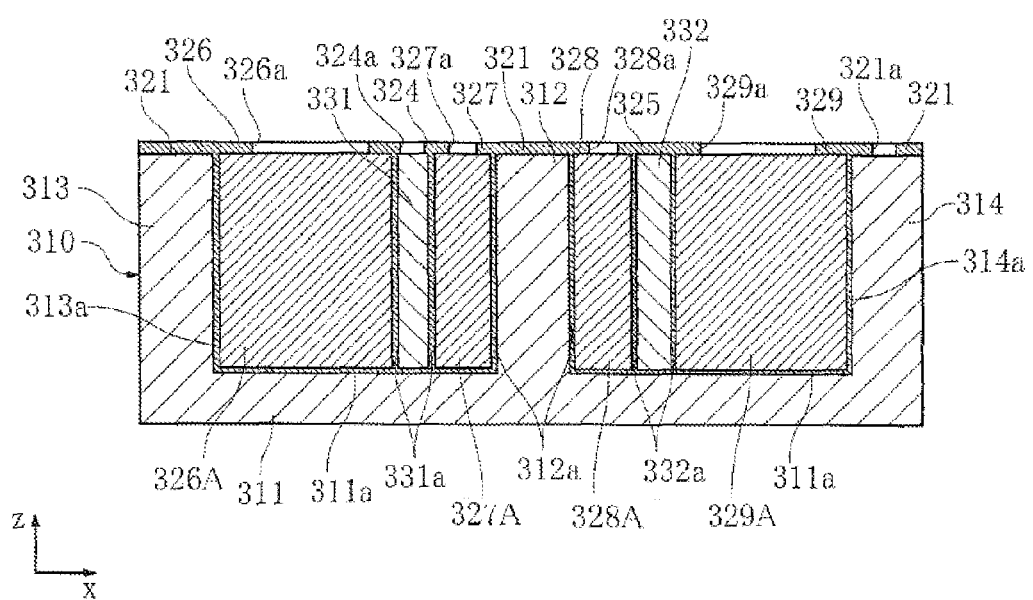
Figure 141:
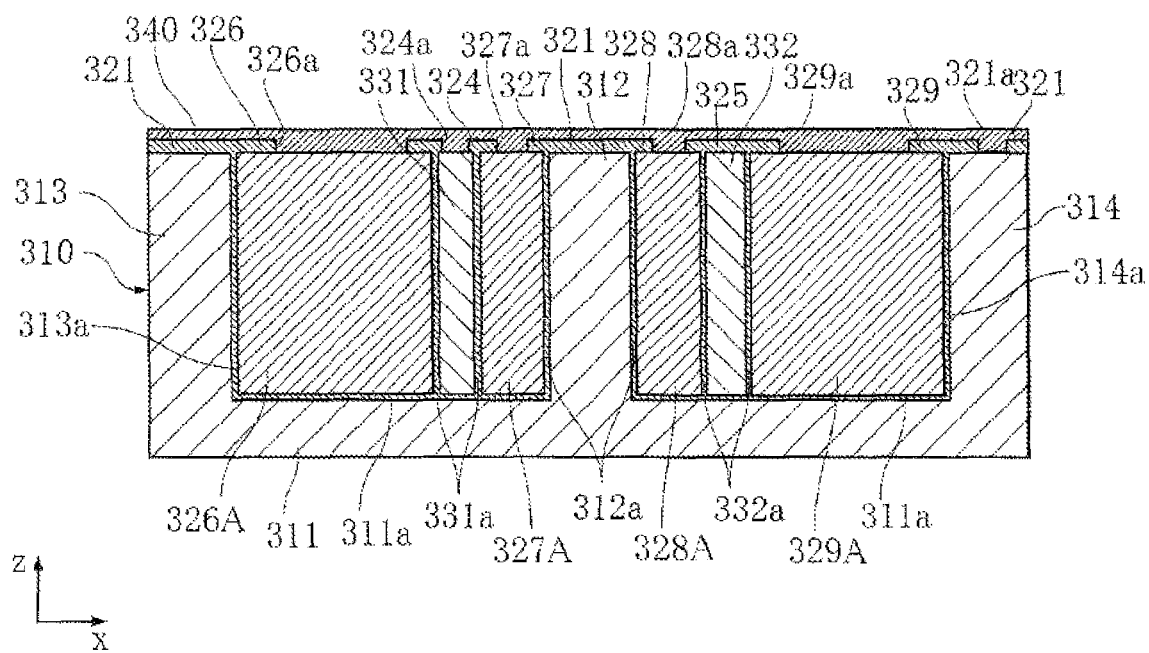
Figure 142:
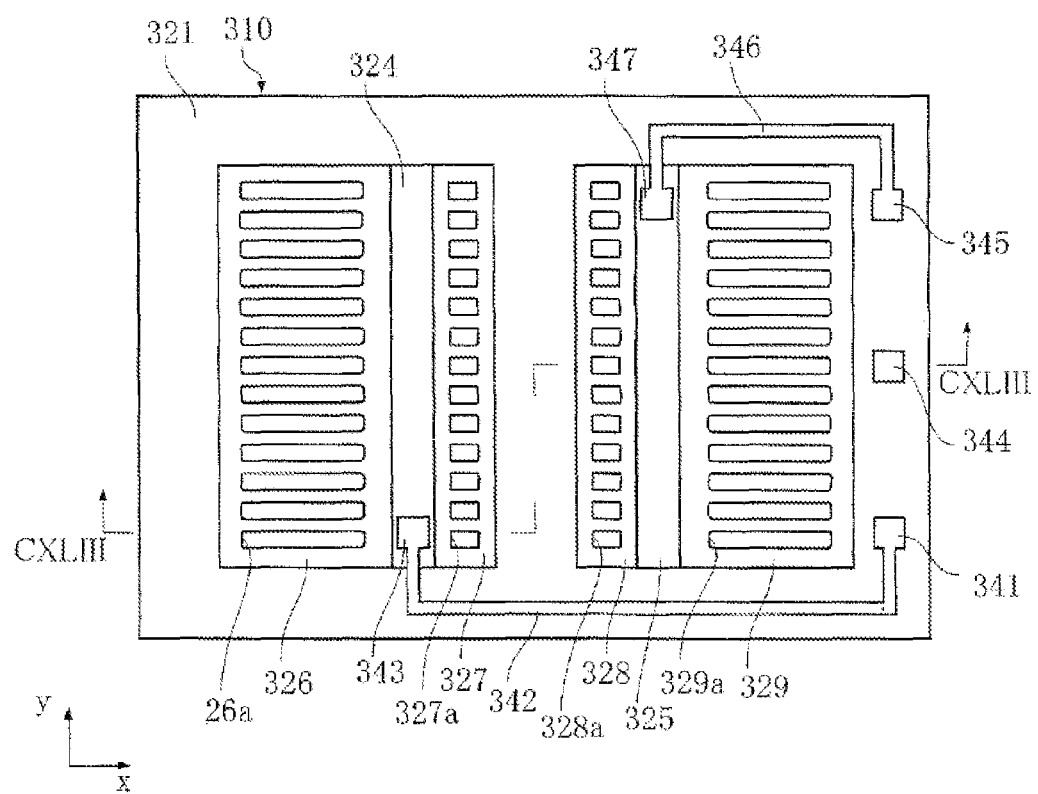
Figure 143:
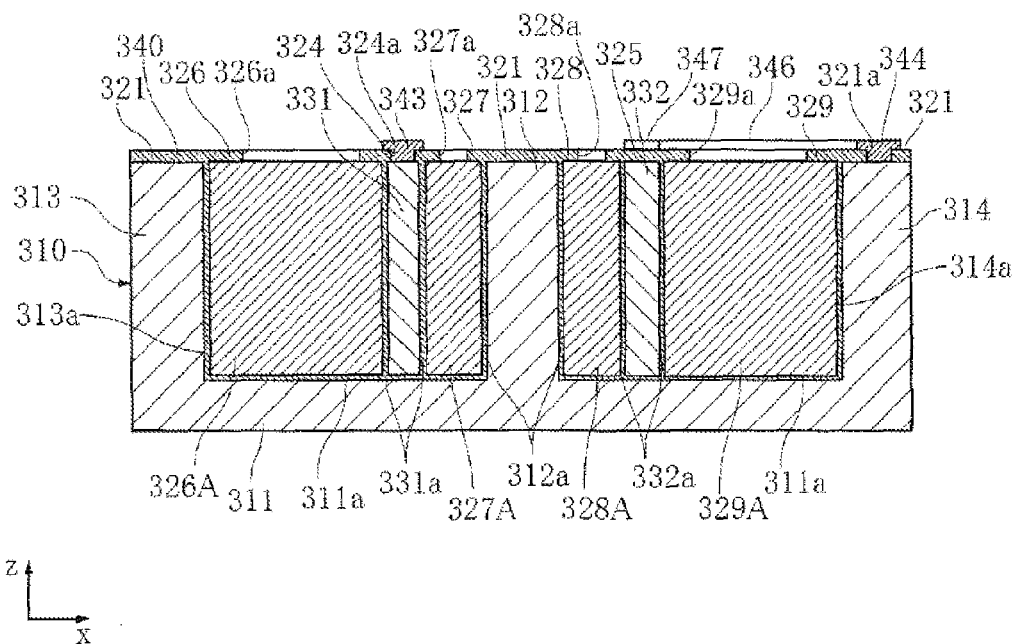
Figure 144:
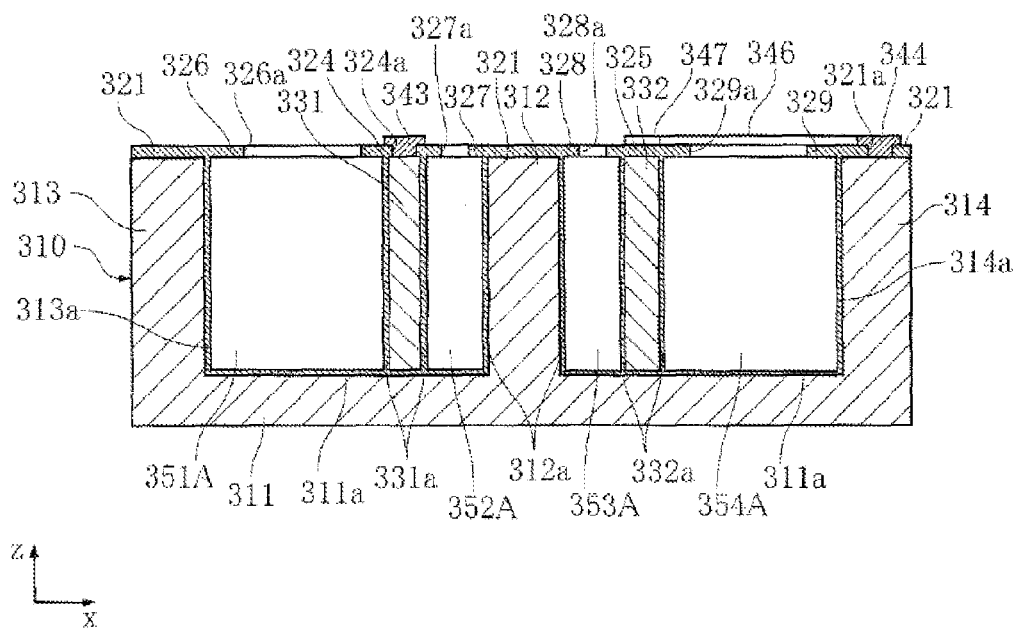
Figure 145:
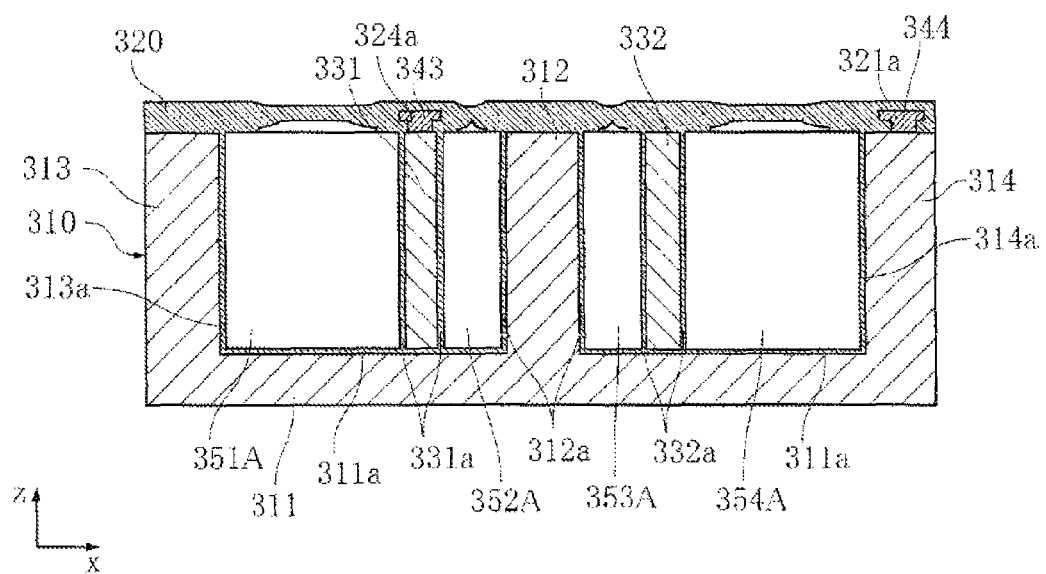
Figure 146:
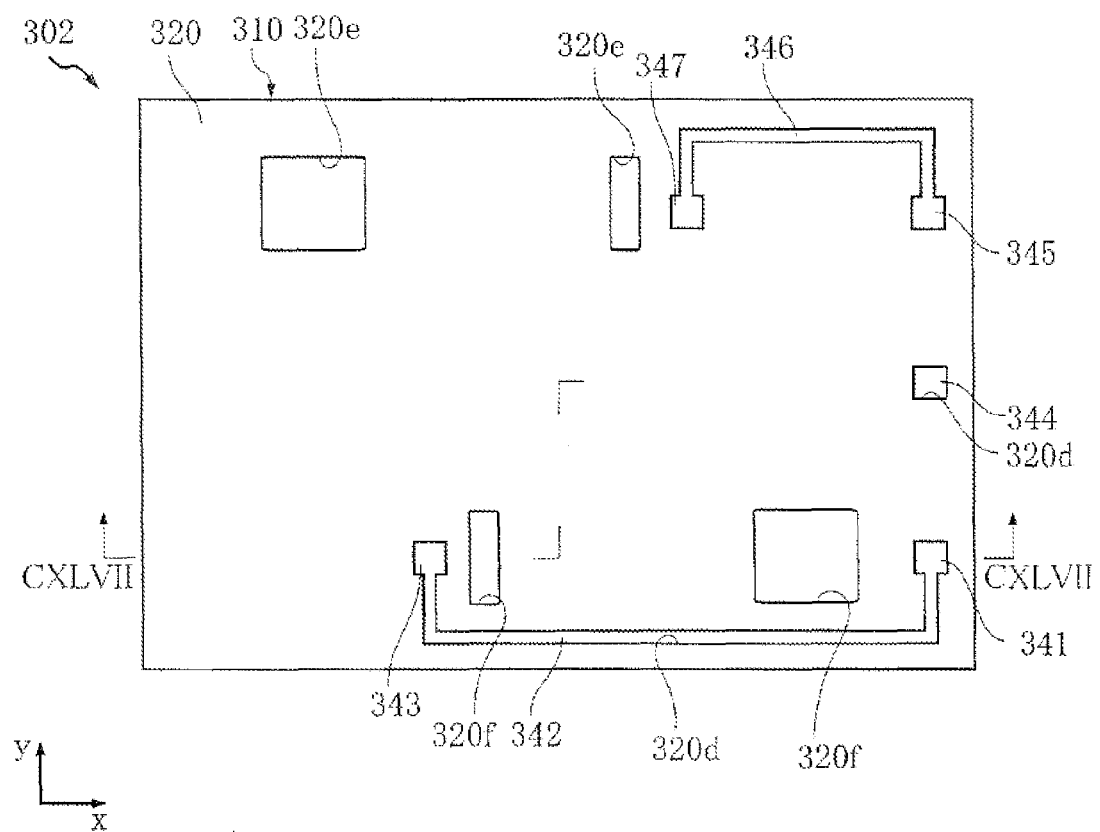
Figure 147:
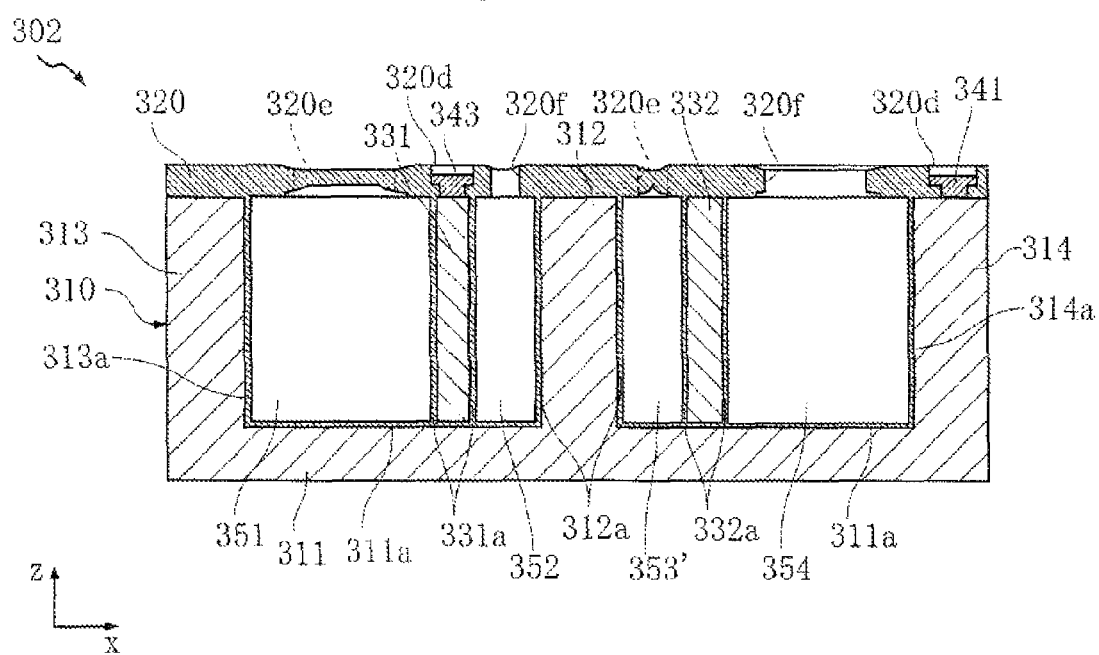
Figure 148:
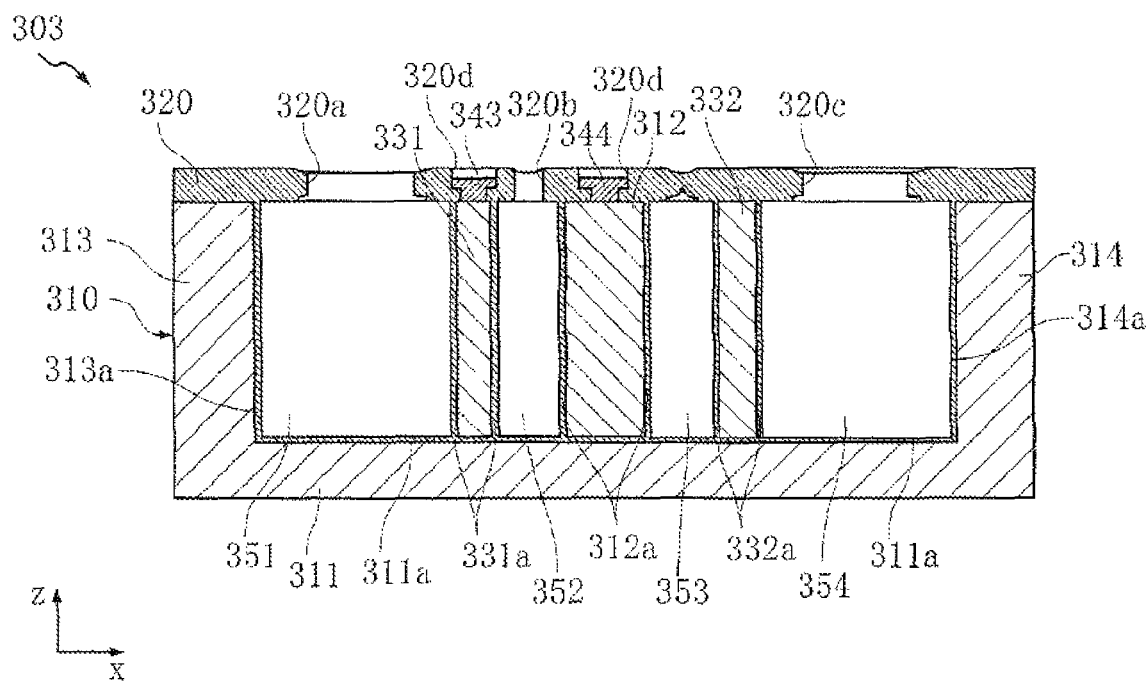
Figure 149:
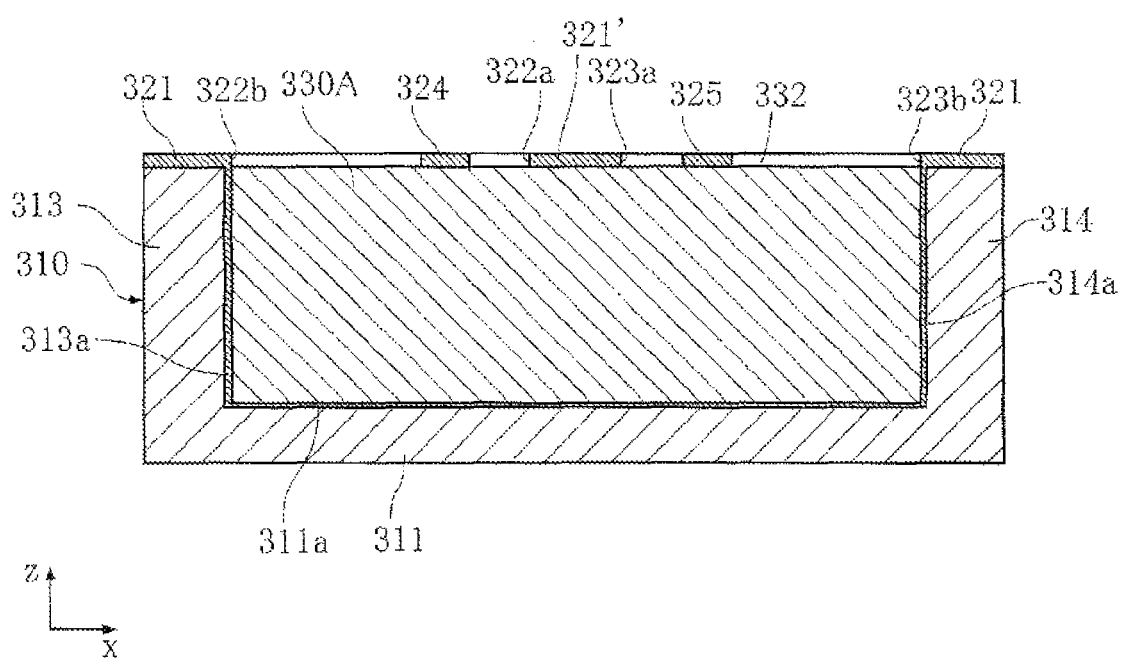
Figure 150:
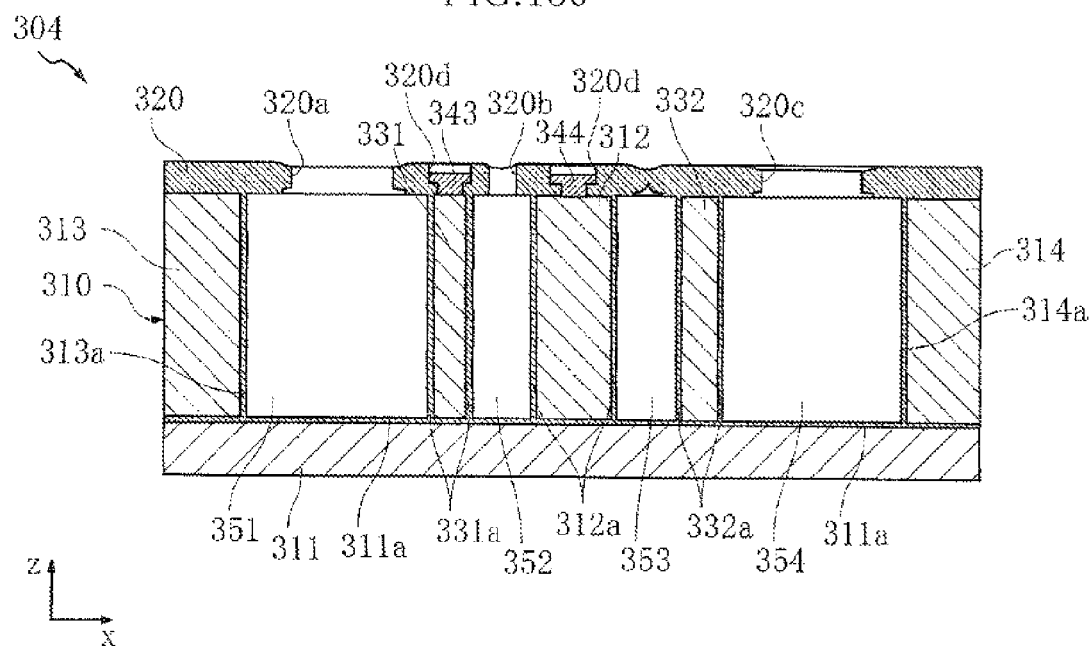
Figure 151:
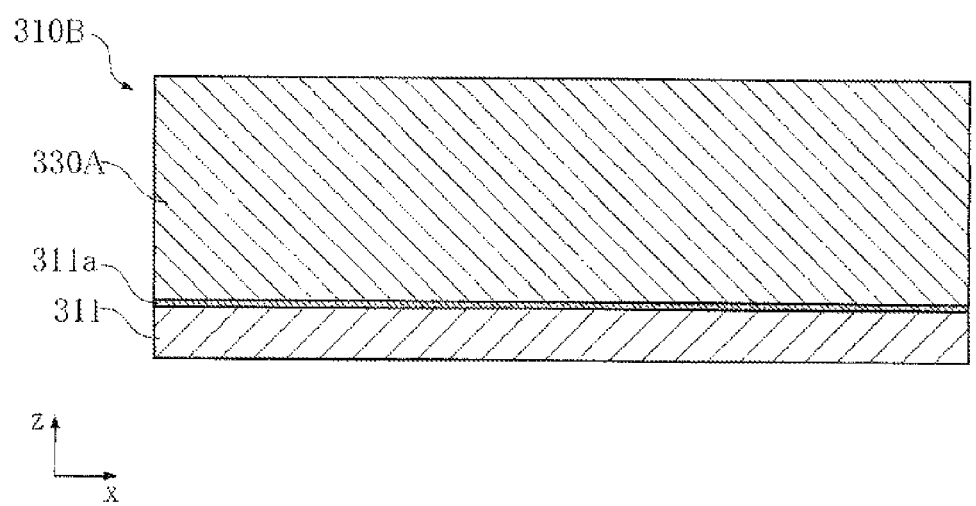
Figure 152:
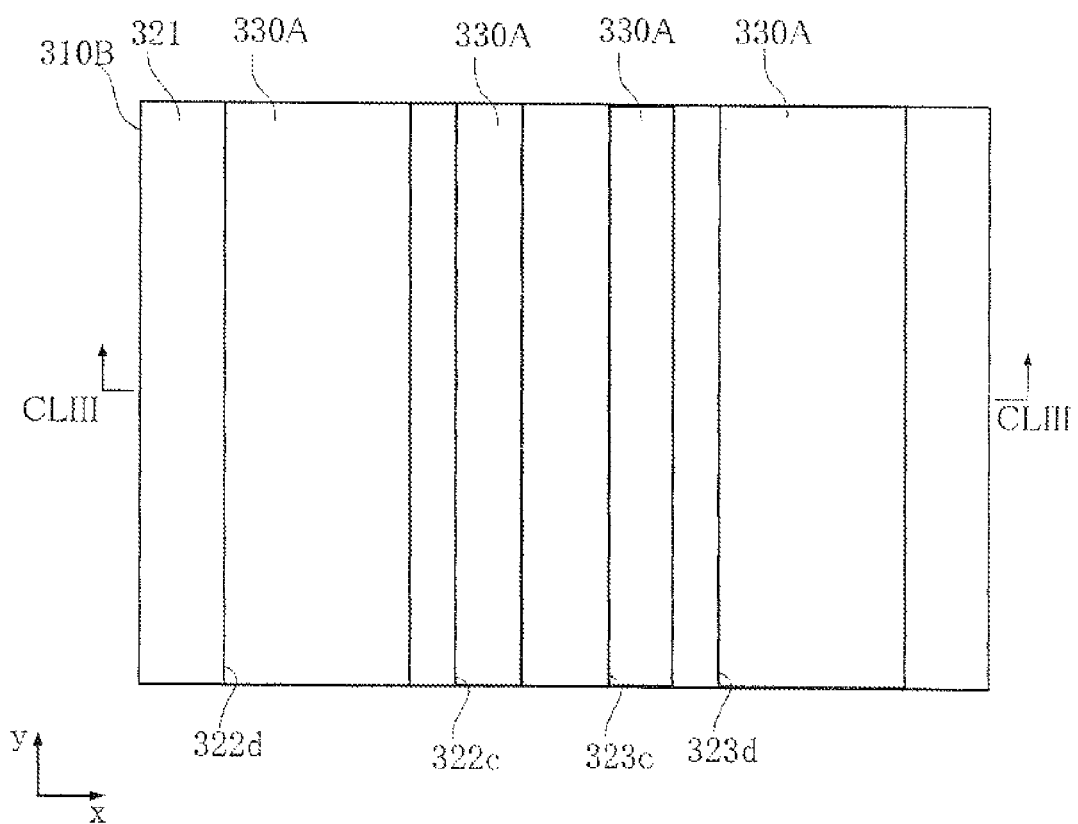
Figure 153:
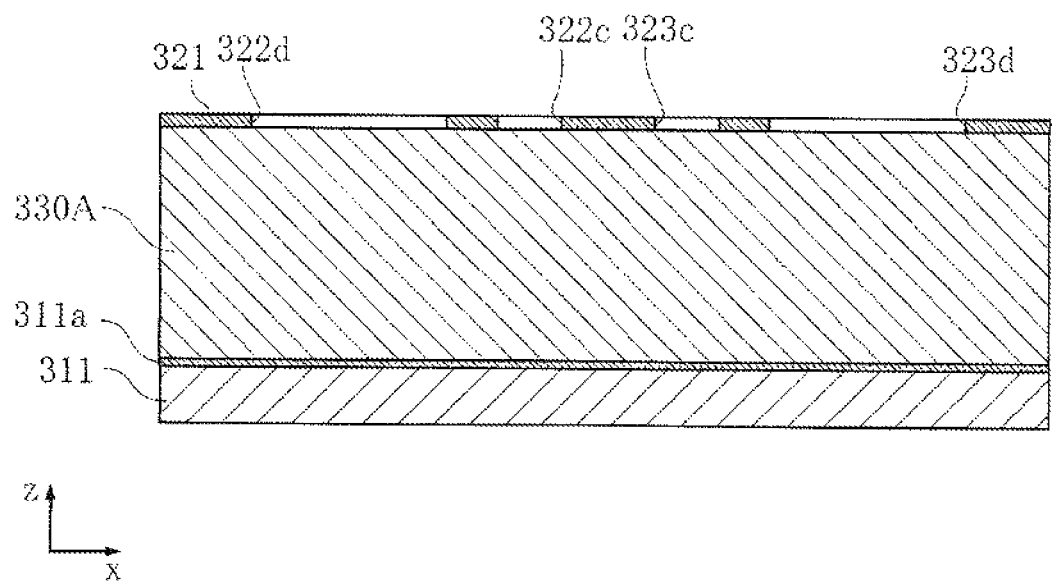
Figure 154:
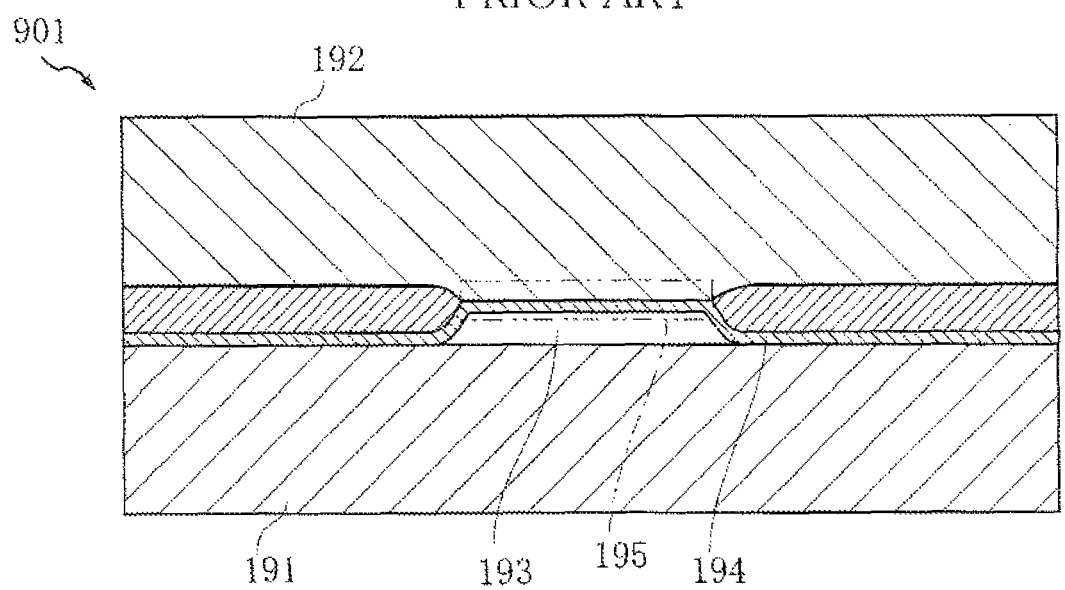
Figure 155:
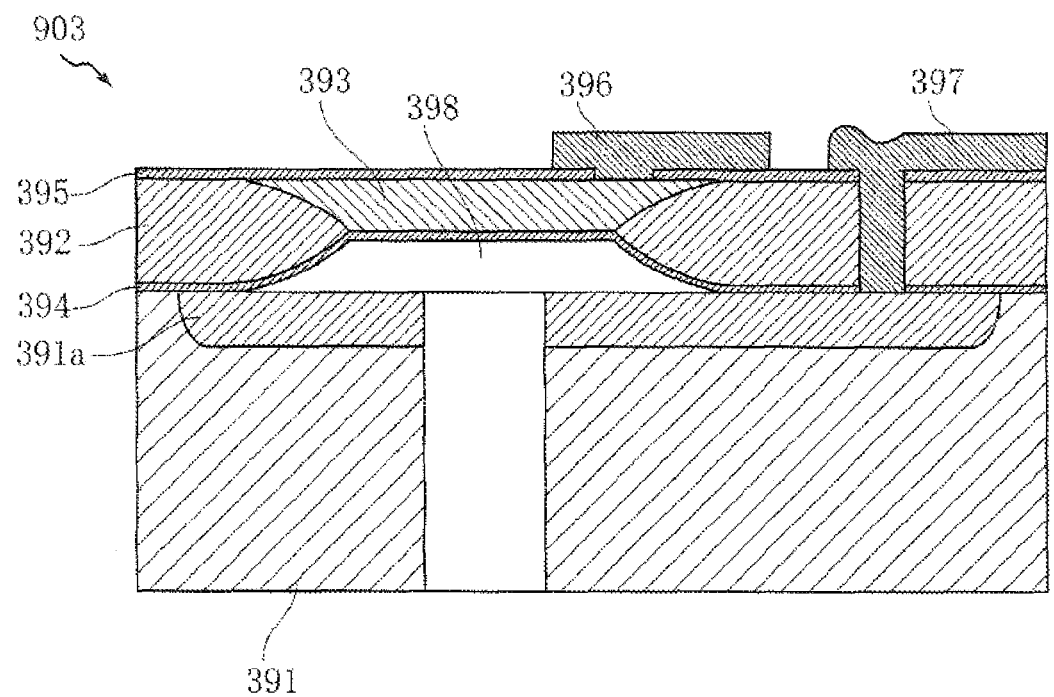

FIG. 132 is a sectional view showing a step subsequent to the step of FIG. 131;

FIG. 133 is a plan view showing a step subsequent to the step of FIG. 132;

FIG. 134 is a sectional view taken along lines CXXXIV-CXXXIV in FIG. 133;

FIG. 135 is a sectional view showing a step subsequent to the step of FIG. 134;

FIG. 136 is a sectional view showing a step subsequent to the step of FIG. 135;

FIG. 137 is a sectional view showing a step subsequent to the step of FIG. 136;

FIG. 138 is a sectional view showing a step subsequent to the step of FIG. 137;

FIG. 139 is a plan view showing a step subsequent to the step of FIG. 138;

FIG. 140 is a sectional view taken along lines CXL-CXL in FIG. 139;

FIG. 141 is a sectional view showing a step subsequent to the step of FIG. 140;

FIG. 142 is a sectional view showing a step subsequent to the step of FIG. 141;

FIG. 143 is a sectional view taken along lines CXLIII-CXLIII in FIG. 142;

FIG. 144 is a sectional view showing a step subsequent to the step of FIG. 143;

FIG. 145 is a sectional view showing a step subsequent to the step of FIG. 144;

FIG. 146 is a plan view showing a pressure sensor according to a thirteenth embodiment of the present invention;

FIG. 147 is a sectional view taken along lines CXLVII-CXLVII in FIG. 146;

FIG. 148 is a sectional view showing a pressure sensor according to a thirteenth embodiment of the present invention;

FIG. 149 is a sectional view showing a step of a method for manufacturing the pressure sensor shown in FIG. 148;

FIG. 150 is a sectional view showing a pressure sensor according to a fifteenth embodiment of the present invention;

FIG. 151 is a sectional view showing a semiconductor material for the pressure sensor shown in FIG. 150;

FIG. 152 is a plan view showing a step of a method for manufacturing the pressure sensor shown in FIG. 150;

FIG. 153 is a sectional view taken along lines CLIII-CLIII in FIG. 152;

FIG. 154 is a sectional view showing an example of a method for manufacturing a conventional pressure sensor; and FIG. 155 is a sectional view showing an example of a conventional pressure sensor.

BEST MODE FOR CARRYING OUT THE INVENTION

Preferred embodiments of the present invention are described below with reference to the accompanying drawings.

Figure 1:
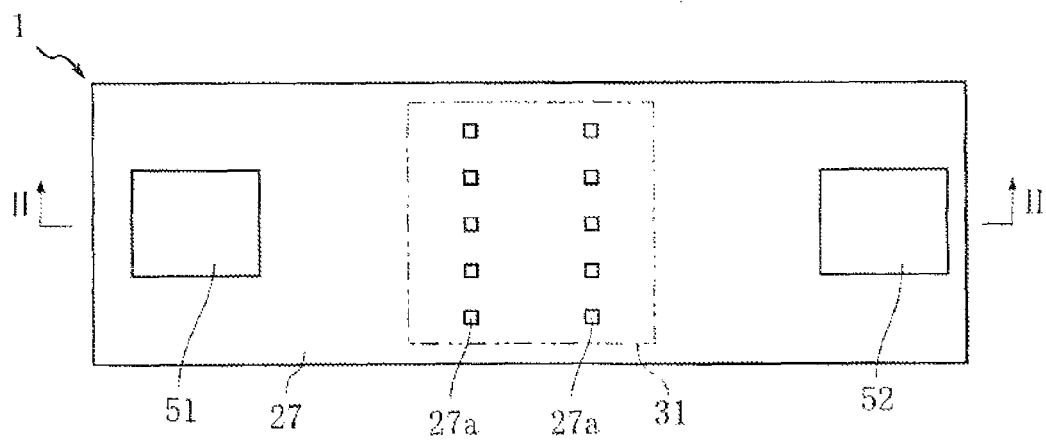
FIG. 1 is a plan view showing a pressure sensor according to a first embodiment of the present invention.
Figure 2:
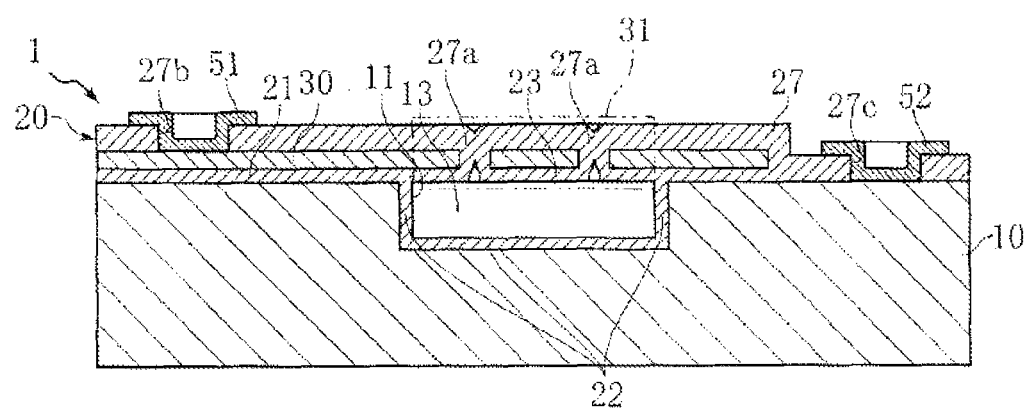
FIG. 2 is a sectional view taken along lines II-II in FIG. 1.

FIGS. 1 and 2 show a pressure sensor according to a first embodiment of the present invention. The pressure sensor 1 of this embodiment comprises a semiconductor substrate 10, and an insulating layer 20 and a semiconductor layer 30 formed on the semiconductor substrate. The pressure sensor is provided with a cavity portion 13, a movable portion 31 and electrodes 51, 52.

The semiconductor substrate 10 is e.g. a single-crystal silicon (Si) substrate and has a recess 11 extending inward in the lamination direction (vertical direction in FIG. 2) at the center. The cavity portion 13 is defined in the recess 11. The cavity portion 13 is in a vacuum state. The dimension of the cavity portion 13 in the vertical direction is e.g. 1 to 5 μm, and that in the horizontal direction is e.g. 100 to 500 μm.

The semiconductor layer 30 is made of e.g. polycrystalline silicon. The semiconductor layer 30 has a thickness of e.g. 2 to 10 μm. The semiconductor layer 30 is formed over the substantially entire surface of the semiconductor substrate 10, except the right end in FIG. 2. It is to be noted that the semiconductor layer 30 is not provided at portions corresponding to vent holes formed in the manufacturing process, which will be described later.

The insulating layer 20 is made of e.g. silicon dioxide ($SiO_2$). The insulating layer 20 is made up of insulating layers 21, 22, 23, 27, which are made in different steps in the manufacturing process, as will be described later.

The insulating layer 21 provides insulation between the semiconductor layer 30 and the semiconductor substrate 10 at portions where the recess 11 is not formed. The thickness of the insulating layer 21 is e.g. 0.3 to 2.0 μm. The insulating layer 22 covers the surface of the recess 11. The thickness of the insulating layer 22 is e.g. 0.3 to 2.0 μm. The insulating layer 23 covers the lower surface of the semiconductor layer 30 which faces the cavity portion 13. The thickness of the insulating layer 23 is e.g. 0.3 to 2.0 μm. The insulating layer 27 covers the semiconductor layer 30 and the right end in FIG. 2 of the surface of the semiconductor substrate 10. The thickness of the insulating layer 27 on the semiconductor layer 30 is e.g. 0.3 to 2.0 μm. The insulating layer 27 includes a plurality of sealing portions 27a which seal the portions corresponding to vent holes 13A formed in the manufacturing process, which will be described later. The sealing portions 27a are concave relative to the surrounding portions. The sealing portions 27a can be made flat by performing CMP (chemical mechanical polishing). The insulating layer 27 has a through-hole 27b penetrating in the lamination direction at the left end in FIG. 27 and a through-hole 27c penetrating in the lamination direction at the right end in FIG. 27.

The electrode 51 is formed to be electrically connected to the semiconductor layer 30 via the through-hole 27b. The electrode 52 is formed to be electrically connected to the semiconductor substrate 10 via the through-hole 27c.

The movable portion 31 comprises a portion of the semiconductor layer 30 which overlaps the cavity portion 13 in the lamination direction, and the insulating layers 23, 27 on and under this portion of the semiconductor layer. The movable portion 31 is movable up and down in the lamination direction.

A method for manufacturing the pressure sensor 1 is described below with reference to FIGS. 3-18.

Figure 3:
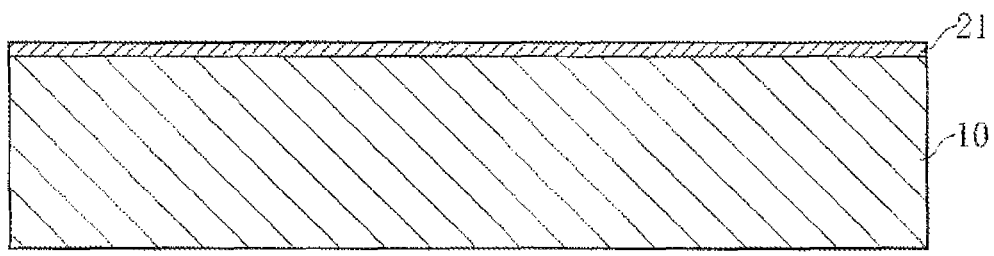
FIG. 3 is a sectional view showing a step of a method for manufacturing the pressure sensor shown in FIG. 2.

First, a semiconductor substrate 10 made of single-crystal silicon is prepared. Specifically, a semiconductor substrate 10 having a thickness of 300 to 700 μm is prepared. In the next step, as shown in FIG. 3, an insulating layer 21 of $SiO_2$ is formed on the surface of the semiconductor substrate 10. This step can be performed by thermally oxidizing the surface of the semiconductor substrate 10.

Figure 4:
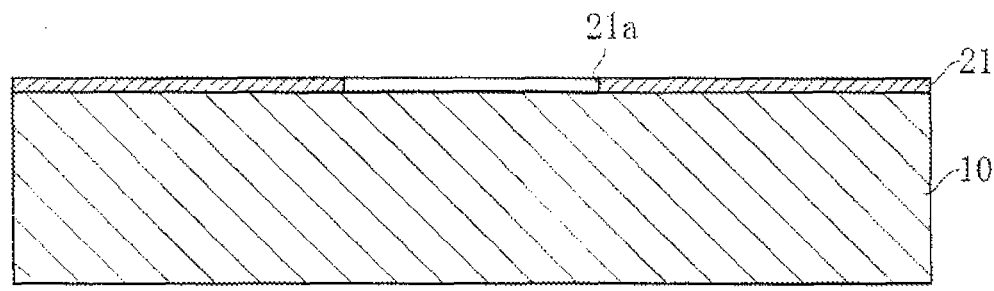
FIG. 4 is a sectional view showing a step subsequent to the step of FIG. 3.

In the next step, as shown in FIG. 4, an opening 21a for exposing the surface of the semiconductor substrate 10 is formed in the insulating layer 21. This step is performed by providing a resist of resin which exposes the portion where the opening 21a is to be formed and performing wet etching using aqueous solution of hydrogen fluoride.

Figure 5:
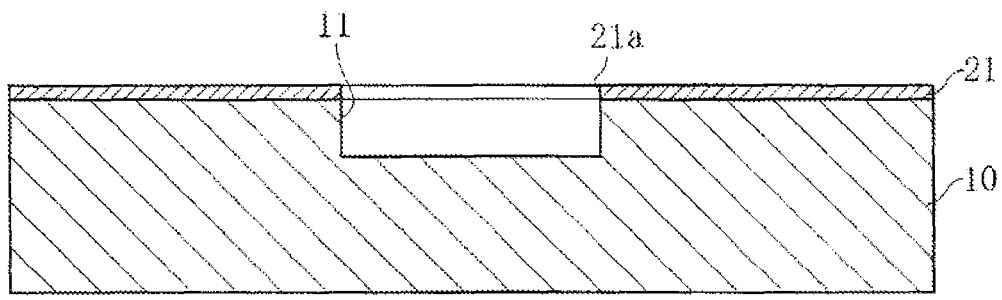
FIG. 5 is a sectional view showing a step subsequent to the step of FIG. 4.

In the next step, a recess 11 is formed in the semiconductor substrate 10, as shown in FIG. 5. This step can be performed by gas-phase etching using gas containing atomic fluorine (F). F reacts with silicon (Si) but does not react with $SiO_2$. Thus, the insulating layer 21 is not etched away, but the semiconductor substrate 10 is etched away at the portion exposed through the opening 21a, whereby the recess 11 is formed. In this step, by adjusting the time of dry etching, the recess 11 of a desired depth can be formed. The gas containing F can be obtained by decomposing carbon tetrafluoride ($CF_4$) gas or sulfur hexafluoride ($SF_6$) gas by discharge.

Figure 6:
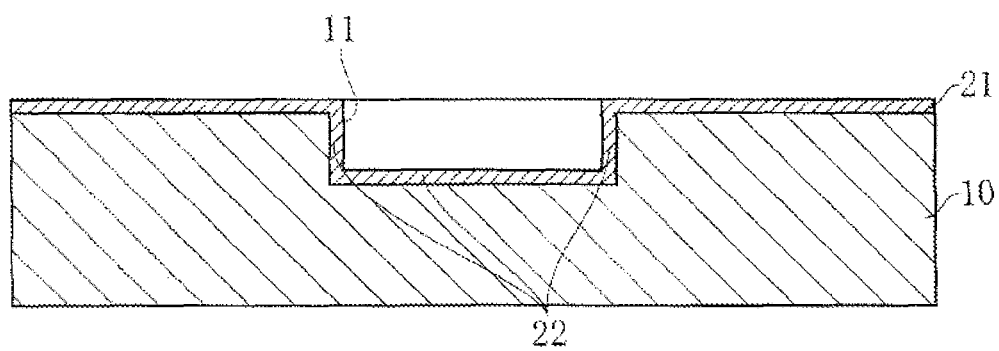
FIG. 6 is a sectional view showing a step subsequent to the step of FIG. 5.

In the next step, an insulating layer 22 is formed, as shown in FIG. 6. This step can be performed by thermally oxidizing the surface of the recess 11.

Figure 7:
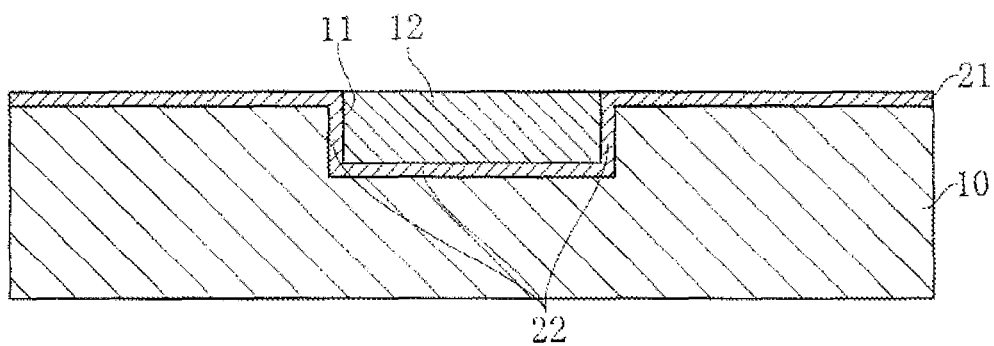
FIG. 7 is a sectional view showing a step subsequent to the step of FIG. 6.

In the next step, as shown in FIG. 7, a sacrificial layer 12 is formed in the recess 11. The sacrificial layer 12 is a layer of polycrystalline silicon. This step is performed by e.g. embedding polycrystalline silicon in the recess 11. The polycrystalline silicon to be embedded in the recess 11 is processed in advance such that the surface of the sacrificial layer 12 is flush with the surface of the insulating layer 21. Alternatively, the polycrystalline silicon may be abraded after being embedded in the recess such that the surface of the sacrificial layer 12 is flush with the surface of the insulating layer 21.

Figure 8:
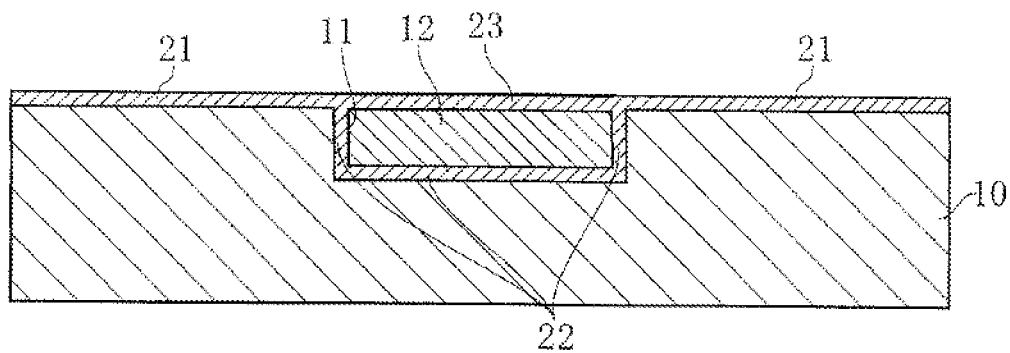
FIG. 8 is a sectional view showing a step subsequent to the step of FIG. 7.

In the next step, an insulating layer 23 of $SiO_2$ is formed, as shown in FIG. 8. This step can be performed by thermally oxidizing the surface of the sacrificial layer 12.

Figure 9:
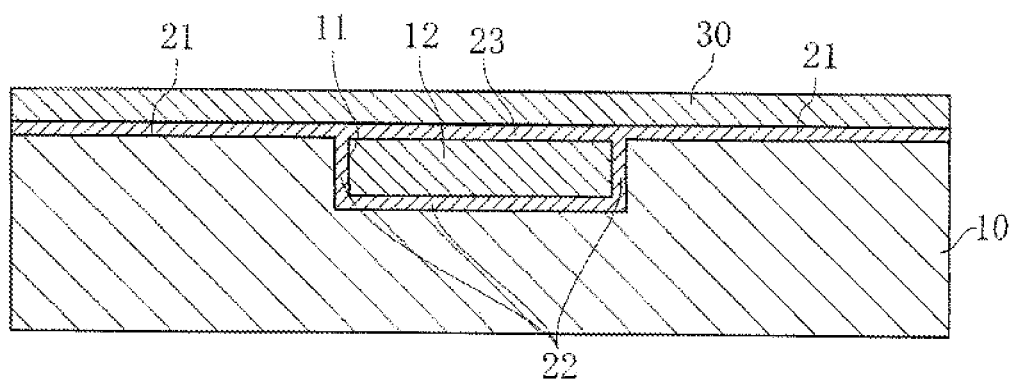
FIG. 9 is a sectional view showing a step subsequent to the step of FIG. 8

In the next step, a semiconductor layer 30 is formed, as shown in FIG. 9. This step can be performed by causing polycrystalline silicon to grow on the surfaces of the insulating layer 21, 23 by e.g. chemical vapor deposition (CVD).

Figure 10:
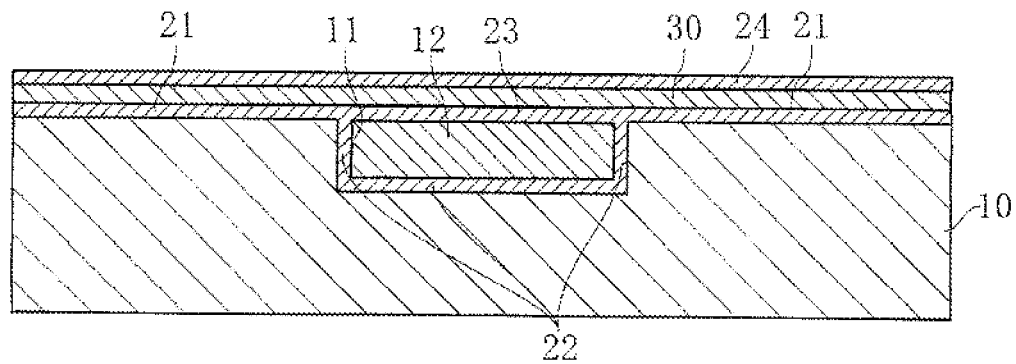
FIG. 10 is a sectional view showing a step subsequent to the step of FIG. 9.

In the next step, an insulating layer 24 of $SiO_2$ is formed on the surface of the semiconductor layer 30, as shown in FIG. 10. For instance, this step can be performed by thermally oxidizing the surface of the semiconductor layer 30.

Figure 11:
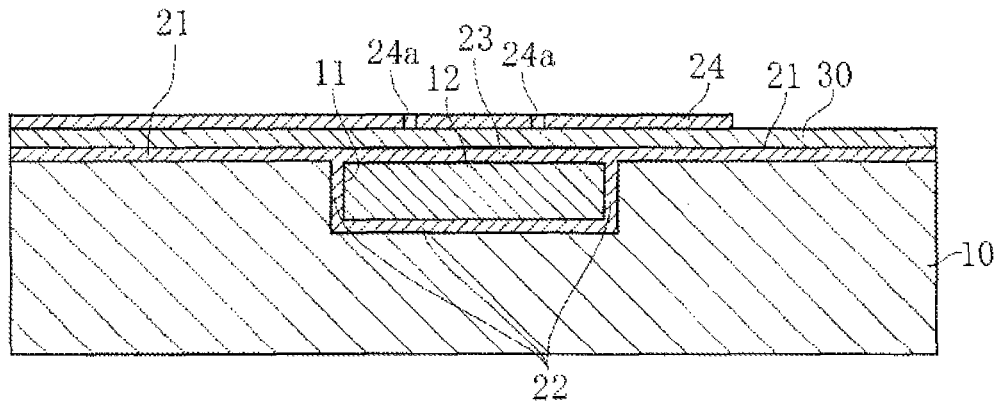
FIG. 11 is a sectional view showing a step subsequent to the step of FIG. 10.

In the next step, a plurality of through-holes 24a are formed in the insulating layer 24, as shown in FIG. 11. At the same time, in this step, the right end in the figure of the insulating layer 24 is removed to expose the right end of the semiconductor layer 30. This step can be performed by gas-phase etching using the reaction between fluorine-containing molecular ions ($HF_2^-$) and $SiO_2$. $HF_2^-$ can be obtained by reacting hydrogen fluoride (HF) with water vapor. HF can be obtained by reacting F or molecular fluorine ($F_2$), which is obtained by e.g. decomposing $CF_4$ gas or $SF_6$ gas, with water vapor. Since Si which is not oxidized does not easily react with $HF_2^-$, the semiconductor layer 30 is not removed by the etching and hence remains.

Figure 12:
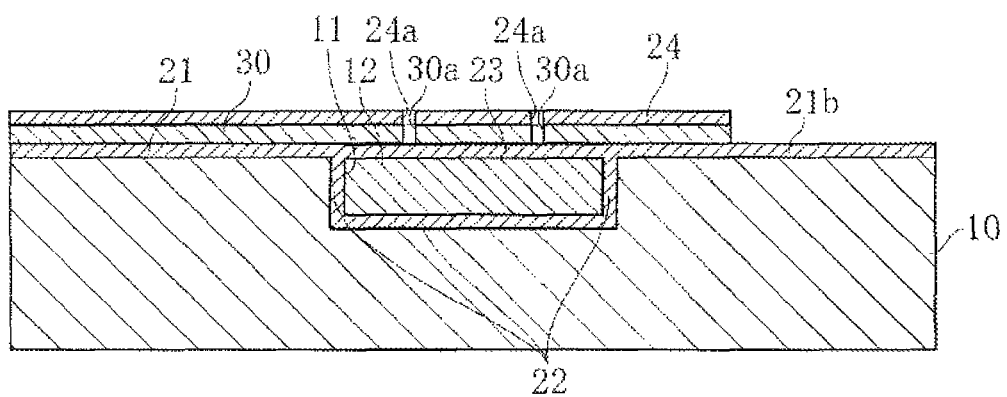
FIG. 12 is a sectional view showing a step subsequent to the step of FIG. 11.

In the next step, as shown in FIG. 12, a plurality of through-holes 30a are formed in the semiconductor layer 30 so that each of the through-holes 30a is connected to a respective one of the through-holes 24a at the upper end and reaches the insulating layer 23 at the lower end. This step can be performed by gas-phase etching using gas containing HF. The gas containing HF can be prepared by e.g. decomposing by discharge a gas obtained by adding water vapor to $CF_4$ gas or $SF_6$ gas. By performing etching while keeping HF in a dry state and suppressing generation of $HF_2^-$, $SiO_2$ is prevented from being etched away. In this step, therefore, the insulating layers 23 and 24 remain. Further, in this step, the right end of the semiconductor layer 30 is removed, so that the insulating layer 21b, which is the right end portion of the insulating layer 21, is exposed.

Figure 13:
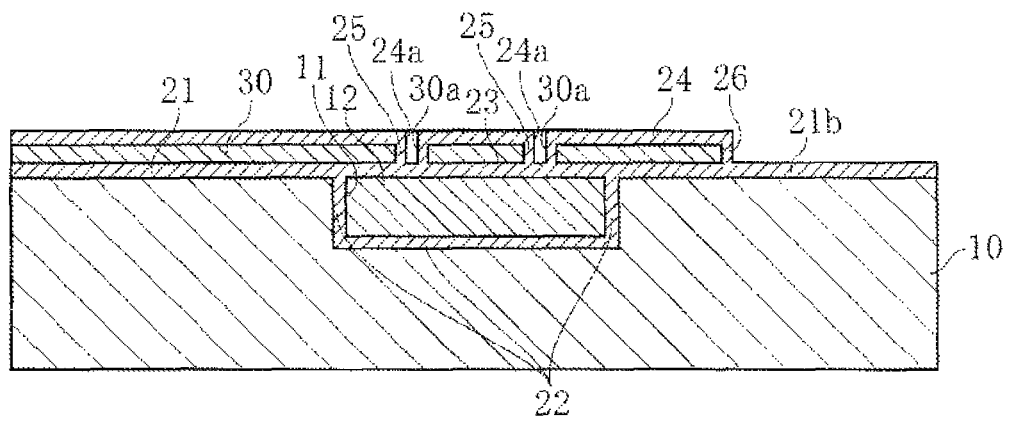
FIG. 13 is a sectional view showing a step subsequent to the step of FIG. 12.

In the next step, insulating layers 25 and 26 of $SiO_2$ are formed, as shown in FIG. 13. The insulating layer 25 is formed on the inner circumferential surface of each of the through-holes 30a. The insulating layer 26 is formed on the semiconductor layer 30 at the portion that is not covered with the insulating layer 21, 24. This step is performed by thermally oxidizing the portion of the semiconductor layer 30 which is not covered with the insulating layer 21, 24.

Figure 14:
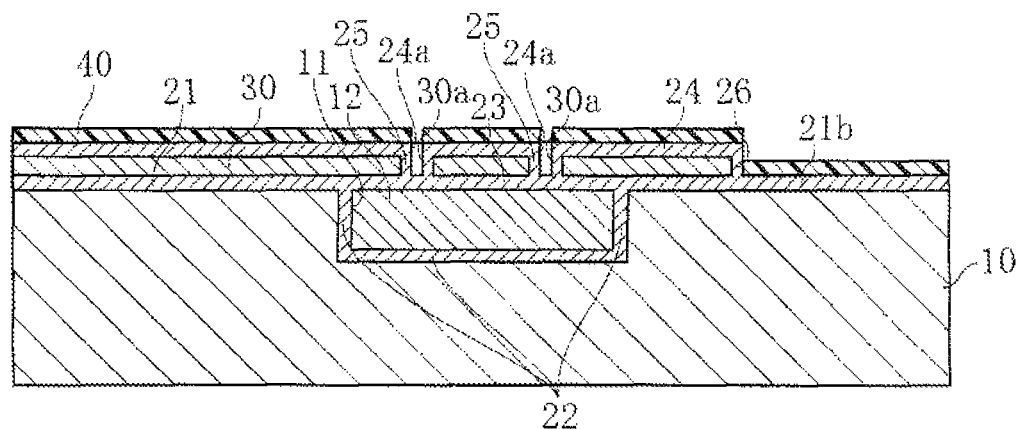
FIG. 14 is a sectional view showing a step subsequent to the step of FIG. 13.

In the next step, a resist 40 is applied, as shown in FIG. 14. The resist 40 is made of e.g. resin and covers the insulating layer 24 and the insulating layer 21b but does not cover the through-holes 24a. This step is performed by applying liquefied resin to the surfaces of the insulating layer 24 and the insulating layer 21b.

Figure 15:
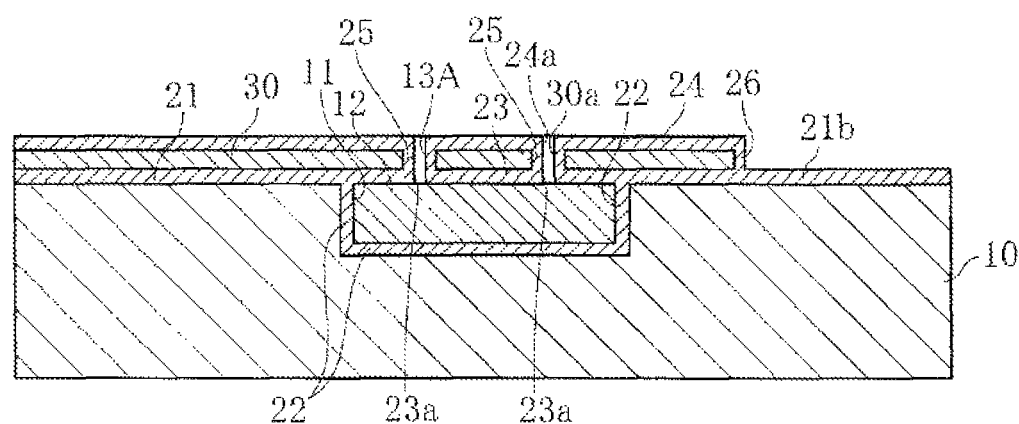
FIG. 15 is a sectional view showing a step subsequent to the step of FIG. 14.

In the next step, vent holes 13A are formed, as shown in FIG. 15. The vent holes 13A are made by forming through-holes 23a in the insulating layer 23 such that each of the through-holes 23a is connected to one of the through-holes 24a and one of the through-hole 30a. This step can be performed by gas-phase etching using the reaction between $HF_2^-$ and $SiO_2$. In this step, after the vent holes 13A are formed, the resist 40 is removed.

Figure 16:
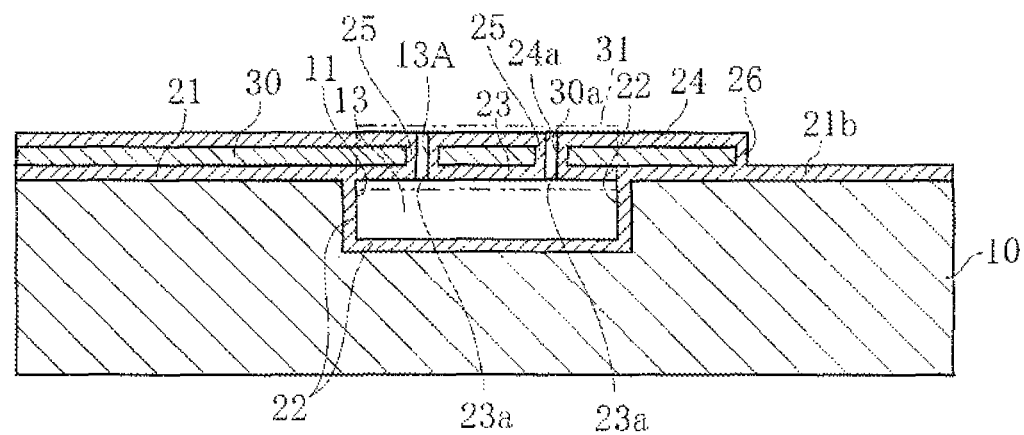
FIG. 16 is a sectional view showing a step subsequent to the step of FIG. 15.

In the next step, a cavity portion 13 is formed by removing the sacrificial layer 12, as shown in FIG. 16. The removal of the sacrificial layer 12 is performed by gas-phase etching, i.e., sending gas containing F to the sacrificial layer 12 through the vent holes 13A. F can be obtained by e.g. decomposing $CF_4$ gas or $SF_6$ gas. Since F does not easily react with $SiO_2$, the insulating layers 21, 22, 23, 24, 25, 26 remain in this step, and the semiconductor substrate 10 and the semiconductor layer 30 protected by these insulating layers also remain. By forming the cavity portion 13 in this way, the portion of the semiconductor layer 30 which overlaps the cavity portion 13 as viewed in the lamination direction and the insulating layers 23, 24 on and under this portion become the movable portion 31.

Figure 17:
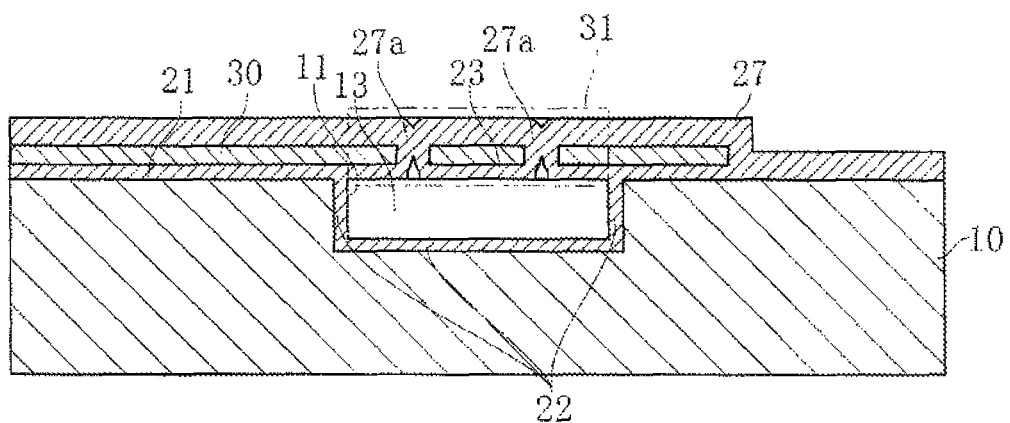
FIG. 17 is a sectional view showing a step subsequent to the step of FIG. 16.

In the next step, an insulating layer 27 and sealing portions 27a are formed, as shown in FIG. 17. In this step, for instance, plasma CVD is performed in a vacuum atmosphere. In this step, $SiO_2$ is further deposited on the insulating layers 21b, 24, 25, 26. As a result of deposition of $SiO_2$ on the insulating layer 25, the vent holes 13A are sealed to become sealing portions 27a. As a result of deposition of $SiO_2$ on the insulating layers 21b, 24, 26, the insulating layer 27 is provided.

Figure 18:
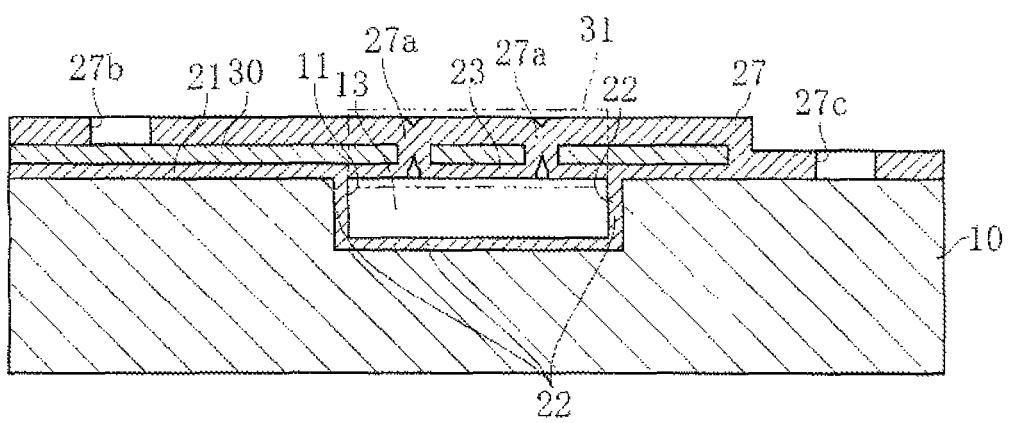
FIG. 18 is a sectional view showing a step subsequent to the step of FIG. 17.

In the next step, through-holes 27b and 27c are formed, as shown in FIG. 18. Specifically, the through-holes 27b and 27c are formed by providing a resist of resin such that the portions where the through-holes 27b and 27c are to be formed are exposed and performing wet etching using aqueous solution of hydrogen fluoride or gas-phase etching using the reaction between $HF_2^-$ and $SiO_2$. The through-hole 27b reaches the semiconductor layer 30, and the through-hole 27c reaches the semiconductor substrate 10.

After the above-described steps, electrodes 51 and 52 are provided, whereby the pressure sensor 1 shown in FIGS. 1 and 2 is completed. For instance, the electrodes 51 and 52 are provided by forming an aluminum (Al) layer in the through-holes 27b, 27c and on the insulating layer 27 and removing unnecessary portions of the Al layer by etching.

The operation and advantages of the pressure sensor 1 are described below.

According to this embodiment, when the movable portion 31 moves up and down, the capacitance between the semiconductor substrate 10 and the semiconductor layer 30 changes. The pressure sensor 1 detects such changes in capacitance between the semiconductor substrate 10 and the semiconductor layer 30 to detect changes in pressure applied to the movable portion 31. Since the cavity portion 13 is in a vacuum state, the pressure sensor 1 is suitable for measuring e.g. the absolute pressure applied to the movable portion 31.

According to the present invention, the cavity portion 13 is surrounded by the insulating layers 22 and 23. Thus, in the pressure sensor 1, the capacitance between the semiconductor substrate 10 and the semiconductor layer 30 is relatively large. A larger capacitance between the semiconductor substrate 10 and the semiconductor layer 30 allows more sensitive detection of changes in the capacitance. Thus, the pressure sensor 1 ensures more precise pressure measurement.

Further, according to this embodiment, the recess 11 is formed by etching, and the bottom of the recess 11 is made parallel to the surface of the semiconductor substrate 10. Further, the semiconductor layer 30 is formed on the insulating layer 21 formed by oxidizing the surface of the semiconductor substrate 10 and on the insulating layer 23 formed to conform to the insulating substrate 21. Accordingly, in the pressure sensor 1, the bottom surface of the recess 11 and the semiconductor layer 30 are parallel to each other, with the cavity portion 13 intervening between them. This arrangement allows the capacitance between the semiconductor substrate 10 and the semiconductor layer 30 to be set precisely to a predetermined value. Thus, the pressure sensor 1 ensures more precise pressure measurement.

Moreover, according to the above-described manufacturing method, the pressure sensor 1 is produced from a single semiconductor substrate 10. Thus, the pressure sensor 1 realizes a simple manufacturing process and a low manufacturing cost.

Moreover, according to the above-described manufacturing method, the recess 11 having a desired depth can be made easily by adjusting the etching time, so that the dimension in the vertical direction of the cavity portion 13 can be set to a desirable value. Further, according to this manufacturing method, the thickness of the semiconductor layer 30 can be adjusted properly by adjusting the time period for performing CVD, so that the thickness of the semiconductor layer 30 can be set to a desired value.

In this embodiment, the recess 11 is formed by etching the semiconductor substrate 10. However, unlike this, the recess 11 may be formed by allowing single-crystal silicon to grow on portions of the semiconductor substrate 10 other than the center portion. The sealing of the vent holes 13A can be performed by a LP-CVD method.

Figure 19:
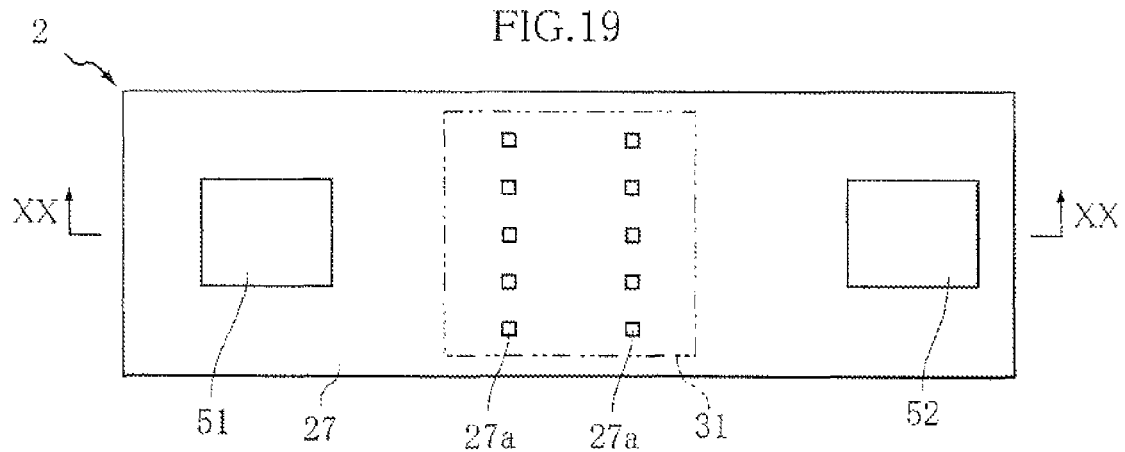
FIG. 19 is a plan view showing a pressure sensor according to a second embodiment of the present invention.
Figure 20:
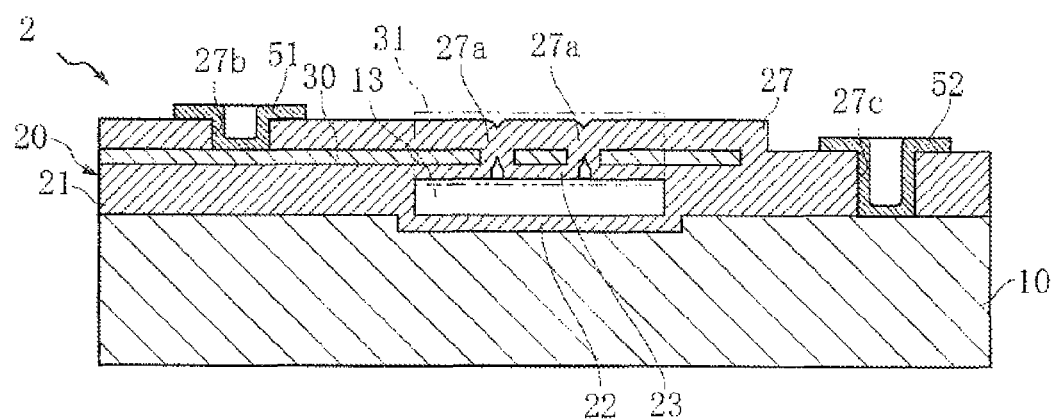
FIG. 20 is a sectional view taken along lines XX-XX in FIG. 19.

FIGS. 19 and 20 show a pressure sensor according to a second embodiment of the present invention. The pressure sensor 2 of this embodiment is made up of a semiconductor substrate 10, and an insulating layer 20 and a semiconductor layer 30 formed on the semiconductor substrate. The pressure sensor is provided with a cavity portion 13, a movable portion 31 and electrodes 51, 52.

The semiconductor substrate 10 is e.g. a single-crystal silicon (Si) substrate. The center of the surface of the semiconductor substrate 10 is thermally oxidized to be formed with an insulating layer 22. The insulating layer 22 has a thickness of e.g. 0.3 to 1 μm.

The semiconductor layer 30 is made of e.g. polycrystalline silicon (Si) and formed on the semiconductor substrate 10, with the insulating layer 21 or 23, which will be described later, intervening between them. The semiconductor layer 30 has a thickness of e.g. 2 to 10 μm. The semiconductor layer 30 is formed over the substantially entire surface of the semiconductor substrate 10, except the right end in FIG. 20. It is to be noted that the semiconductor layer 30 is not provided at portions corresponding to vent holes 13A formed in the manufacturing process, which will be described below.

The insulating layer 20 is made of e.g. silicon dioxide ($SiO_2$). The insulating layer 20 is made up of insulating layers 21, 22, 23, 27, which are made in different steps in the manufacturing process as will be described later, and has a vacuum cavity portion 13 in it. As noted before, the insulating layer 22 is provided on the surface of the semiconductor substrate 10.

The insulating layer 21 provides insulation between the semiconductor substrate 10 and the semiconductor layer 30. The insulating layer 21 is not provided on the semiconductor layer 10 at the portion where the insulating layer 22 is provided. The thickness of the insulating layer 21 is e.g. 1 to 2 μm. The insulating layer 23 is provided on the lower surface of the semiconductor layer 30 to cover the portions of the lower surface which are not in contact with the insulating layer 21. The thickness of the insulating layer 23 is e.g. 0.3 to 0.5 μm. The cavity portion 13 is in the form of a rectangular parallelepiped and provided inside the insulating layer 21 to be sandwiched between the semiconductor layers 22 and 23 in the vertical direction. The dimension of the cavity portion 13 in the vertical direction is e.g. 1 to 1.7 μm, and that in the horizontal direction is e.g. 300 to 500 μm. The insulating layer 27 covers the semiconductor layer 30 and the right end in FIG. 20 of the semiconductor substrate 10. The thickness of the insulating layer 27 on the semiconductor layer 30 is e.g. 0.3 to 0.5 μm. The insulating layer 27 includes a plurality of sealing portions 27a which seal the portions corresponding to vent holes 13A formed in the manufacturing process, which will be described later. The sealing portions 27a are formed to be concave relative to the surrounding portions. The sealing portions 27a can be made flat by CMP. The insulating layer 27 includes a through-hole 27b penetrating in the lamination direction at the left end in FIG. 27 and a through-hole 27c penetrating in the lamination direction at the right end in FIG. 27.

The electrode 51 is formed to be electrically connected to the semiconductor layer 30 via the through-hole 27b. The electrode 52 is formed to be electrically connected to the semiconductor substrate 10 via the through-hole 27c.

The movable portion 31 comprises a portion of the semiconductor layer 30 which overlaps the cavity portion 13 in the lamination direction, and portions of the insulating layers 23, 27 on and under this portion of the semiconductor layer. The movable portion 31 is movable up and down in the lamination direction.

A method for manufacturing the pressure sensor 2 is described below with reference to FIGS. 21-35.

Figure 21:
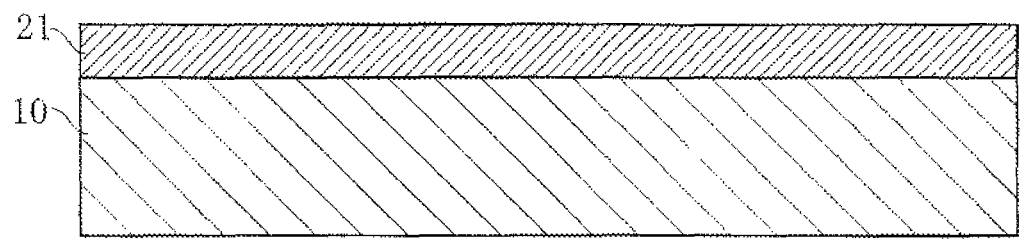
FIG. 21 is a sectional view showing a step of a method for manufacturing the pressure sensor shown in FIG. 20.

First, a semiconductor substrate 10 made of single-crystal silicon is prepared. Specifically, a semiconductor substrate 10 having a thickness of 300 to 700 μm is prepared. In the next step, as shown in FIG. 21, an insulating layer 21 of $SiO_2$ is formed on the surface of the semiconductor substrate 10. This step can be performed by thermally oxidizing the upper surface of the semiconductor substrate 10. In this step, the upper surface of the semiconductor substrate 10 can be heated uniformly so that the thickness of the insulating layer 21 is uniform. Moreover, in this step, the thickness of the insulating layer 21 can be adjusted appropriately by adjusting the heating time.

Figure 22:
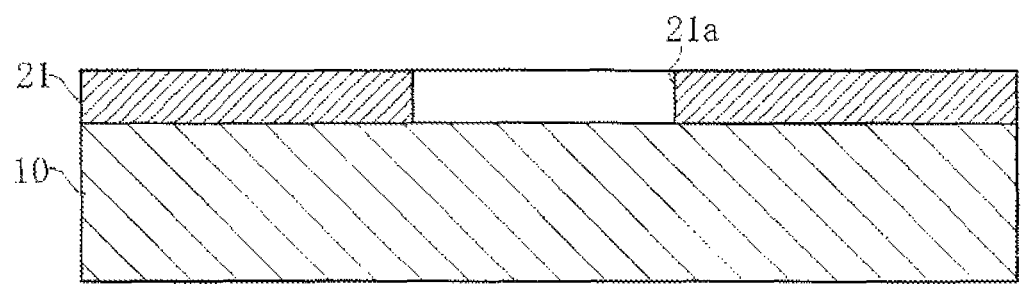
FIG. 22 is a sectional view showing a step subsequent to the step of FIG. 21.

In the next step, as shown in FIG. 22, an opening 21a for exposing the surface of the semiconductor substrate 10 is formed in the insulating layer 21. This step is performed by providing a resist of resin which exposes the portion where the opening 21a is to be formed and performing wet etching using aqueous solution of hydrogen fluoride. Alternatively, this step can be performed by gas-phase etching using the reaction between fluorine-containing molecular ions ($HF_2^-$) and $SiO_2$. $HF_2^-$ can be obtained by reacting hydrogen fluoride (HF) with water vapor. HF can be obtained by reacting F or molecular fluorine ($F_2$), which is obtained by e.g. decomposing by discharge carbon tetrafluoride ($CF_4$) gas or sulfur hexafluoride ($SF_6$) gas, with water vapor. Since Si which is not oxidized does not easily react with $HF_2^-$, the semiconductor substrate 10 is not removed by the etching.

Figure 23:
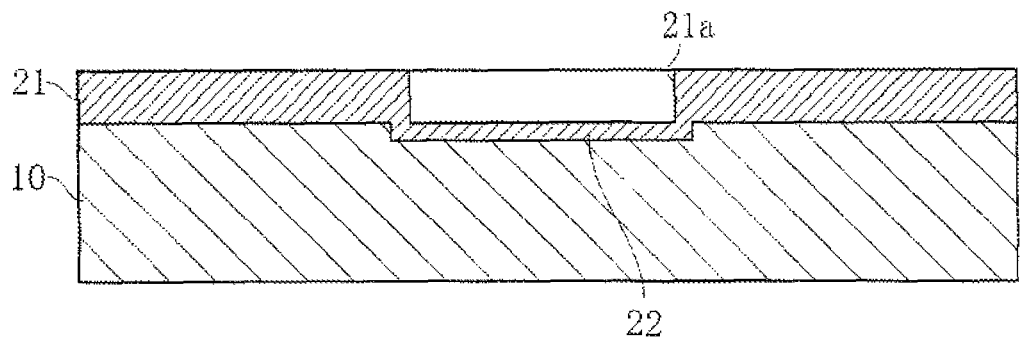
FIG. 23 is a sectional view showing a step subsequent to the step of FIG. 22.

In the next step, an insulating layer 22 is formed, as shown in FIG. 23. This step can be performed by thermally oxidizing the portion of the semiconductor substrate 10 which is exposed through the opening 21a.

Figure 24:
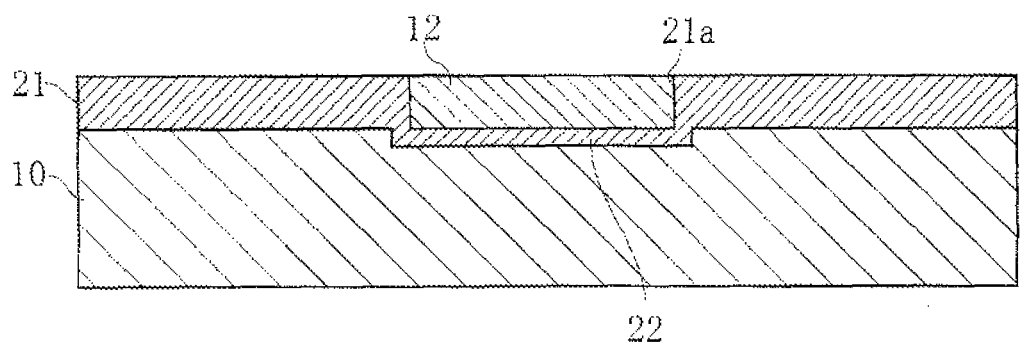
FIG. 24 is a sectional view showing a step subsequent to the step of FIG. 23.

In the next step, as shown in FIG. 24, a sacrificial layer 12 is formed. The sacrificial layer 12 is a layer of polycrystalline silicon. This step is performed by e.g. embedding polycrystalline silicon in the opening 21a. The polycrystalline silicon to be embedded in the opening 21a is processed in advance such that the surface of the sacrificial layer 12 is flush with the surface of the insulating layer 21.

Figure 25:
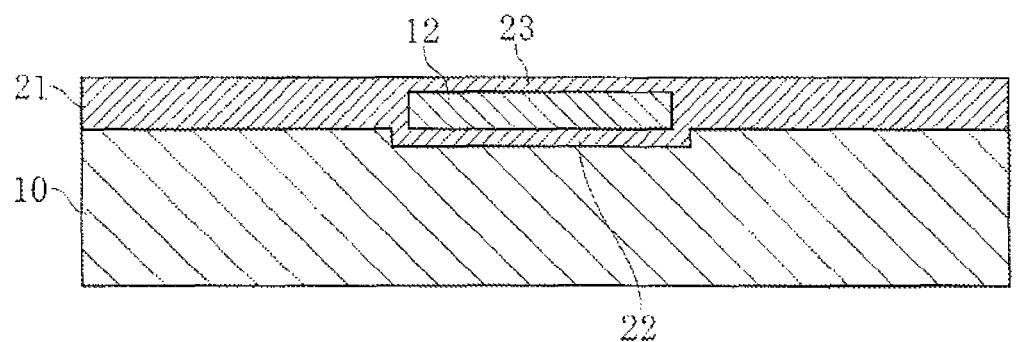
FIG. 25 is a sectional view showing a step subsequent to the step of FIG. 24.

In the next step, as shown in FIG. 25, an insulating layer 23 of $SiO_2$ is formed. This step can be performed by thermally oxidizing the surface of the sacrificial layer 12. By this step, the sacrificial layer 12 is enclosed by the insulating layers 21, 22, 23.

Figure 26:
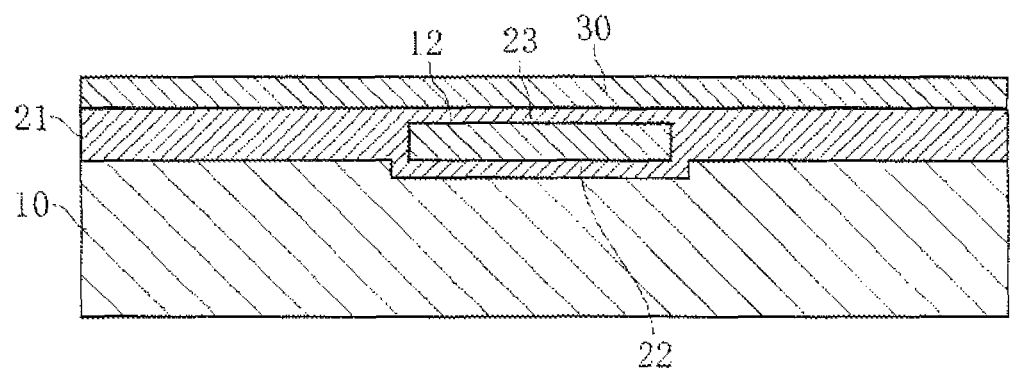
FIG. 26 is a sectional view showing a step subsequent to the step of FIG. 25.

In the next step, a semiconductor layer 30 is formed, as shown in FIG. 26. This step can be performed by causing polycrystalline silicon to grow on the surfaces of the insulating layer 21, 23 by e.g. chemical vapor deposition (CVD).

Figure 27:
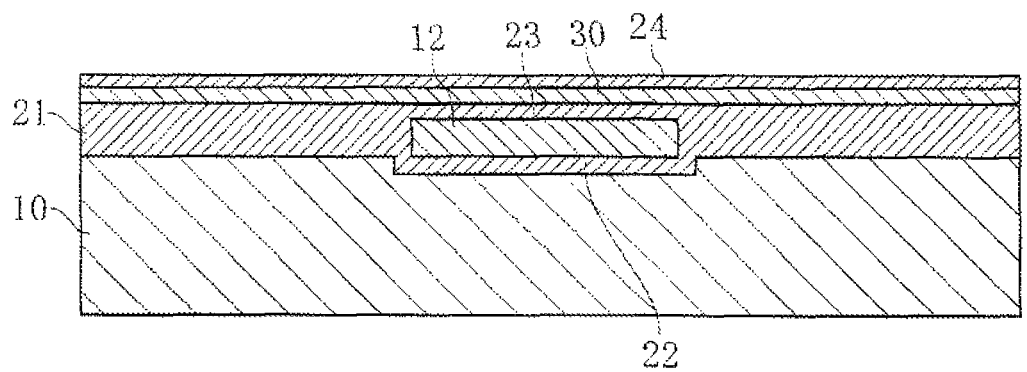
FIG. 27 is a sectional view showing a step subsequent to the step of FIG. 26.

In the next step, as shown in FIG. 27, an insulating layer 24 of $SiO_2$ is formed on the surface of the semiconductor layer 30. This step can be performed by thermally oxidizing the surface of the semiconductor layer 30.

Figure 28:
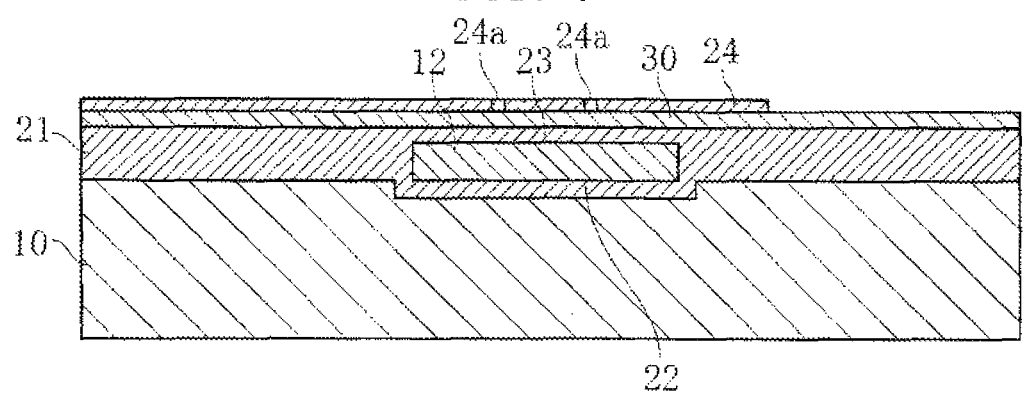
FIG. 28 is a sectional view showing a step subsequent to the step of FIG. 27.

In the next step, a plurality of through-holes 24a are formed in the insulating layer 24, as shown in FIG. 28. At the same time, in this step, the right end in the figure of the insulating layer 24 is removed to expose the right end of the semiconductor layer 30. This step can be performed by gas-phase etching using the reaction between fluorine-containing molecular ions ($HF_2^-$) and $SiO_2$. $HF_2^-$ can be obtained by reacting hydrogen fluoride (HF) with water vapor. HF can be obtained by reacting atomic fluorine (F) or molecular fluorine ($F_2$), which is obtained by e.g. decomposing $CF_4$ gas or $SF_6$ gas, with water vapor. Since Si which is not oxidized does not easily react with $HF_2^-$, the semiconductor layer 30 is not removed by the etching and hence remains.

Figure 29:
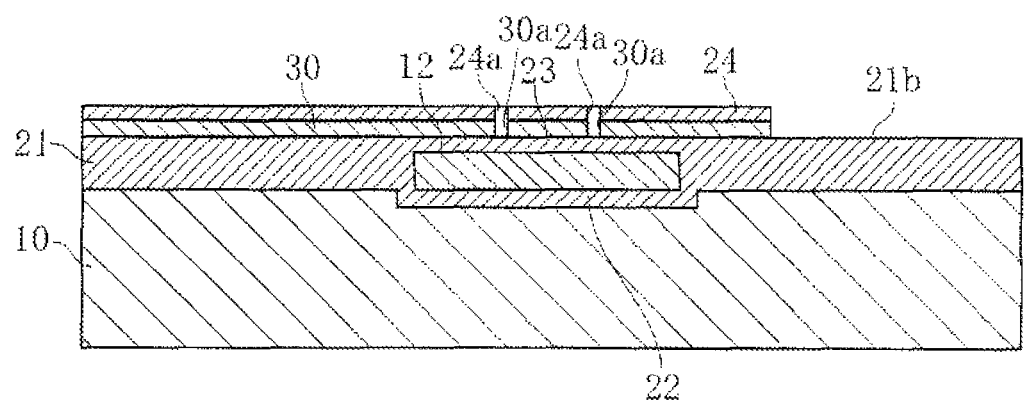
FIG. 29 is a sectional view showing a step subsequent to the step of FIG. 28.

In the next step, as shown in FIG. 29, a plurality of through-holes 30a are formed in the semiconductor layer 30 so that each of the through-holes 30a is connected to a respective one of the through-holes 24a at the upper end and reaches the insulating layer 23 at the lower end. This step can be performed by gas-phase etching using gas containing HF. The gas containing HF can be prepared by e.g. decomposing by discharge a gas obtained by adding water vapor to $CF_4$ gas or $SF_6$ gas. By performing etching while keeping HF in a dry state and suppressing generation of $HF_2^-$, $SiO_2$ is prevented from being etched away. In this step, therefore, the insulating layers 23 and 24 remain. Further, in this step, the right end of the semiconductor layer 30 is removed, so that the insulating layer 21b, which is the right end portion of the insulating layer 21, is exposed.

Figure 30:
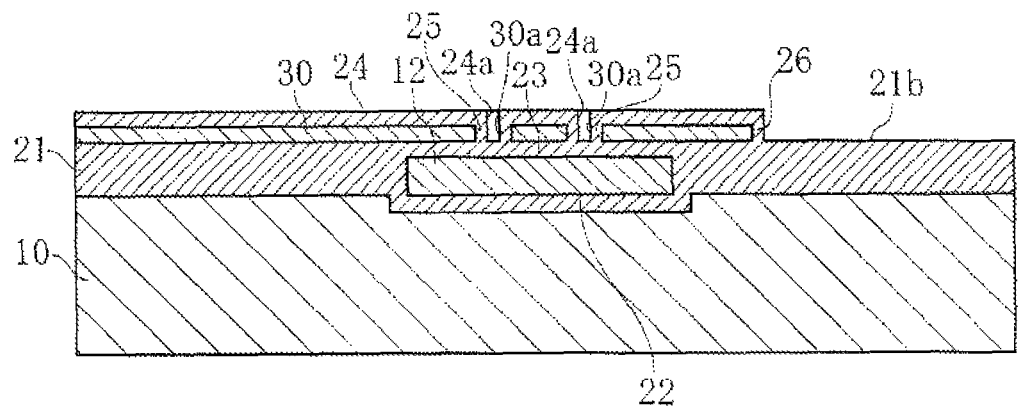
FIG. 30 is a sectional view showing a step subsequent to the step of FIG. 29.

In the next step, insulating layers 25 and 26 of $SiO_2$ are formed, as shown in FIG. 30. The insulating layer 25 is formed on the inner circumferential surface of each of the through-holes 30a. The insulating layer 26 is formed on the semiconductor layer 30 at the portion that is not covered with the insulating layers 21, 24. This step is performed by thermally oxidizing the portion of the semiconductor layer 30 which is not covered with the insulating layers 21, 24.

Figure 31:
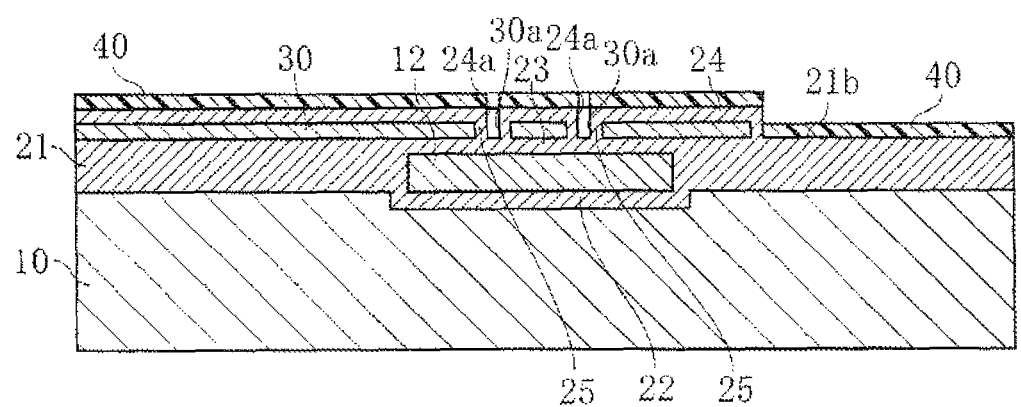
FIG. 31 is a sectional view showing a step subsequent to the step of FIG. 30.

In the next step, a resist 40 is applied, as shown in FIG. 31. The resist 40 is made of e.g. resin and covers the insulating layer 24 and the insulating layer 21b but does not cover the through-holes 24a. This step is performed by applying liquefied resin to the surfaces of the insulating layer 24 and the insulating layer 21b.

Figure 32:
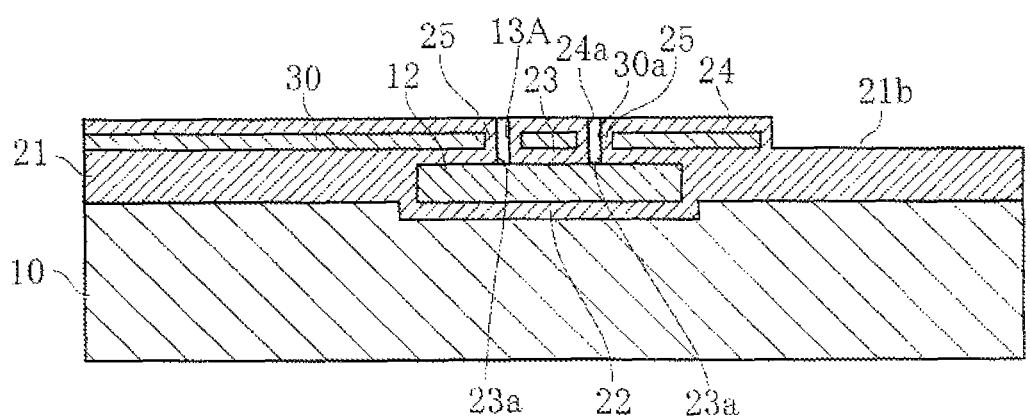
FIG. 32 is a sectional view showing a step subsequent to the step of FIG. 31.

In the next step, vent holes 13A are formed, as shown in FIG. 32. The vent holes 13A are made by forming through-holes 23a in the insulating layer 23 such that each of the through-holes 23a is connected to one of the through-holes 24a and one of the through-hole 30a. This step can be performed by gas-phase etching using the reaction between $HF_2^-$ and $SiO_2$. In this step, the resist 40 is removed after the vent holes 13A are formed.

Figure 33:
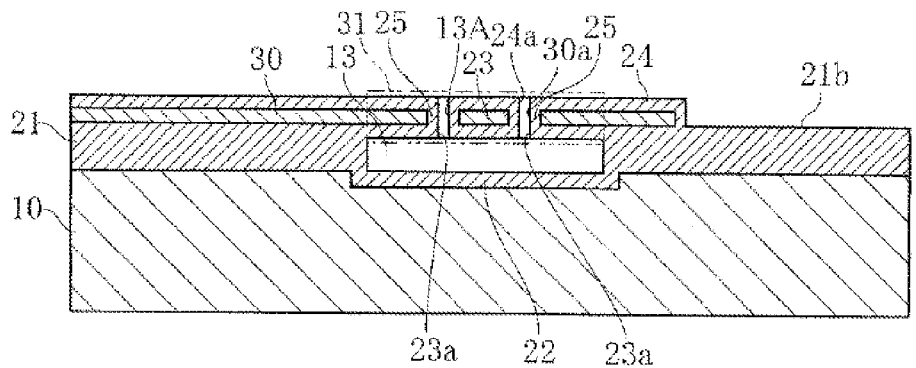
FIG. 33 is a sectional view showing a step subsequent to the step of FIG. 32.

In the next step, a cavity portion 13 is formed, as shown in FIG. 33. This is performed by removing the sacrificial layer 12. The removal of the sacrificial layer 12 is performed by gas-phase etching, i.e., sending gas containing F to the sacrificial layer 12 through the vent holes 13A. F can be obtained by e.g. decomposing $CF_4$ gas or $SF_6$ gas. Since F does not easily react with $SiO_2$, the insulating layers 21, 22, 23, 24, 25, 26 remain in this step, and the semiconductor substrate 10 and the semiconductor layer 30 protected by these insulating layers also remain. By forming the cavity portion 13 in this way, the portion of the semiconductor layer 30 which overlaps the cavity portion 13 as viewed in the lamination direction and the insulating layers 23, 24 on and under this portion become the movable portion 31.

Figure 34:
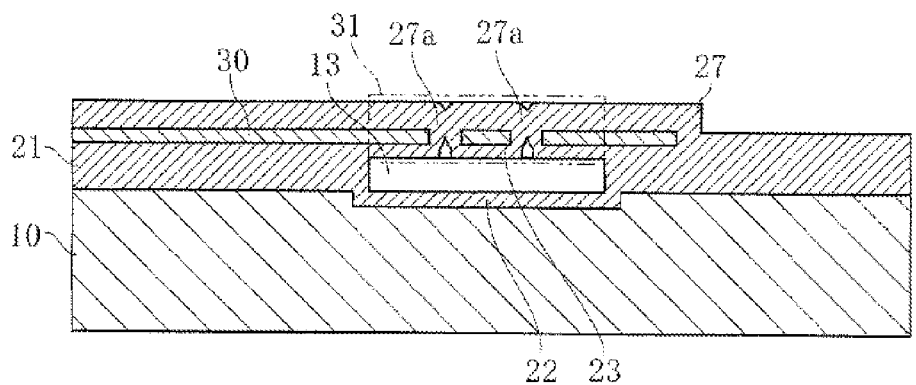
FIG. 34 is a sectional view showing a step subsequent to the step of FIG. 33.

In the next step, an insulating layer 27 and sealing portions 27a are formed, as shown in FIG. 34. In this step, for instance, plasma CVD is performed in a vacuum atmosphere. In this step, $SiO_2$ is further deposited on the insulating layers 21b, 24, 25, 26. As a result of deposition of $SiO_2$ on the insulating layer 25, the vent holes 13A are sealed to become sealing portions 27a. As a result of deposition of $SiO_2$ on the insulating layers 21b, 24, 26, the insulating layer 27 is provided.

Figure 35:
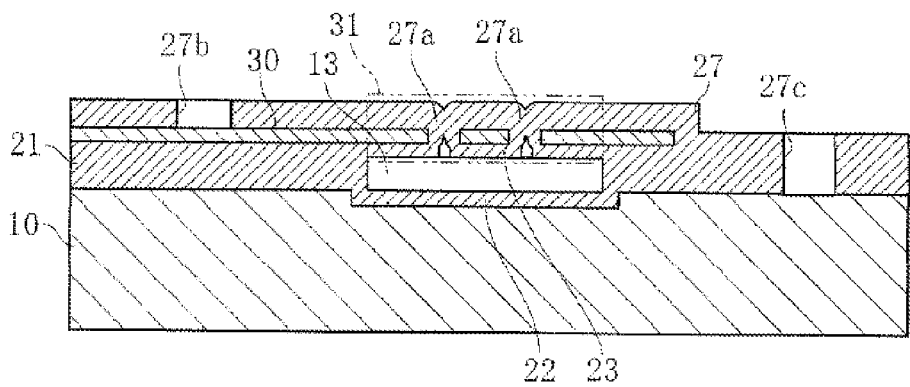
FIG. 35 is a sectional view showing a step subsequent to the step of FIG. 34.

In the next step, through-holes 27b and 27c are formed, as shown in FIG. 35. Specifically, the through-holes 27b and 27c are formed by providing a resist of resin such that the portions where the through-holes 27b and 27c are to be formed are exposed and performing wet etching using aqueous solution of hydrogen fluoride or gas-phase etching using the reaction between $HF_2^-$ and $SiO_2$. The through-hole 27b reaches the semiconductor layer 30, and the through-hole 27c reaches the semiconductor substrate 10.

After the above-described steps, electrodes 51 and 52 are provided, whereby the pressure sensor 2 shown in FIGS. 19 and 20 is completed. For instance, the electrodes 51 and 52 are provided by forming an Al layer in the through-holes 27b, 27c and on the insulating layer 27 and then removing unnecessary portions of the Al layer by etching.

The operation and advantages of the pressure sensor 2 are described below.

According to this embodiment, when the movable portion 31 moves up and down, the capacitance between the semiconductor substrate 10 and the semiconductor layer 30 changes. The pressure sensor 2 detects such changes in capacitance between the semiconductor substrate 10 and the semiconductor layer 30 to detect changes in pressure applied to the movable portion 31. Since the cavity portion 13 is in a vacuum state, the pressure sensor 1 is suitable for measuring e.g. the absolute pressure applied to the movable portion 31.

According to the present invention, the cavity portion 13 is surrounded by the insulating layers 21, 22 and 23. Thus, in the pressure sensor 2, the capacitance between the semiconductor substrate 10 and the semiconductor layer 30 is relatively large. A larger capacitance between the semiconductor substrate 10 and the semiconductor layer 30 allows more sensitive detection of changes in the capacitance. Thus, the pressure sensor 2 ensures more precise pressure measurement.

Further, according to this embodiment, the insulating layer 22 is formed by oxidizing part of the surface of the semiconductor substrate 10, so that it is easy to make the thickness of the insulating layer uniform. The semiconductor layer 30 is formed on the insulating layers 21 and 23 which are made flush with each other. Thus, in the pressure sensor 2, the semiconductor substrate 10 and the semiconductor layer 30 are parallel to each other, with the cavity portion 13 intervening between them. This arrangement allows the capacitance between the semiconductor substrate 10 and the semiconductor layer 30 to be set precisely to a predetermined value. Thus, the pressure sensor 2 ensures more precise pressure measurement.

Moreover, according to the above-described manufacturing method, the pressure sensor 2 is produced from a single semiconductor substrate 10. Thus, the pressure sensor 2 realizes a simple manufacturing process and a low manufacturing cost.

Moreover, according to the above-described manufacturing method, the dimension in the vertical direction of the cavity portion 13 depends on the thickness of the insulating layer 21, and the thickness of the insulating layer 21 can be adjusted relatively easily by adjusting the time period for performing thermal oxidization. Further, according to this manufacturing method, the thickness of the semiconductor layer 30 can be adjusted properly by adjusting the time period for performing CVD, so that the thickness of the semiconductor layer 30 can be set to a desired value.

Although the sealing of the vent holes 13A is performed by plasma CVD in the above-described embodiment, the sealing can be performed by e.g. low pressure chemical vapor deposition (LPCVD).

Figure 36:
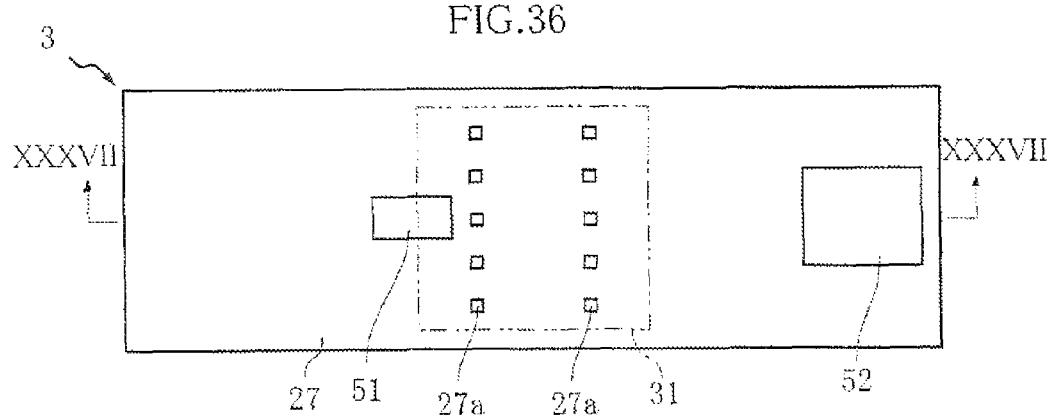
FIG. 36 is a plan view showing a pressure sensor according to a third embodiment of the present invention.
Figure 37:
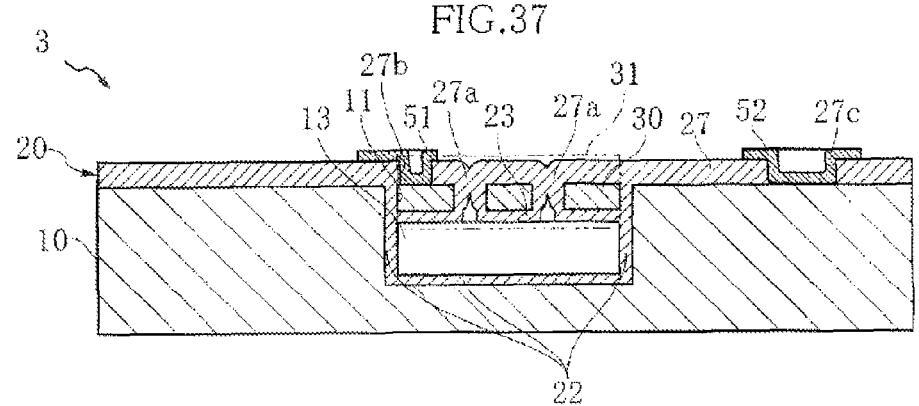
FIG. 37 is a sectional view taken along lines XXXVII-XXXVII in FIG. 36.

FIGS. 36 and 37 show a pressure sensor according to a third embodiment of the present invention. The pressure sensor 3 of this embodiment is made up of a semiconductor substrate 10, and an insulating layer 20 and a semiconductor layer 30 laminated on the semiconductor substrate. The pressure sensor is provided with a cavity portion 13, a movable portion 31 and electrodes 51, 52.

The semiconductor substrate 10 is e.g. a single-crystal silicon (Si) substrate and has a recess 11 extending inward in the lamination direction (vertical direction in FIG. 37) at the center. The depth of the recess 11 is e.g. 5 to 15 μm. The cavity portion 13 and the semiconductor layer 30 are provided in the recess 11. The cavity portion 13 is in a vacuum state and provided adjacent to the bottom of the recess 11. The dimension of the cavity portion 13 in the vertical direction is e.g. 2 to 5 μm, and that in the horizontal direction is e.g. 300 to 500 μm. The semiconductor layer 30 is made of e.g. polycrystalline silicon and provided in such a manner as to close the recess 11. The semiconductor layer 30 has a thickness of e.g. 2 to 10 μm. The surface of the semiconductor layer 30 is made flush with the semiconductor substrate 10 at portions other than the portion where the recess 11 is provided.

The insulating layer 20 is made of e.g. silicon dioxide ($SiO_2$). The insulating layer 20 is made up of insulating layers 22, 23, 27, which are made in different steps in the manufacturing process, as will be described later.

The insulating layer 22 covers the surface of the recess 11 which faces the cavity portion 13. The thickness of the insulating layer 22 is e.g. 0.3 to 1.0 μm. The insulating layer 23 covers the surface of the semiconductor layer 30 which faces the cavity portion 13. The thickness of the insulating layer 23 is e.g. 0.3 to 1.0 μm. The insulating layer 27 covers the surface of the semiconductor substrate 10 and the surface of the semiconductor layer 30. The thickness of the insulating layer 27 is e.g. 1 to 2 μm. The insulating layer 27 includes a plurality of sealing portions 27a which seal the portions corresponding to vent holes 13A formed in the manufacturing process, which will be described later. The sealing portions 27a are formed to be concave relative to the surrounding portions. The sealing portions 27a can be made flat by CMP. The insulating layer 27 includes a through-hole 27b penetrating in the lamination direction at the center in FIG. 37 and a through-hole 27c penetrating in the lamination direction at the right side in FIG. 37.

The electrode 51 is formed to be electrically connected to the semiconductor layer 30 via the through-hole 27b. The electrode 52 is formed to be electrically connected to the semiconductor substrate 10 via the through-hole 27c.

The movable portion 31 comprises the semiconductor layer 30 and the insulating layers 23, 27 on and under the semiconductor layer. The movable portion 31 is movable up and down in the lamination direction.

A method for manufacturing the pressure sensor 3 is described below with reference to FIGS. 38-53.

Figure 38:
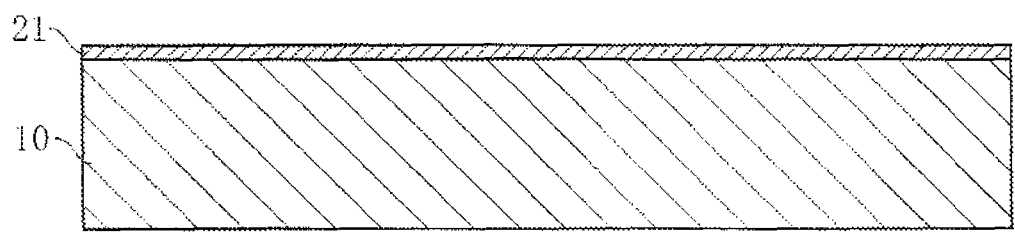
FIG. 38 is a sectional view showing a step of a method for manufacturing the pressure sensor shown in FIG. 37.

First, a semiconductor substrate 10 made of single-crystal silicon is prepared. Specifically, a semiconductor substrate 10 having a thickness of 300 to 700 μm is prepared. In the next step, as shown in FIG. 38, an insulating layer 21 of $SiO_2$ is formed on the surface of the semiconductor substrate 10. This step can be performed by thermally oxidizing the surface of the semiconductor substrate 10.

Figure 39:
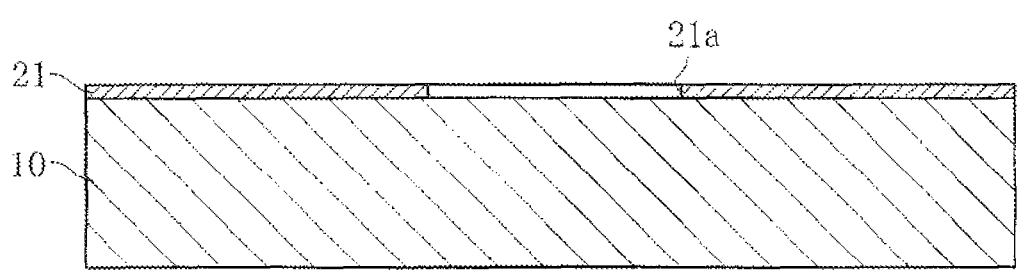
FIG. 39 is a sectional view showing a step subsequent to the step of FIG. 38.

In the next step, as shown in FIG. 39, an opening 21a for exposing the surface of the semiconductor substrate 10 is formed in the insulating layer 21. This step is performed by providing a resist of resin which exposes the portion where the opening 21a is to be formed and performing wet etching using aqueous solution of hydrogen fluoride (HF).

Figure 40:
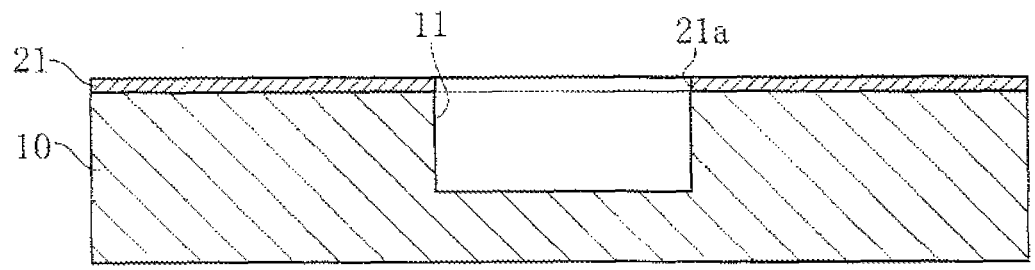
FIG. 40 is a sectional view showing a step subsequent to the step of FIG. 39.

In the next step, a recess 11 is formed in the semiconductor substrate 10, as shown in FIG. 40. This step can be performed by gas-phase etching using gas containing atomic fluorine (F). Fluorine (F) reacts with silicon (Si) but does not react with $SiO_2$. Thus, the insulating layer 21 is not etched away, and the semiconductor substrate 10 is etched away at the portion exposed through the opening 21a, whereby the recess 11 is formed. In this step, by adjusting the time of dry etching, the recess 11 of a desired depth can be formed. The gas containing F can be obtained by decomposing carbon tetrafluoride ($CF_4$) gas or sulfur hexafluoride ($SF_6$) gas by discharge.

Figure 41:
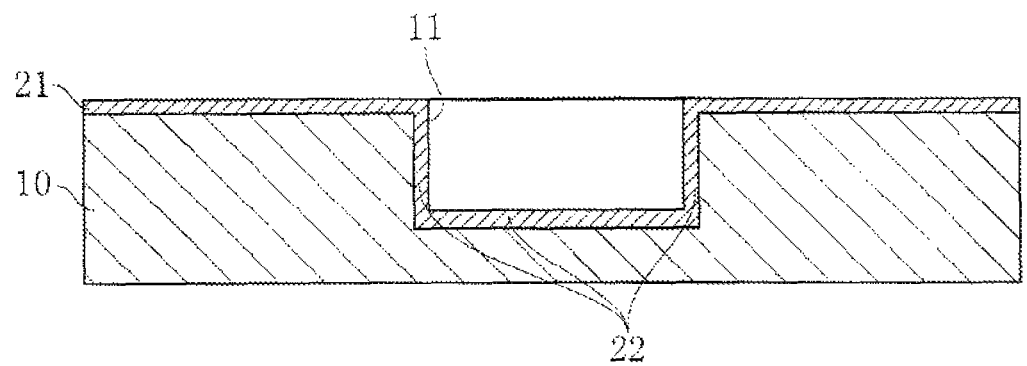
FIG. 41 is a sectional view showing a step subsequent to the step of FIG. 40.

In the next step, an insulating layer 22 is formed, as shown in FIG. 41. This step can be performed by thermally oxidizing the surface of the recess 11.

Figure 42:
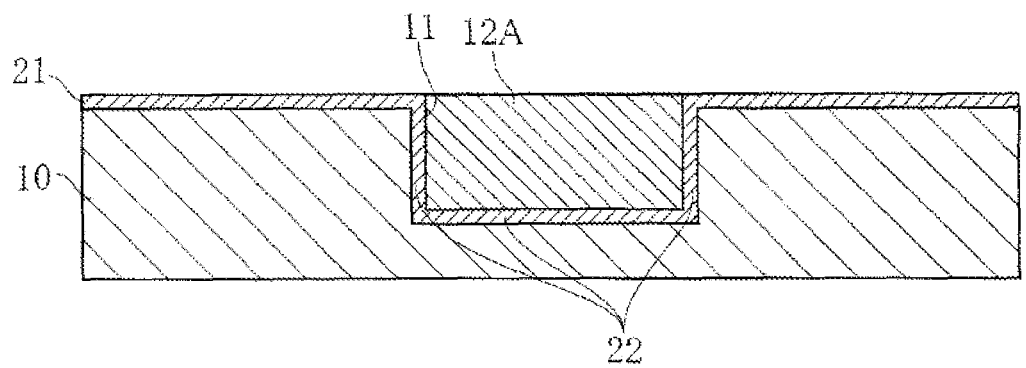
FIG. 42 is a sectional view showing a step subsequent to the step of FIG. 41.

In the next step, as shown in FIG. 42, a sacrificial layer 12A is formed in the recess 11. The sacrificial layer 12A is a layer of polycrystalline silicon. This step is performed by e.g. embedding polycrystalline silicon in the recess 11. In this step, the entirety of the interior of the recess 11 is filled with polycrystalline silicon. Further, in this step, the surface of the polycrystalline silicon is abraded such that the surface of the sacrificial layer 12 is flush with the surface of the insulating layer 21.

Figure 43:
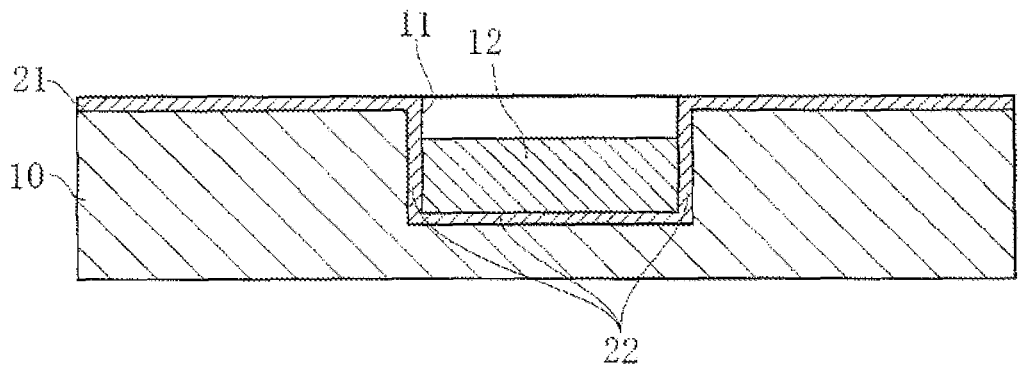
FIG. 43 is a sectional view showing a step subsequent to the step of FIG. 42.

In the next step, a sacrificial layer 12 is made from the sacrificial layer 12A, as shown in FIG. 43. This step is performed by removing the portion close to the surface of the sacrificial layer 12A by gas-phase etching using gas containing HF. The gas containing HF can be prepared by e.g. decomposing by discharge a gas obtained by adding water vapor to $CF_4$ gas or $SF_6$ gas. By performing etching while keeping HF in a dry state and suppressing generation of $HF_2^-$, $SiO_2$ is prevented from being etched away. Thus, the insulating layers 21 and 22 are not removed by this etching. In this step, the thickness of the sacrificial layer 12 can be adjusted by adjusting the etching time.

Figure 44:
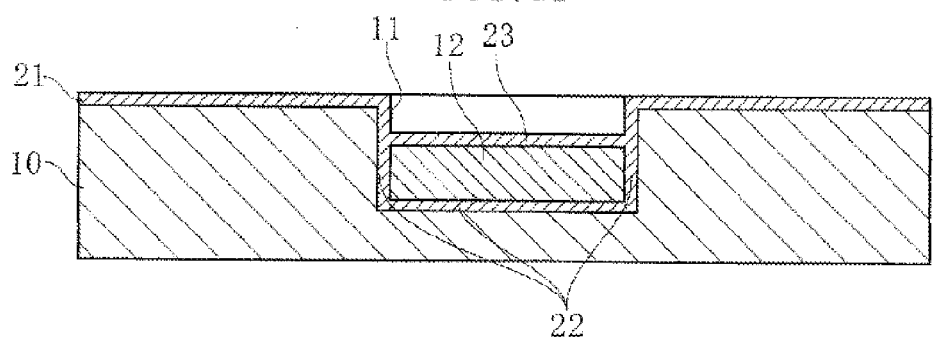
FIG. 44 is a sectional view showing a step subsequent to the step of FIG. 43.

In the next step, as shown in FIG. 44, an insulating layer 23 of $SiO_2$ is formed. This step can be performed by thermally oxidizing the surface of the sacrificial layer 12.

Figure 45:
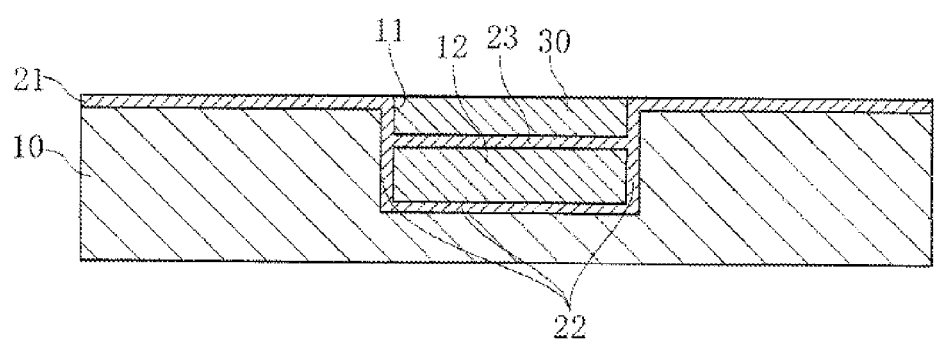
FIG. 45 is a sectional view showing a step subsequent to the step of FIG. 44.

In the next step, as shown in FIG. 45, the semiconductor layer 30 is formed. This step is performed by e.g. embedding polycrystalline silicon in an upper portion of the recess 11. The "upper portion of the recess 11" in this step means a portion of the recess 11 which is above the insulating layer 23.

Figure 46:
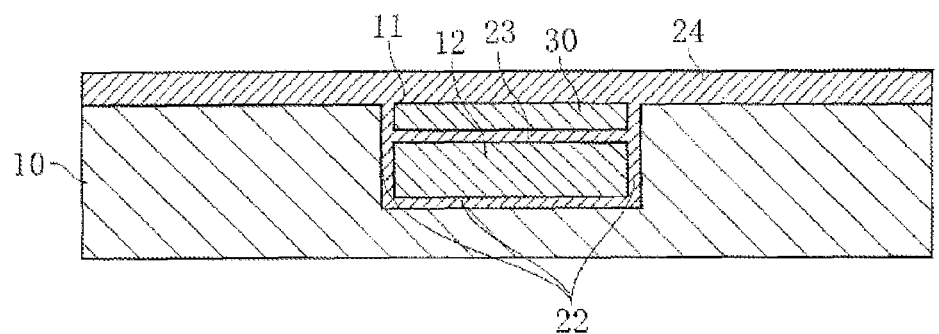
FIG. 46 is a sectional view showing a step subsequent to the step of FIG. 45.

In the next step, as shown in FIG. 46, an insulating layer 24 of $SiO_2$ is formed. First, in this step, the surface of the semiconductor layer 30 is thermally oxidized. Preferably, the thermal oxidation is performed through the thickness portion which is substantially the same as that of the insulating layer 21. By heating the surface of the semiconductor layer 30 uniformly, an oxide layer having a uniform thickness is formed. Then, low pressure chemical vapor deposition (LPCVD) using tetraethoxysilane (TEOS) is performed so that $SiO_2$ is further deposited on the already formed oxide layer and the insulating layer 21, whereby the insulating layer 24 is formed. The insulating layer 24 is formed such that its thickness is sufficiently larger than the thickness of the insulating layer 23.

Figure 47:
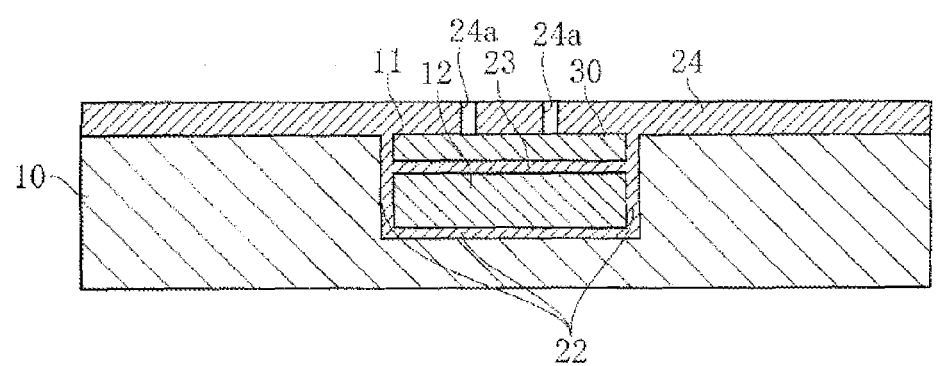
FIG. 47 is a sectional view showing a step subsequent to the step of FIG. 46.

In the next step, as shown in FIG. 47, a plurality of through-holes 24a are formed in the insulating layer 24. This step can be performed by gas-phase etching using the reaction between fluorine-containing molecular ions ($HF_2^-$) and $SiO_2$. $HF_2^-$ can be obtained by reacting hydrogen fluoride (HF) with water vapor. HF can be obtained by reacting F or molecular fluorine ($F_2$), which is obtained by e.g. decomposing $CF_4$ gas or $SF_6$ gas, with water vapor. Since Si which is not oxidized does not easily react with $HF_2^-$, the semiconductor layer 30 is not removed by the etching and hence remains.

Figure 48:
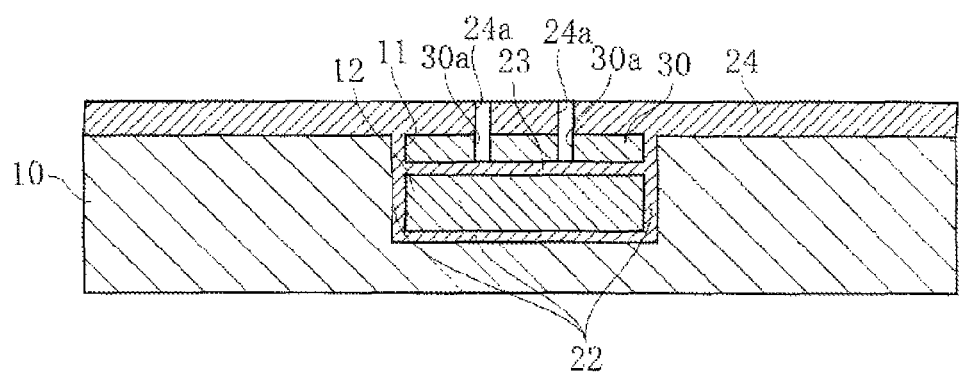
FIG. 48 is a sectional view showing a step subsequent to the step of FIG. 47.

In the next step, as shown in FIG. 48, a plurality of through-holes 30a are formed in the semiconductor layer 30 so that each of the through-holes 30a is connected to a respective one of the through-holes 24a at the upper end and reaches the insulating layer 23 at the lower end. This step can be performed by gas-phase etching using gas containing HF. The gas containing HF can be prepared by e.g. decomposing by discharge a gas obtained by adding water vapor to $CF_4$ gas or $SF_6$ gas. By performing etching while keeping HF in a dry state and suppressing generation of $HF_2^-$, $SiO_2$ is prevented from being etched away. In this step, therefore, the insulating layers 23 and 24 remain.

Figure 49:
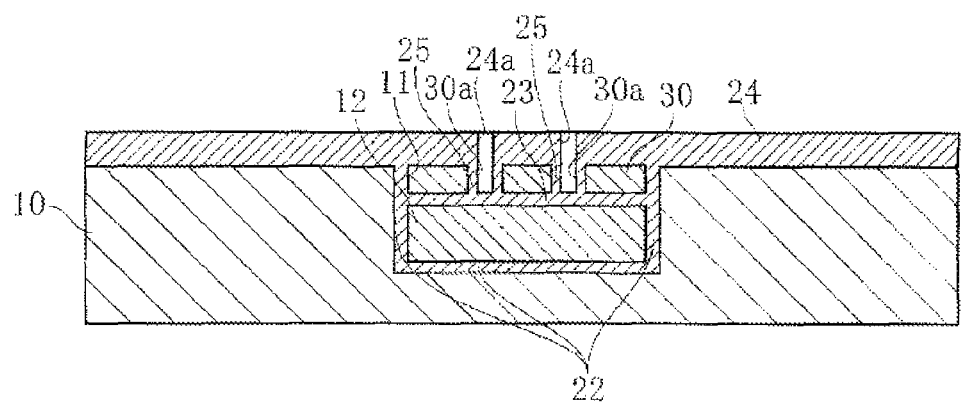
FIG. 49 is a sectional view showing a step subsequent to the step of FIG. 48.

In the next step, an insulating layer 25 of $SiO_2$ is formed, as shown in FIG. 49. The insulating layer 25 is formed on the inner circumferential surface of each of the through-holes 30a. This step is performed by thermally oxidizing the portion of the semiconductor layer 30 which is not covered with the insulating layer 24.

Figure 50:
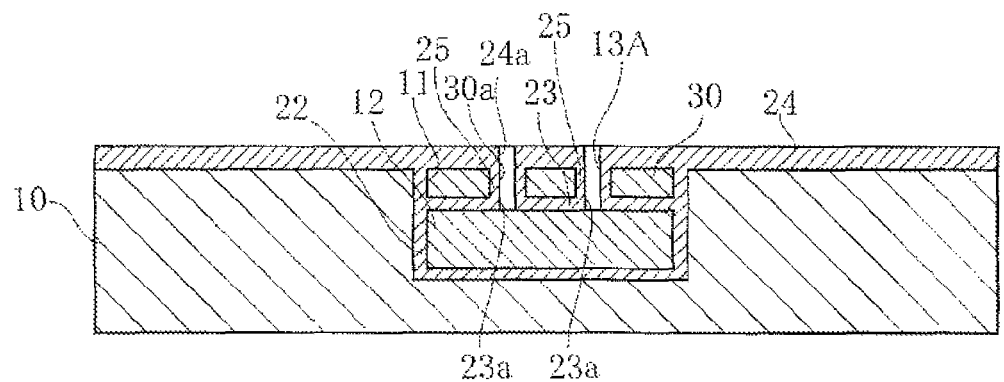
FIG. 50 is a sectional view showing a step subsequent to the step of FIG. 49.

In the next step, vent holes 13A are formed, as shown in FIG. 50. The vent holes 13A are made by forming through-holes 23a in the insulating layer 23 such that each of the through-holes 23a is connected to one of the through-holes 24a and one of the through-hole 30a. This step can be performed by gas-phase etching using the reaction between $HF_2^-$ and $SiO_2$. This step can be performed by utilizing the difference in thickness between the insulating layer 23 and the insulating layer 24, without providing a resist. By this step, part of the insulating layer 24 is removed.

Figure 51:
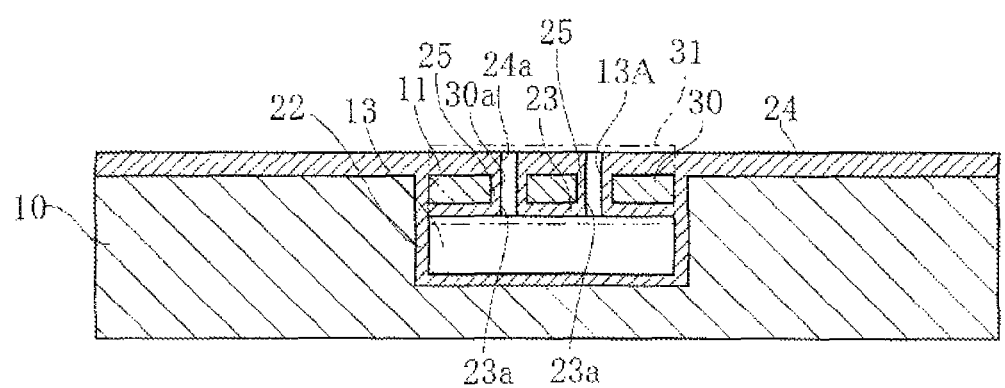
FIG. 51 is a sectional view showing a step subsequent to the step of FIG. 50.

In the next step, a cavity portion 13 is formed, as shown in FIG. 51. This step can be performed by removing the sacrificial layer 12. The removal of the sacrificial layer 12 is performed by gas-phase etching, i.e., by sending gas containing F to the sacrificial layer 12 through the vent holes 13A. F can be obtained by e.g. decomposing $CF_4$ gas or $SF_6$ gas. Since F does not easily react with $SiO_2$, the insulating layers 22, 23, 24, 25 remain in this step, and the semiconductor substrate 10 and the semiconductor layer 30 protected by these insulating layers also remain. By forming the cavity portion 13 in this way, the portion of the semiconductor layer 30 which overlaps the cavity portion 13 as viewed in the lamination direction and the insulating layers 23, 24 on and under this portion become the movable portion 31.

Figure 52:
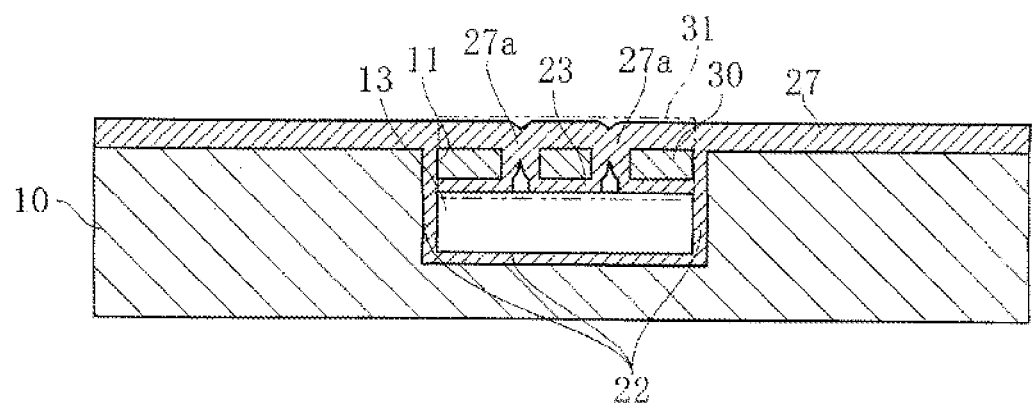
FIG. 52 is a sectional view showing a step subsequent to the step of FIG. 51.

In the next step, an insulating layer 27 and sealing portions 27a are formed, as shown in FIG. 52. In this step, for instance, plasma CVD is performed in a vacuum atmosphere. In this step, $SiO_2$ is further deposited on the insulating layers 24 and 25. As a result of deposition of $SiO_2$ on the insulating layer 25, the vent holes 13A are sealed to become sealing portions 27a. As a result of deposition of $SiO_2$ on the insulating layer 24, the insulating layer 27 is provided.

Figure 53:
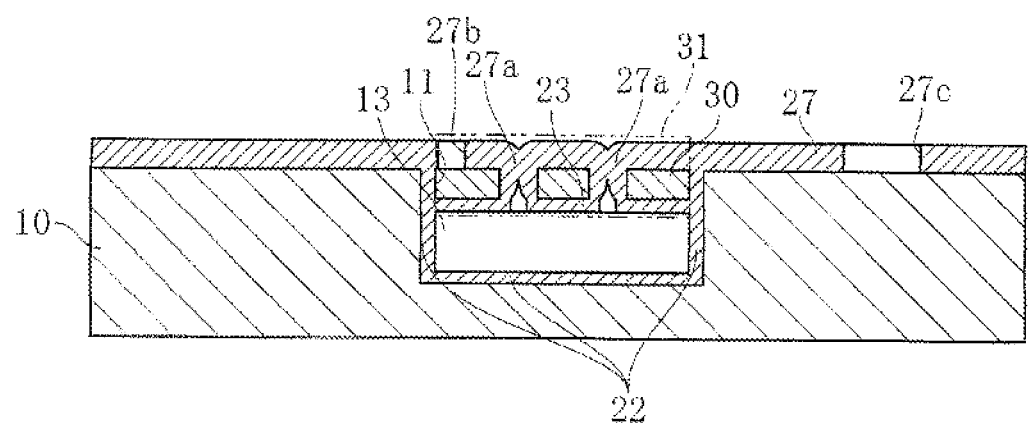
FIG. 53 is a sectional view showing a step subsequent to the step of FIG. 52.

In the next step, through-holes 27b and 27c are formed, as shown in FIG. 53. Specifically, the through-holes 27b and 27c are formed by providing a resist of resin such that the portions where the through-holes 27b and 27c are to be formed are exposed and performing wet etching using aqueous solution of hydrogen fluoride or gas-phase etching using the reaction between $HF_2^-$ and $SiO_2$. The through-hole 27b reaches the semiconductor layer 30, and the through-hole 27c reaches the semiconductor substrate 10.

After the above-described steps, electrodes 51 and 52 are provided, whereby the pressure sensor 3 shown in FIGS. 36 and 37 is completed. For instance, the electrodes 51 and 52 are provided by forming an Al layer in the through-holes 27b, 27c and on the insulating layer 27 and then removing unnecessary portions of the Al layer by etching.

The operation and advantages of the pressure sensor 3 are described below.

According to this embodiment, when the movable portion 31 moves up and down, the capacitance between the semiconductor substrate 10 and the semiconductor layer 30 changes. The pressure sensor 3 detects such changes in capacitance between the semiconductor substrate 10 and the semiconductor layer 30 to detect changes in pressure applied to the movable portion 31. Since the cavity portion 13 is in a vacuum state, the pressure sensor 3 is suitable for e.g. measuring the absolute pressure applied to the movable portion 31.

According to the present invention, the cavity portion 13 is surrounded by the insulating layers 22 and 23. Thus, in the pressure sensor 3, the capacitance between the semiconductor substrate 10 and the semiconductor layer 30 is relatively large. A larger capacitance between the semiconductor substrate 10 and the semiconductor layer 30 allows more sensitive detection of changes in the capacitance. Thus, the pressure sensor 3 ensures more precise pressure measurement.

Further, according to this embodiment, the recess 11 is formed by etching so that the bottom surface of the recess is parallel to the surface of the semiconductor substrate 10. Moreover, the sacrificial layer 12 is formed by etching the sacrificial layer 12A which has been abraded to correspond to the surface of the semiconductor substrate 10. Thus, the surface of the insulating layer 23, which is formed by thermally oxidizing the surface of the sacrificial layer 12, is parallel to the surface of the semiconductor substrate 10. Accordingly, in the pressure sensor 3, the bottom surface of the recess 11 and the semiconductor layer 30 are parallel to each other, with the cavity portion 13 intervening between them. This arrangement allows the capacitance between the semiconductor substrate 10 and the semiconductor layer 30 to be set precisely to a predetermined value. Thus, the pressure sensor 3 ensures more precise pressure measurement.

Moreover, according to the above-described manufacturing method, the pressure sensor 3 is produced from a single semiconductor substrate 10. Thus, the pressure sensor 3 realizes a simple manufacturing process and a low manufacturing cost.

Moreover, according to the above-described manufacturing method, the depth of the recess 11 and the thickness of the sacrificial layer 12 can be easily adjusted by adjusting the etching time in each step. Thus, the dimension in the vertical direction of the cavity portion 13 and the thickness of the semiconductor layer 30 can be set to a desirable value.

In this embodiment, the recess 11 is formed by etching the semiconductor substrate 10. However, unlike this, the recess 11 may be formed by allowing single-crystal silicon to grow on portions of the semiconductor substrate 10 other than the center portion. The sealing of the vent holes 13A can be performed by a LPCVD method.

The pressure sensor according to the present invention is not limited to the foregoing embodiments. The specific structure of each part of the pressure sensor according to the present invention can be varied in design in many ways. For instance, although a capacitive pressure sensor is shown in the foregoing embodiments, the present invention is also applicable to a pressure sensor that uses a piezoresistor. Although the cavity portion 13 is in a vacuum state in the foregoing embodiments, the cavity portion may be filled with a gas of a given pressure.

In the foregoing embodiments, the semiconductor substrate 10 is made of single-crystal silicon, whereas the semiconductor layer 30 is made of polycrystalline silicon. Unlike this, however, the semiconductor substrate 10 may be made of polycrystalline silicon, whereas the semiconductor layer 30 may be made of single-crystal silicon. Moreover, the sacrificial layer 12 may be made of single-crystal silicon.

Figure 54:
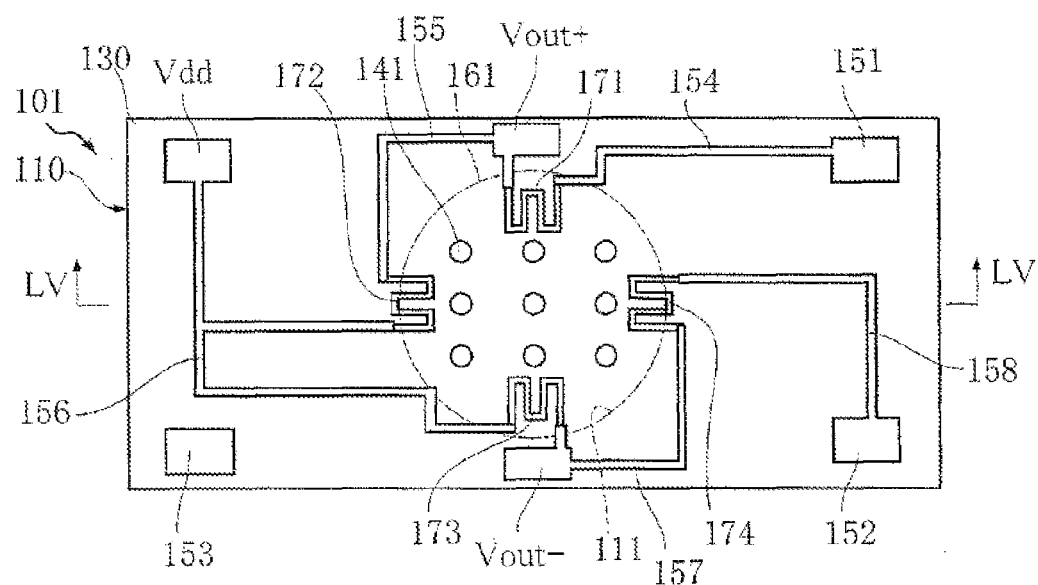
FIG. 54 is a plan view showing a pressure sensor according to a fourth embodiment of the present invention.
Figure 55:
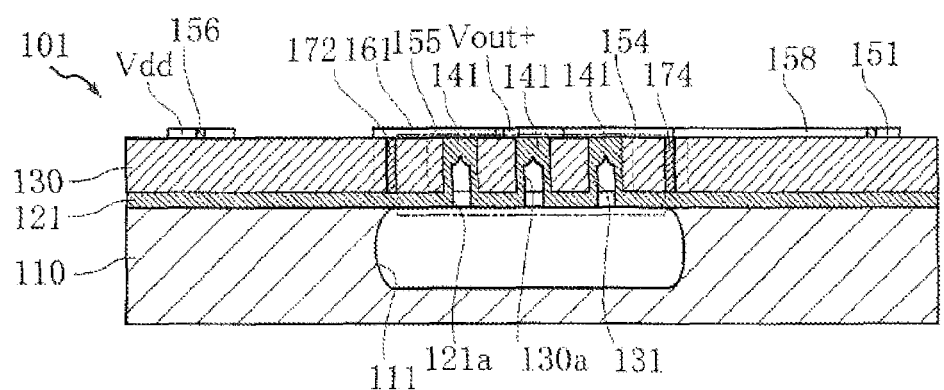
FIG. 55 is a sectional view taken along lines LV-LV in FIG. 54.

FIGS. 54 and 55 show a pressure sensor according to a fourth embodiment of the present invention. The pressure sensor 101 of this embodiment is made up of a semiconductor substrate 110, and an oxide film 121 and a semiconductor layer 130 formed on the semiconductor substrate. The pressure sensor is provided with sealing members 141, a movable portion 161, and piezoresistors 171, 172, 173, 174. The pressure sensor 101 is further provided with a bridge circuit in which the piezoresistors 171, 172, 173, 174 are included. The bridge circuit is arranged on the semiconductor layer 130 and includes output terminals Vout+, Vout−, a bias voltage application terminal Vdd, ground terminals 151, 152, 153 and leads 154, 155, 156, 157, 158. The ground terminals 151, 152, 153 are grounded.

The semiconductor substrate 110 is a single-crystal silicon (Si) substrate having a thickness of about 300 µm in the lamination direction (vertical direction in FIG. 55), and includes a cavity portion 111 the inside of which is in a vacuum state or at a given pressure. The cavity portion 111 is open at the surface of the semiconductor substrate 110 and has a depth of 1 to 50 µm in the lamination direction. The cavity portion 111 is circular as viewed in the thickness direction and has a diameter of e.g. 100 to several thousand micrometers. The shape of the cavity portion 111 as viewed in the lamination direction is not limited to a circular shape, but may be a polygonal shape such as a rectangle.

The semiconductor layer 130 is made of e.g. single-crystal silicon and formed on the semiconductor substrate 110 to have a thickness of about 1 to 50 µm. The semiconductor layer 130 has a plurality of through-holes 130a in an area overlapping the cavity portion 111 as viewed in the lamination direction. Each of the through-holes 130a penetrates the semiconductor layer 130 in the lamination direction, and an oxide film 131 having a thickness of about 0.2 µm is formed on the inner circumferential surface of the through-hole. As viewed in the lamination direction, the through-hole 130a has a circular shape with a diameter of 0.2 to 5 µm or an oval shape having a similar size.

The oxide film 121 is made of e.g. a silicon dioxide ($SiO_2$) and formed between the semiconductor substrate 110 and the semiconductor layer 130 to have a thickness of about 0.1 to 3 µm. The oxide film 121 has a plurality of through-holes 121a that overlap the through-holes 130a as viewed in the lamination direction. Each of the through-holes 121a penetrates the oxide film 121 in the lamination direction and reaches one of the through-holes 130a at the upper end and reaches the cavity portion 111 at the lower end.

The sealing members 141 are made of e.g. silicon dioxide ($SiO_2$) and seal the upper end of each through-hole 130a.

The movable portion 161 comprises portions of the semiconductor layer 130 and the oxide film 121 which overlap the cavity portion 111 as viewed in the lamination direction. Since the movable portion 161 overlaps the cavity portion 111, the movable portion is deformable in the lamination direction. The shape of the movable portion 161 as viewed in the lamination direction is the same as that of the cavity portion 111.

As shown in FIG. 54, each of the piezoresistors 171, 172, 173, 174 is in the form of a meandering strip including a plurality of bends, and embedded in the semiconductor layer 130. The thickness of the piezoresistors 171, 172, 173, 174 in the lamination direction is e.g. about 0.1 to 1 μm. The piezoresistor 171 is arranged at the upper end of the movable portion 161 in FIG. 54. The piezoresistor 172 is arranged at the left end of the movable portion 161 in FIG. 54. The piezoresistor 173 is arranged at the lower end of the movable portion 161 in FIG. 54. The piezoresistor 174 is arranged at the right end of the movable portion 161 in FIG. 54. The piezoresistors 171 and 173 are located within the area of the movable portion 161, whereas the piezoresistors 172 and 174 are located at the edge of the movable portion 161. The piezoresistors 171, 172, 173, 174 are made of doped polysilicon or by doping a P-type or N-type element.

The piezoresistor 171 is connected at one end to the ground terminal 151 via the lead 154 and connected at the other end to the output terminal Vout+.

The piezoresistor 172 is connected at one end to the output terminal Vout+ via the lead 155 and connected at the other end to the bias voltage application terminal Vdd via the lead 156.

The piezoresistor 173 is connected at one end to the bias voltage application terminal Vdd via the lead 156 and connected at the other end to the output terminal Vout−.

The piezoresistor 174 is connected at one end to the output terminal Vout− via the lead 157 and connected at the other end to the ground terminal 152 via the lead 158.

The operation and advantages of the pressure sensor 101 are described below.

In the pressure sensor 101, when pressure is applied to the surface of the movable portion 161, the movable portion 161 is deformed, so that distortion occurs in the piezoresistors 171, 172, 173, 174. The resistance of the piezoresistors 171, 172, 173, 174 changes due to the distortion. Such a change in resistance of the piezoresistors 171, 172, 173, 174 is detected through the output terminals Vout+, Vout− as a change in voltage relative to the bias voltage applied to the bias voltage application terminal Vdd by using the bridge circuit. Based on the detection result, the pressure applied to the movable portion 161 is calculated. When the cavity portion 111 is in a vacuum state, the pressure applied to the movable portion 161 is the absolute pressure of the ambient gas. When the cavity portion 111 is at a given pressure, the pressure applied to the movable portion 161 is the relative pressure between the ambient gas and the gas within the cavity portion 111.

A method for manufacturing the pressure sensor 101 is described below with reference to FIGS. 56-69.

Figure 56:
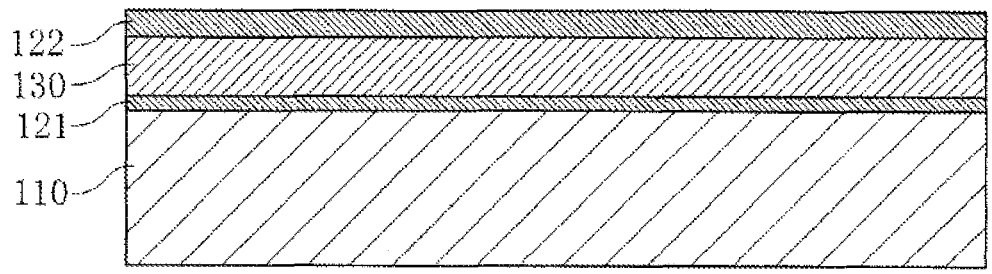
FIG. 56 is a sectional view showing a step of a method for manufacturing the pressure sensor shown in FIG. 55.

First, as shown in FIG. 56, a semiconductor substrate 110 having a semiconductor layer 130 on the surface is prepared. The semiconductor layer 130 has an oxide layer 122 on the surface.

Figure 57:
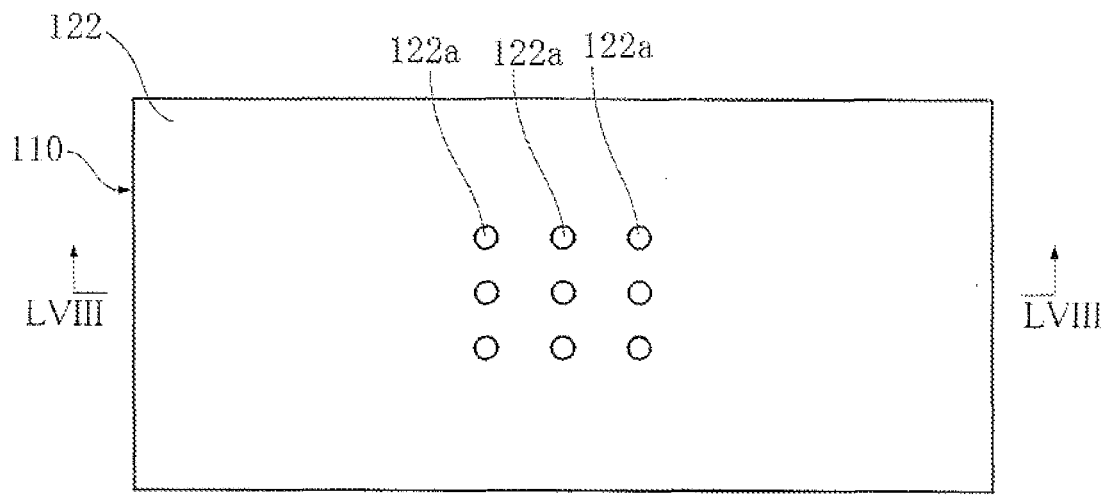
FIG. 57 is a plan view showing a step subsequent to the step of FIG. 56.
Figure 58:
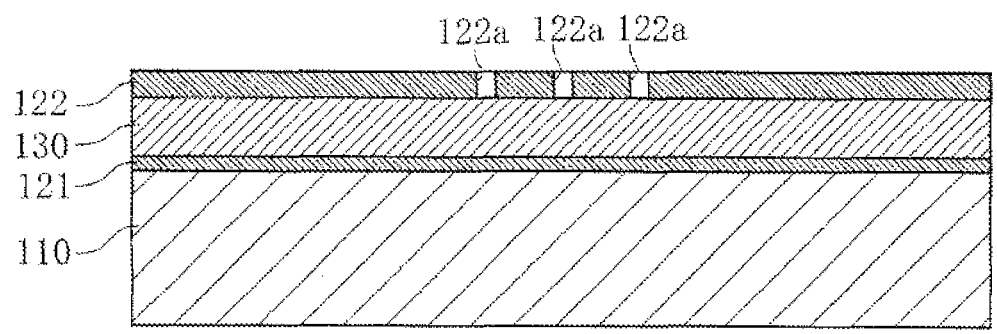
FIG. 58 is a sectional view taken along lines LVIII-LVIII in FIG. 57.

In the next step, as shown in FIGS. 57 and 58, a plurality of through-holes 122a are formed in the oxide layer 22. The shape of the through-holes 122a as viewed in the lamination direction is the same as that of the above-described through-holes 130a. In this step, for instance, after a resist of resin that exposes the portions where the through-holes 122a are to be formed is provided, gas-phase etching using the reaction between fluorine-containing molecular ions ($HF_2^-$) and $SiO_2$ is performed. $HF_2^-$ can be obtained by reacting hydrogen fluoride (HF) with water vapor. HF can be obtained by reacting F or molecular fluorine ($F_2$), which is obtained by e.g. decomposing trifluoromethane ($CHF_3$) gas, with water vapor. Since Si which is not oxidized does not easily react with $HF_2^-$, the semiconductor layer 130 is not removed by the etching and hence remains. Instead of the gas-phase etching, wet etching using aqueous solution of hydrogen fluoride (HF) may be performed.

Figure 59:
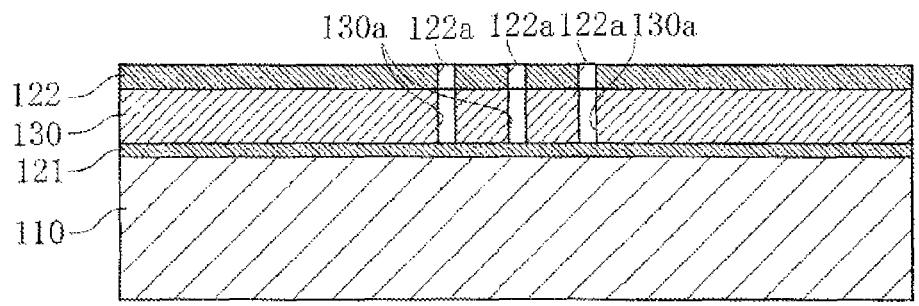
FIG. 59 is a sectional view showing a step subsequent to the step of FIG. 58.

In the next step, as shown in FIG. 59, a plurality of through-holes 130a are formed in the semiconductor layer 130. This step can be performed by gas-phase anisotropic etching using gas containing HF. The gas containing HF can be prepared by e.g. decomposing by discharge a gas obtained by adding water vapor to $CHF_3$. By performing etching while keeping HF in a dry state and suppressing generation of $HF_2^-$, $SiO_2$ is prevented from being etched away. In this step, therefore, the oxide film 121 and the oxide layer 122 remain.

Figure 60:
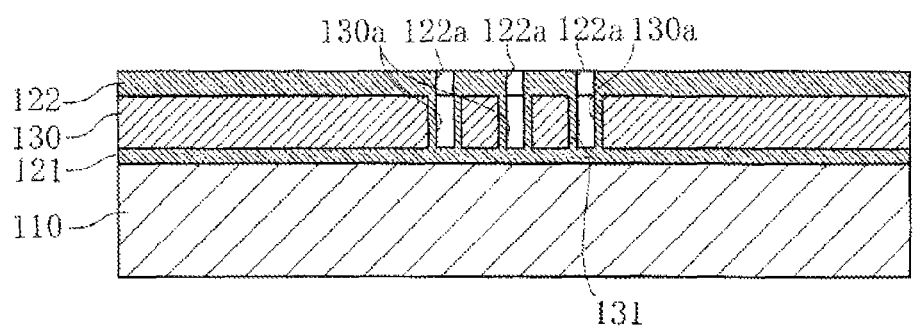
FIG. 60 is a sectional view showing a step subsequent to the step of FIG. 59.

In the next step, as shown in FIG. 60, the inner circumferential surface of each through-hole 130a is oxidized to form an oxide film 131. This step can be performed by e.g. thermal oxidization. The oxide film 131 is provided to protect the semiconductor layer 130 during the etching, which will be performed in a later step. The same protection effect is provided by depositing $SiO_2$ on the inner circumferential surface of the through-holes 130a by CVD to form a protective film.

Figure 61:
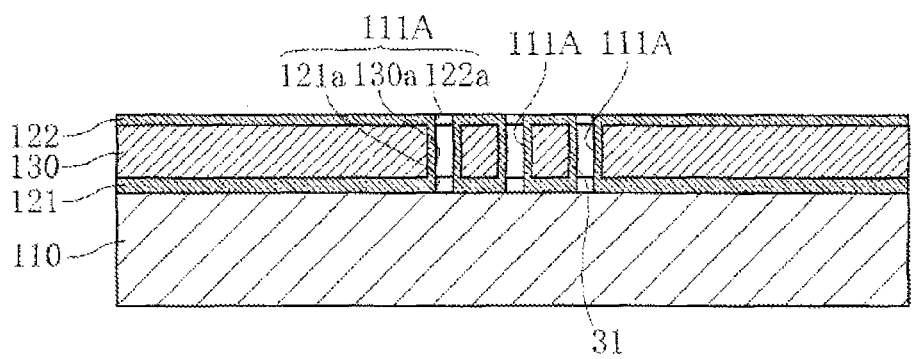
FIG. 61 is a sectional view showing a step subsequent to the step of FIG. 60.
Figure 62:
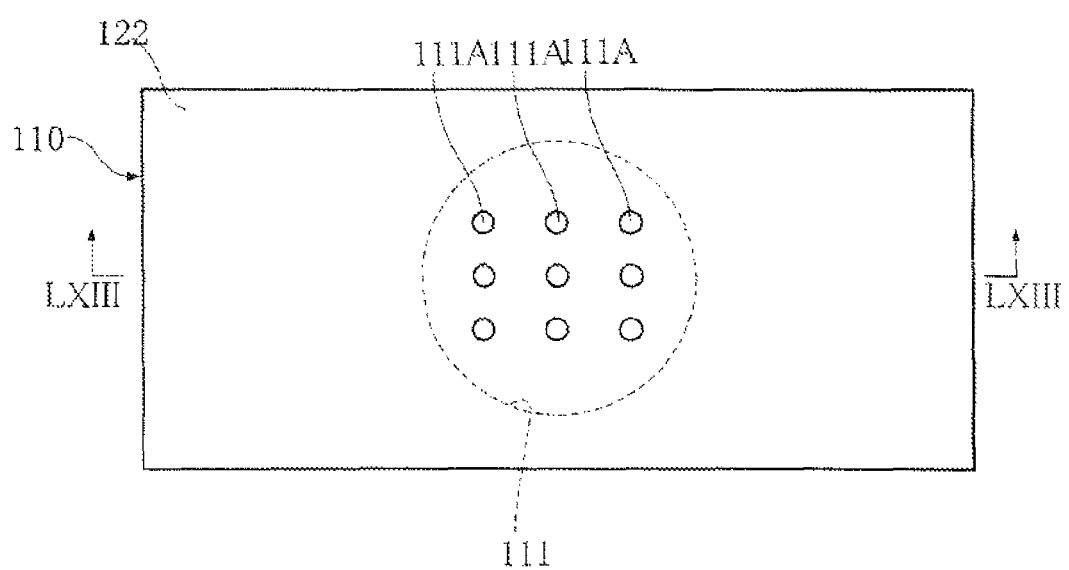
FIG. 62 is a plan view showing a step subsequent to the step of FIG. 61.

In the next step, vent holes 111A are formed, as shown in FIGS. 61 and 62. Each vent hole 111A is made up of through-holes 121a, 122a, 130a. This step can be performed by gas-phase anisotropic etching using the reaction between $HF_2^-$ and $SiO_2$. In this gas-phase anisotropic etching, $SiO_2$ is removed by an amount corresponding to the thickness of the oxide film 121 in the lamination direction. In this step, through-holes 121a are formed in the oxide film 121, while at the same time, the surface portion of the oxide layer 122 is removed.

Figure 63:
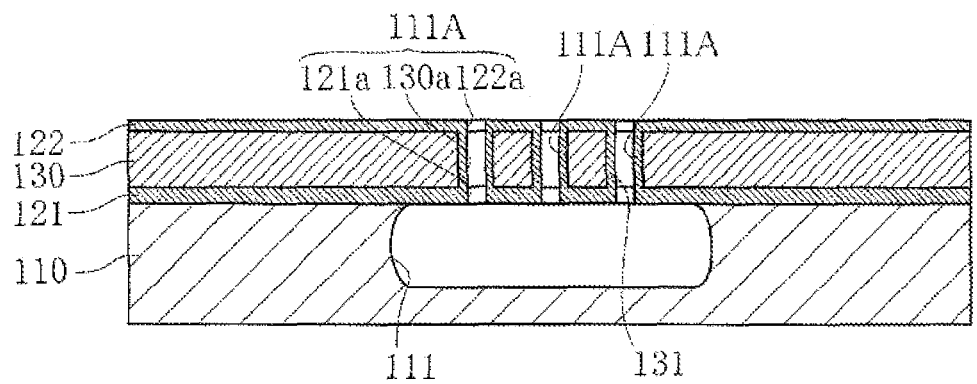
FIG. 63 is a sectional view taken along lines LXIII-LXIII in FIG. 62.

In the next step, as shown in FIG. 63, a cavity portion 111 is formed. For instance, this step can be performed by gas-phase etching using gas containing atomic fluorine (F). Fluorine (F) easily reacts with silicon (Si) but does not easily react with $SiO_2$. Thus, by sending gas containing F to the semiconductor substrate 110 through the vent holes 111A covered with $SiO_2$, the semiconductor substrate 110 is etched and the cavity portion 111 is formed before the semiconductor layer 130 is etched. The gas containing F can be obtained by decomposing $CHF_3$ gas by discharge.

The cavity portion 111 can be formed by etching using xenon fluoride gas. The difference between Si and $SiO_2$ in reactivity with xenon fluoride gas is larger than that in reactivity with $CHF_3$ gas. Thus, the oxide film 131 can be made thinner by using xenon fluoride gas.

Figure 64:
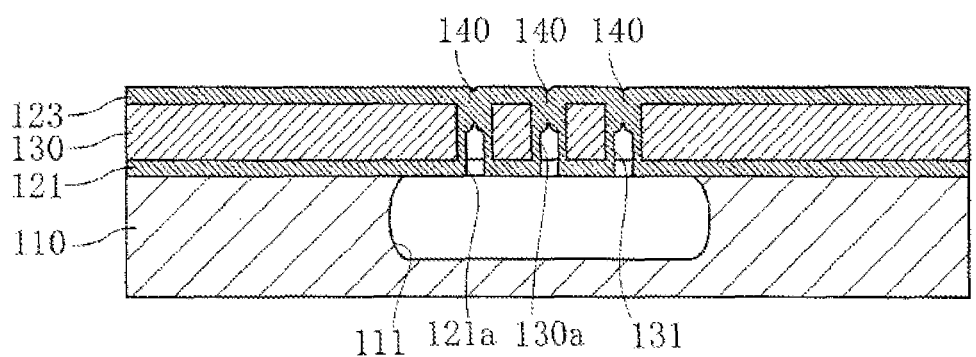
FIG. 64 is a sectional view showing a step subsequent to the step of FIG. 63.

In the next step, as shown in FIG. 64, vent holes 111A are sealed. This step is performed by low pressure chemical vapor deposition (LPCVD) using tetraethoxysilane (TEOS). By this step, $SiO_2$ is deposited on the oxide layer 122 and in the vent holes 111A, so that the oxide layer 123 and sealing portions 140 are formed. By sealing the vent holes 111A with the sealing portions 140 in a vacuum state or in an atmosphere of a given pressure, the cavity portion 111 is brought into a vacuum state or at a given pressure. Of each sealing portion 140, the portion that closes the vent hole 111A tends to be concave at the center, because $SiO_2$ grows radially from the inner circumferential surface of the vent hole 111A.

The sealing of the vent hole 111A can be performed by other methods, such as thermal oxidation to utilize bulging of the oxidized portion.

Figure 65:
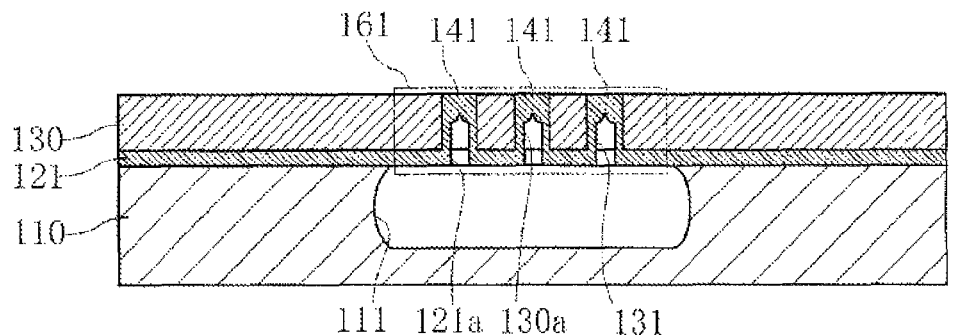
FIG. 65 is a sectional view showing a step subsequent to the step of FIG. 64.

In the next step, as shown in FIG. 65, the oxide layer 123 is removed. This step can be performed by abrading or gas-phase etching. In this step, at the same time, part of the sealing portions 140 are removed, so that sealing members 141 remain on the upper ends of the through-holes 130a. As shown in FIG. 65, the sealing members 141 are flat at the upper ends and concave toward the center at the lower end. By this step, the movable portion 161 is provided.

Figure 66:
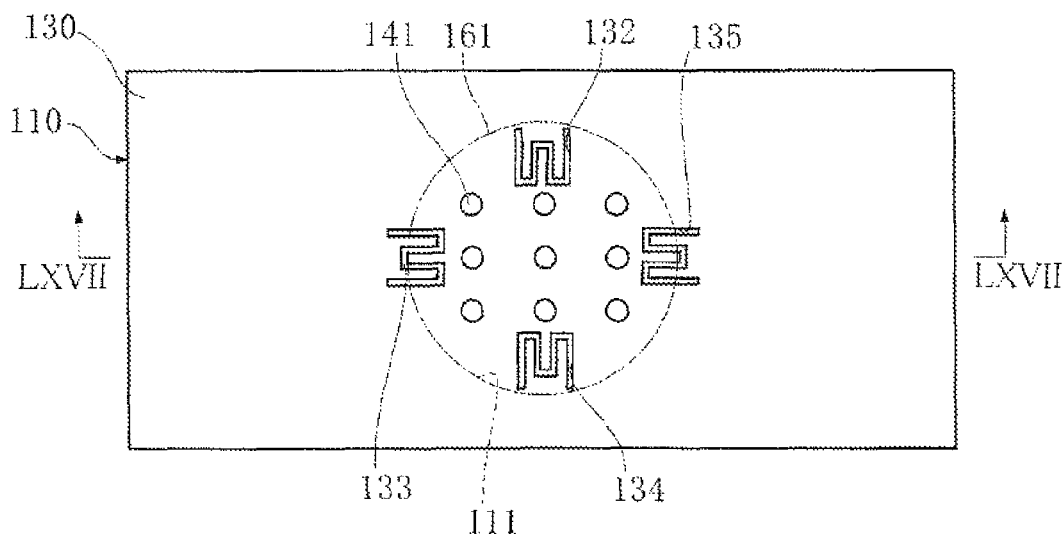
FIG. 66 is a plan view showing a step subsequent to the step of FIG. 65.
Figure 67:
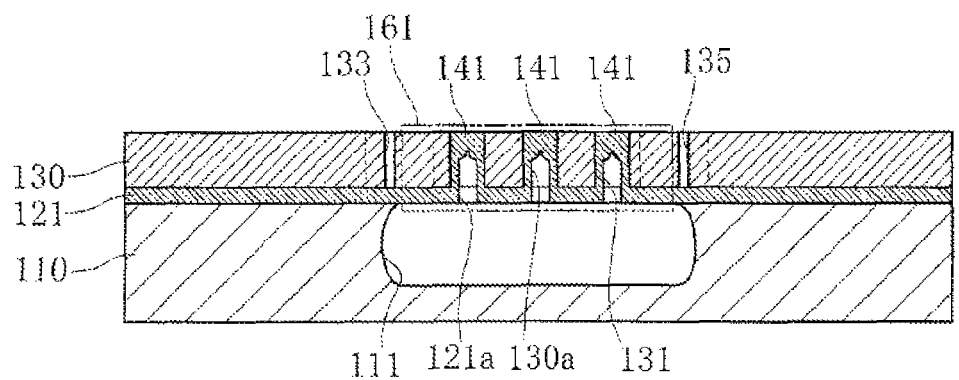
FIG. 67 is a sectional view taken along lines LXVII-LXVII in FIG. 66.

In the next step, piezoresistors 171, 172, 173, 174 are formed. Specifically, for instance, the piezoresistors 171, 172, 173, 174 are formed by embedding polycrystalline silicon in the semiconductor layer 130. Firstly, in this step, grooves 132, 133, 134, 135 are formed, as shown in FIGS. 66 and 67. Specifically, gas-phase etching using gas containing HF is performed using a resist of resin which exposes portions corresponding to the grooves 132, 133, 134, 135. Each of the grooves 132, 133, 134, 135 is formed to have a meandering shape including a plurality of bends.

Figure 68:
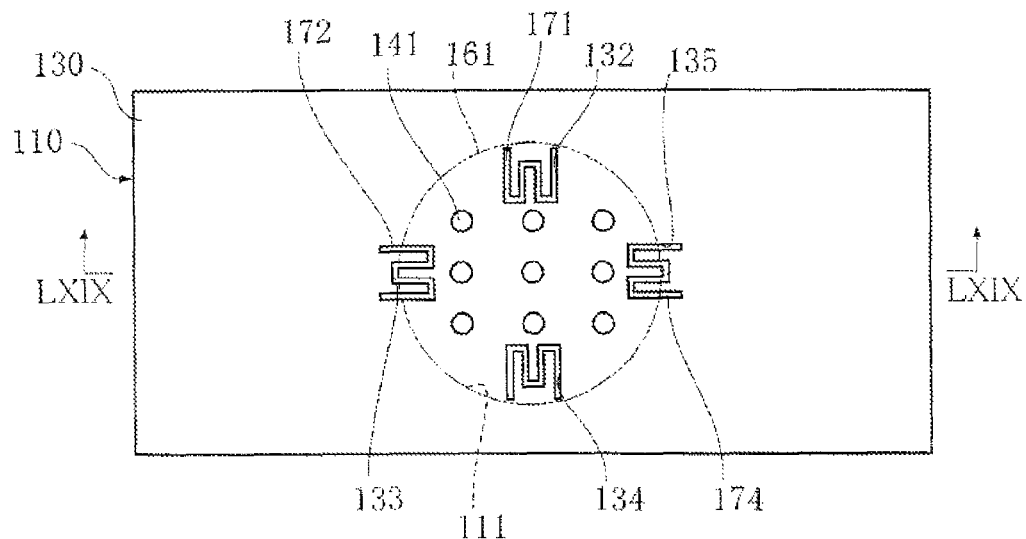
FIG. 68 is a plan view showing a step subsequent to the step of FIG. 67.
Figure 69:
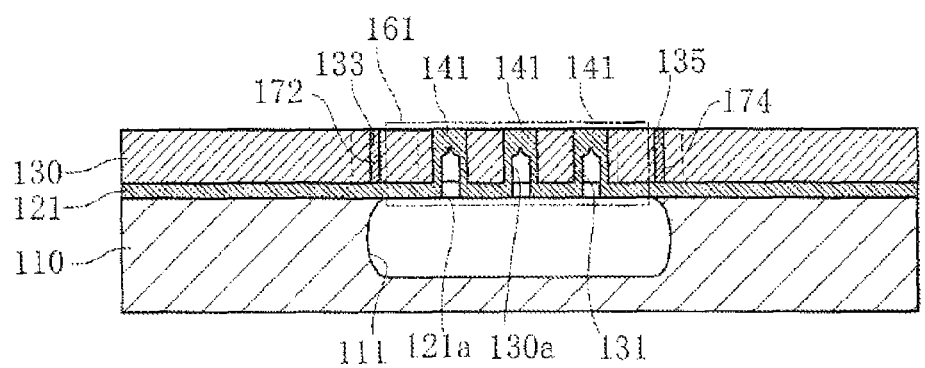
FIG. 69 is a sectional view taken along lines LXIX-LXIX in FIG. 68.

In the next step, as shown in FIGS. 68 and 69, polycrystalline silicon is embedded in the grooves 132, 133, 134, 135. The polycrystalline silicon embedded in the grooves 132, 133, 134, 135 in this step becomes the piezoresistors 171, 172, 173, 174. Alternatively, the piezoresistors 171, 172, 173, 174 can be provided by forming diffused resistors by performing implantation with respect to the semiconductor layer 130.

Thereafter, e.g. an aluminum (Al) layer is formed on the semiconductor layer 130. Then, etching is performed with respect to the Al layer, whereby output terminals Vout+, Vout−, a bias voltage application terminal Vdd, ground terminals 151, 152, 153 and leads 154, 155, 156, 157, 158 are formed.

By the above-described steps, the pressure sensor 101 shown in FIGS. 54 and 55 is completed.

The operation and advantages of the pressure sensor 101 are described below.

According to the above-described manufacturing method, the cavity portion 111 and the movable portion 161 are formed by making vent holes 111A in the semiconductor layer 130 and etching the semiconductor substrate 110 through the vent holes 111A. Thus, unlike the conventional method which uses a plurality of semiconductor substrates, the pressure sensor 101 is produced from a single semiconductor substrate 110. Thus, the pressure sensor 101 realizes a simple manufacturing process and a low manufacturing cost.

Moreover, according to the present embodiment, the piezoresistors 171, 172, 173, 174 have a meandering shape including a plurality of bends, which allows distortion due to deformation of the movable portion 161 to occur easily. As a result, the piezoresistors 171, 172, 173, 174 show remarkable changes in resistance when the movable portion 161 is deformed. Thus, the pressure sensor 101 ensures more precise pressure measurement.

FIGS. 70-85 show other embodiments of the present invention. In these figures, the elements which are identical or similar to those of the foregoing embodiments are designated by the same reference signs as those used for the foregoing embodiments.

Figure 70:
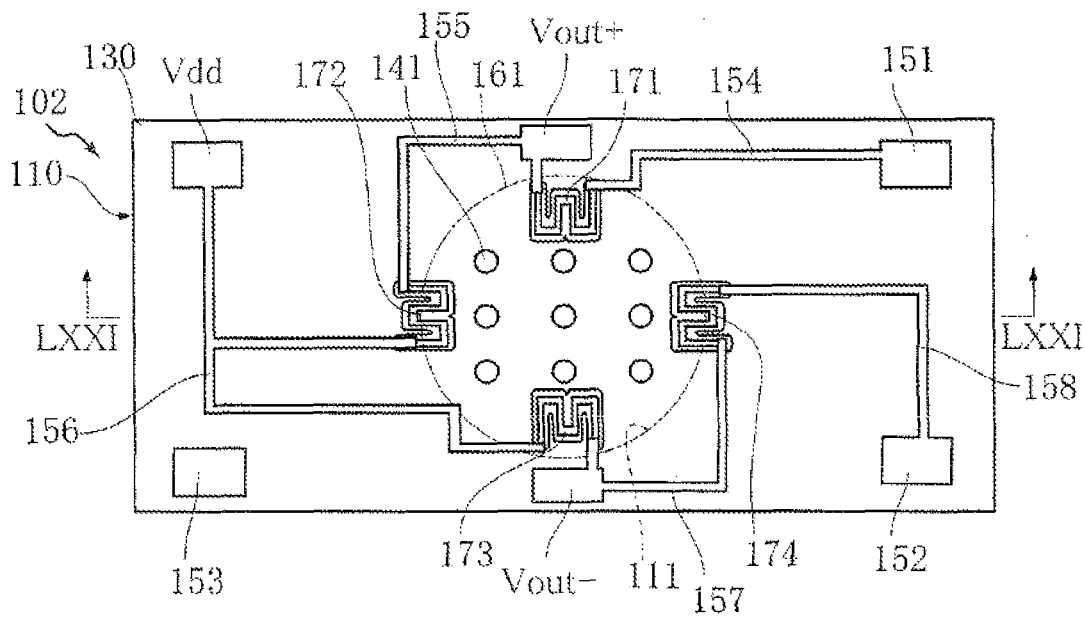
FIG. 70 is a plan view showing a pressure sensor according to a fifth embodiment of the present invention.
Figure 71:
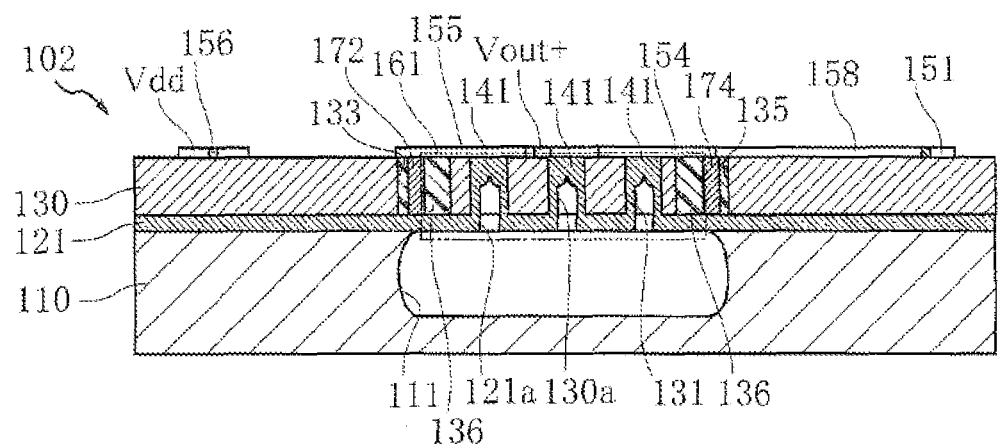
FIG. 71 is a sectional view taken along lines LXXI-LXXI in FIG. 70.

FIGS. 70 and 71 show a pressure sensor according to a fifth embodiment of the present invention. The pressure sensor 102 shown in FIGS. 70 and 71 differs from the pressure sensor 101 in that the semiconductor layer 130 is made of polycrystalline silicon and in structure of the grooves 132, 133, 134, 135 and piezoresistors 171, 172, 173, 174. As shown in FIG. 71, an insulator 136 is filled between the grooves 132, 133, 134, 135 and the piezoresistors 171, 172, 173, 174. The structures of other parts of the pressure sensor 102 are the same as those of the pressure sensor 101.

Figure 72:
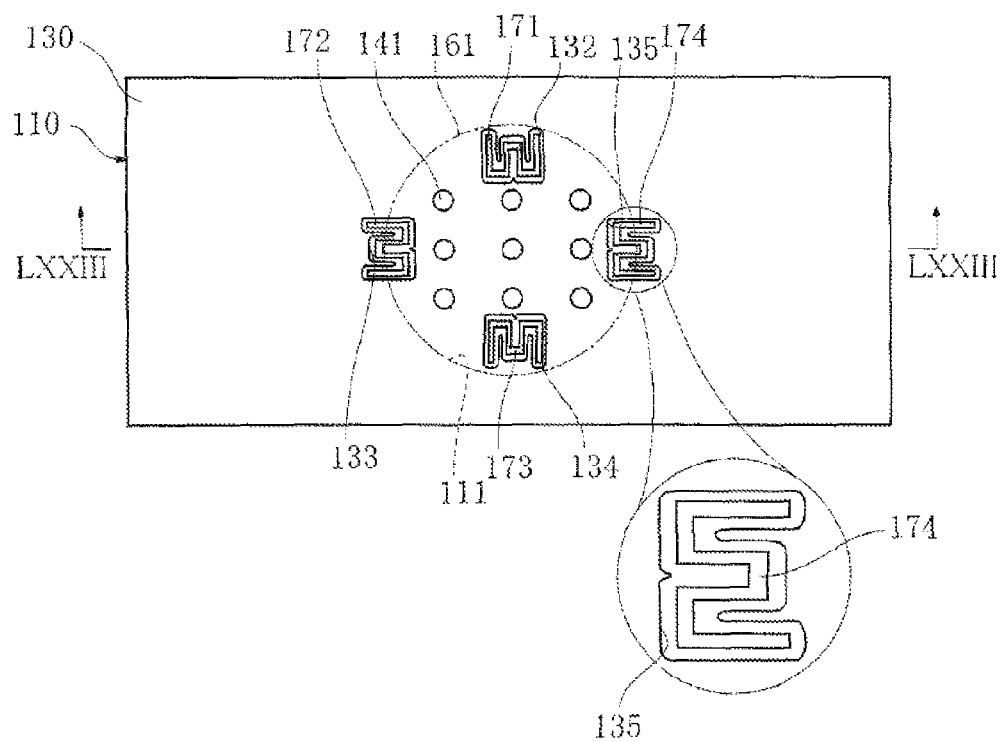
FIG. 72 is a plan view showing a step of a method for manufacturing the pressure sensor shown in FIG. 70.
Figure 73:
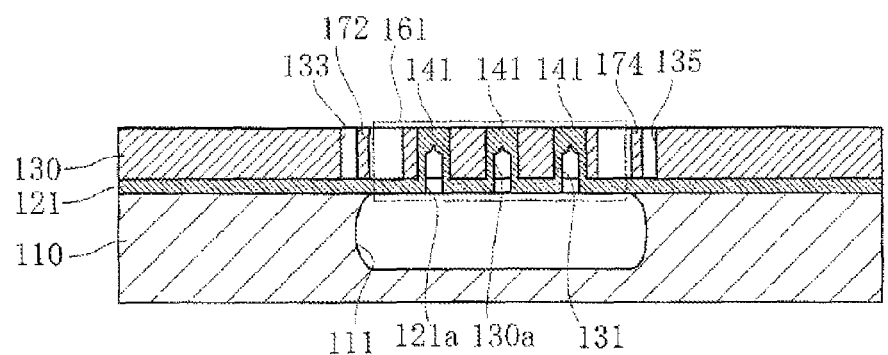
FIG. 73 is a sectional view taken along lines LXXIII-LXXIII in FIG. 72.

FIGS. 72 and 73 show the step of forming grooves 132, 133, 134, 135 in manufacturing the pressure sensor 102. As shown in FIGS. 72 and 73, each of the grooves 132, 133, 134, 135 is formed such that part of the semiconductor layer 130 remains within the groove. The portion of the semiconductor layer 130 which remains in each of the grooves 132, 133, 134, 135 is separated from the main portion of the semiconductor layer 130 by the groove 132, 133, 134, 135. As shown in FIG. 72, each groove is formed such that the remaining portion has a meandering shape including a plurality of bends. Such grooves 132, 133, 134, 135 can be formed by performing gas-phase etching using gas containing HF and an appropriate resist of resin. In the pressure sensor 102, the portion of the semiconductor layer 130 which remains within each of the grooves 132, 133, 134, 135 becomes the piezoresistor 171, 172, 173, 174.

In the process of manufacturing the pressure sensor 102, after the step shown in FIGS. 72 and 73, the step of embedding an insulator 136 in the grooves 132, 133, 134, 135 is performed. In this step, the piezoresistors 171, 172, 173, 174 may be covered with the insulator 136. Thus, an Al layer is formed after etching is performed with respect to the insulator 136 to expose the piezoresistors 171, 172, 173, 174. This ensures electrical connection between the piezoresistors 171, 172, 173, 174 and the output terminals Vout+, Vout− and leads 154, 155, 156, 157, 158, which are made of the Al layer. In etching the insulator 136, the portion of the insulator 136 which covers the piezoresistors 171, 172, 173, 174 does not need to be removed entirely. It is sufficient if only portions for allowing connection to the output terminals Vout+, Vout− and leads 154, 155, 156, 157, 158 are secured in the piezoresistors 171, 172, 173, 174.

Similarly to the pressure sensor 101, the pressure sensor 102 is produced from a single semiconductor substrate 110, without the need for using a plurality of semiconductor substrates. Thus, the pressure sensor 102 realizes a simple manufacturing process and a low manufacturing cost.

Moreover, according to this embodiment again, the piezoresistors 171, 172, 173, 174 have a meandering shape including a plurality of bends, which allows distortion due to deformation of the movable portion 161 to occur easily. As a result, the piezoresistors 171, 172, 173, 174 of this embodiment also show remarkable changes in resistance when the movable portion 161 is deformed. Thus, the pressure sensor 102 ensures more precise pressure measurement.

Figure 74:
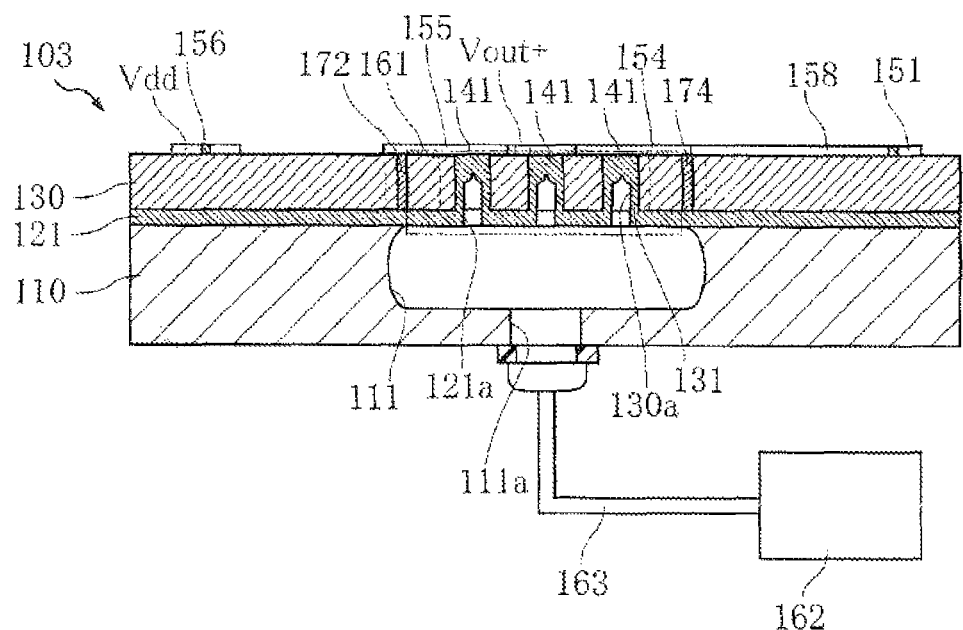
FIG. 74 is a sectional view showing a pressure sensor according to a sixth embodiment of the present invention.

FIG. 74 shows a pressure sensor according to a sixth embodiment of the present invention. In the pressure sensor 103 of this embodiment, the cavity portion 111 is open to the reverse surface of the semiconductor substrate 110, and to the opening 111a is connected a pipe 163. The pipe 163 is connected to a gas supply chamber 162. The structures of the other parts of the pressure sensor 103 are the same as those of the pressure sensor 101.

For instance, the opening 111a can be formed by performing etching from the reverse surface of the semiconductor substrate 110 after the cavity portion 111 is formed.

In the pressure sensor 103, the gas supply chamber 162 is filled with a gas of a given pressure, and the gas is supplied to the cavity portion 111 through the pipe 163. With this arrangement, the pressure applied to the reverse surface of the movable portion 161 is known. In this case, the pressure applied to the movable portion 161 is the relative pressure between the pressure of the outside gas applied to the obverse surface side of the movable portion 161 and the known pressure applied to the reverse surface side. Thus, with the pressure sensor 103, the pressure of the outside gas can be found by detecting the relative pressure of the outside gas with respect to the gas within the cavity portion 111.

Alternatively, the pressure sensor may be designed such that gas of a given pressure is applied to the obverse surface of the movable portion 161, while the gas supply chamber 162 is filled with a gas of an unknown pressure. In this case, the pressure of the gas in the gas supply chamber can be measured by supplying the gas to the cavity portion 111 through the pipe 163.

Figure 75:
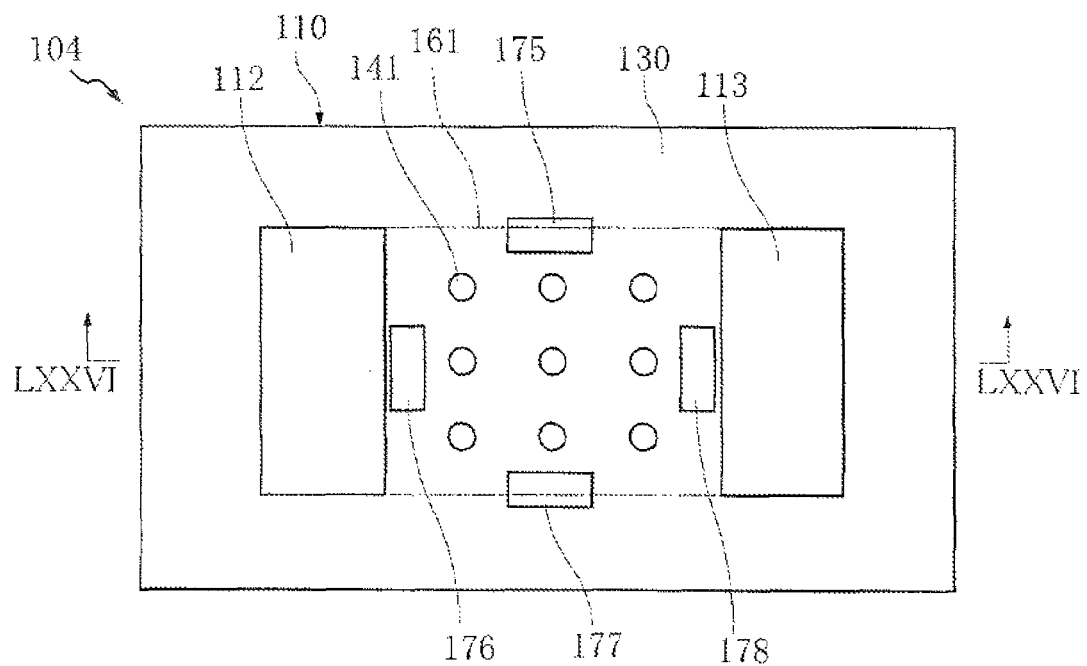
FIG. 75 is a plan view showing a pressure sensor according to a seventh embodiment of the present invention.
Figure 76:
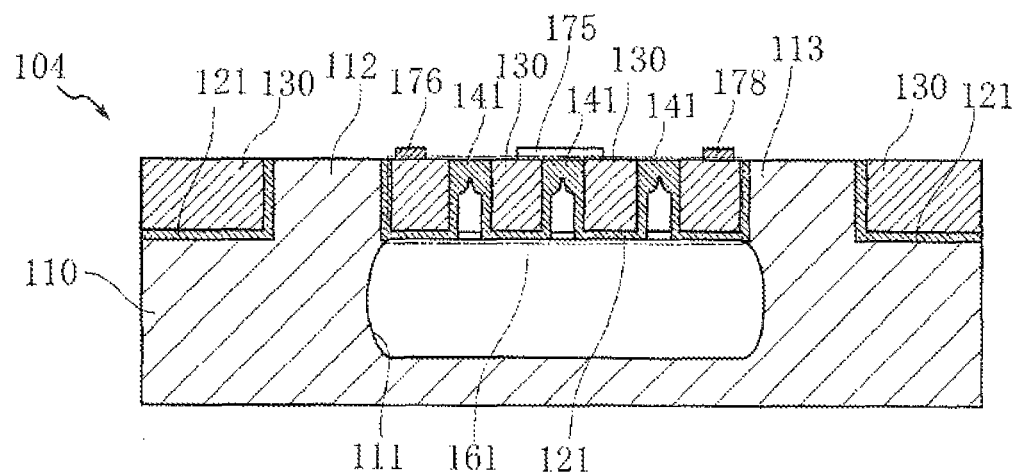
FIG. 76 is a sectional view taken along lines LXXVI-LXXVI in FIG. 75.

FIGS. 75 and 76 show a pressure sensor according to a seventh embodiment of the present invention. The pressure sensor 104 shown in FIGS. 75 and 76 includes a pair of plate-like members 112 and 113 projecting from the semiconductor substrate 110 in the lamination direction and facing each other. The height of the plate-like members 112 and 113 in the lamination direction is e.g. in the range of from several micrometers to several tens of micrometers. In the pressure sensor 104, the movable portion 161 and the cavity portion 111 are in the form of an elongated rectangle as viewed in the lamination direction. The movable portion 161 and the cavity portion 111 are sandwiched between the paired plate-like members 112 and 113. In this embodiment, piezoresistors 175, 176, 177, 178 each in the form of a thin film are used instead of the piezoresistors 171, 172, 173, 174 of the pressure sensors 101-103. Though not shown in FIGS. 75 and 76, a bridge circuit including the piezoresistors 175, 176, 177, 178 are formed on the semiconductor layer 130. The structures of other parts of the pressure sensor 104 are the same as those of the pressure sensor 101.

FIGS. 77-85 show some of the steps of the process of manufacturing the pressure sensor 104.

Figure 77:
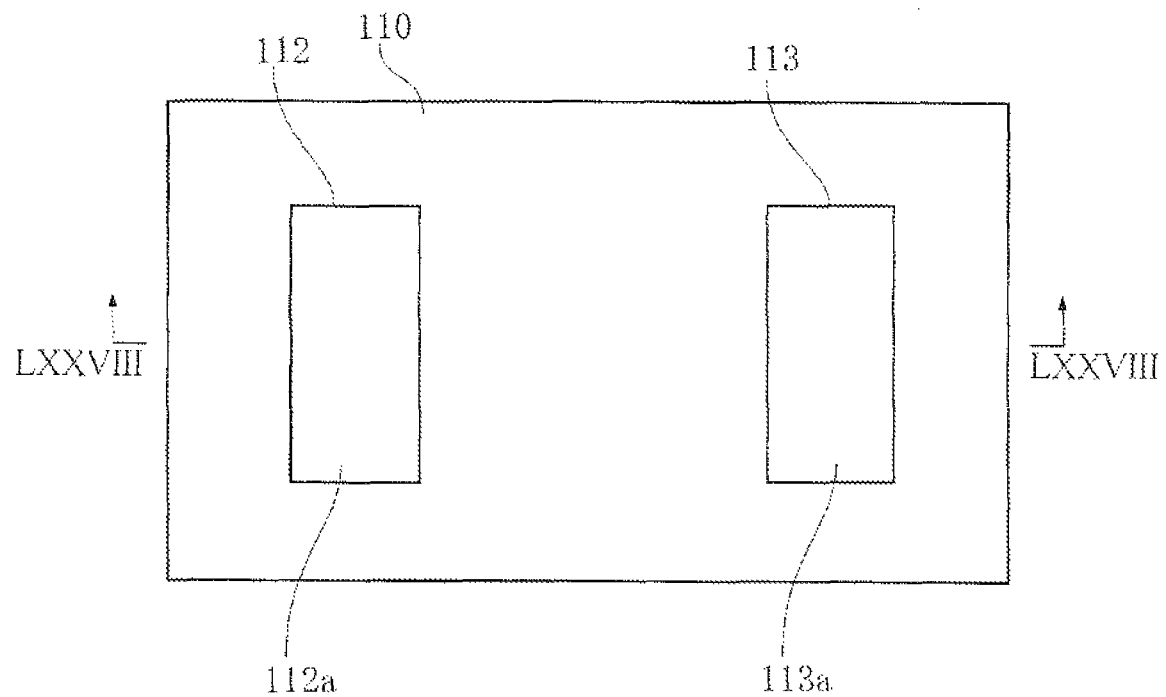
FIG. 77 is a plan view showing a step of a method for manufacturing the pressure sensor shown in FIG. 75.
Figure 78:
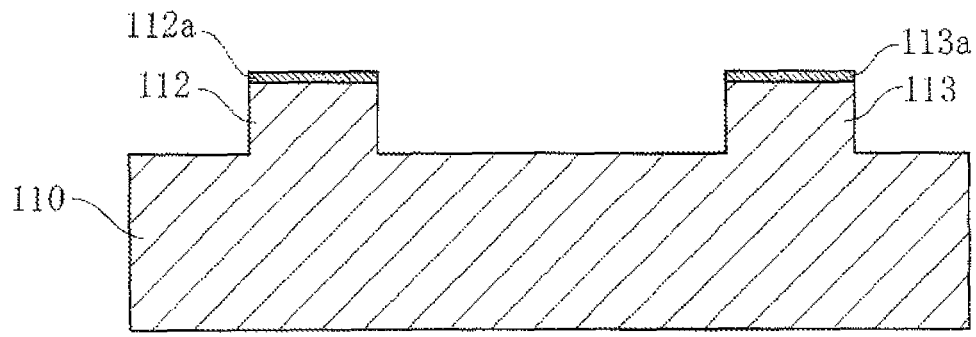
FIG. 78 is a sectional view taken along lines LXXVIII-LXXVIII in FIG. 77.

FIGS. 77 and 78 show the step of making a pair of plate-like members 112 and 113. This step comprises preparing a semiconductor substrate 110 in the form of a flat plate, forming oxide layers 112*a* and 113*a* having a thickness of 0.5 μm on the surface of the semiconductor substrate 110, and etching Si. The oxide layers 112*a* and 113*a* are formed to cover the portions where the plate-like members 112 and 113 are to be formed, as viewed in the lamination direction. For instance, the oxide layers 112*a* and 113*a* are formed by thermally oxidizing the surface of the prepared semiconductor substrate 110 and then etching away unnecessary portions. In the step of Etching Si, gas-phase etching is performed using gas containing F obtained by decomposing $CHF_3$ gas by discharge. In this etching, the portions covered with the oxide layers 112*a* and 113*a* in the lamination direction remain, so that the shape as shown in FIG. 78 is obtained.

Figure 79:
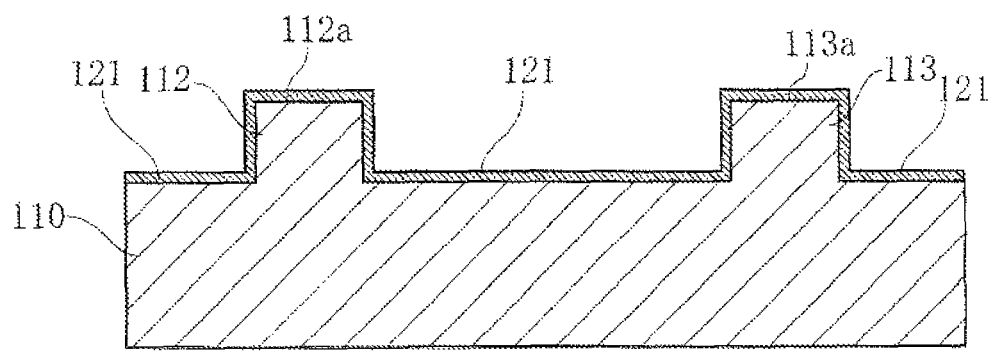
FIG. 79 is a sectional view showing a step subsequent to the step of FIG. 78.

In the next step, an oxide film 121 is formed, as shown in FIG. 79. This step can be performed by thermally oxidizing the surface of the semiconductor substrate 110.

Figure 80:
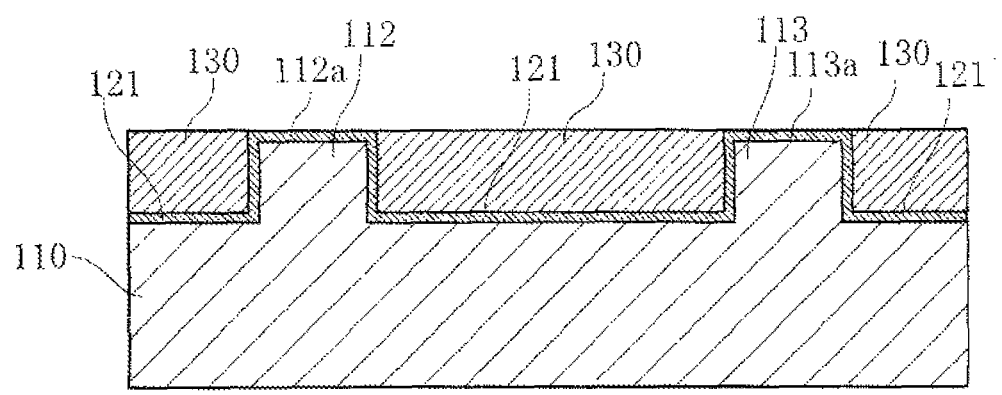
FIG. 80 is a sectional view showing a step subsequent to the step of FIG. 79.

In the next step, a semiconductor layer 130 is formed, as shown in FIG. 80. Specifically, the semiconductor layer 130 is formed by causing polycrystalline silicon to grow by e.g. chemical vapor deposition (CVD). Further, in this step, CMP (chemical mechanical polishing) is performed so that the surface of the semiconductor layer 130 is flush with the surface of the oxide layers 112*a* and 113*a*.

Figure 81:
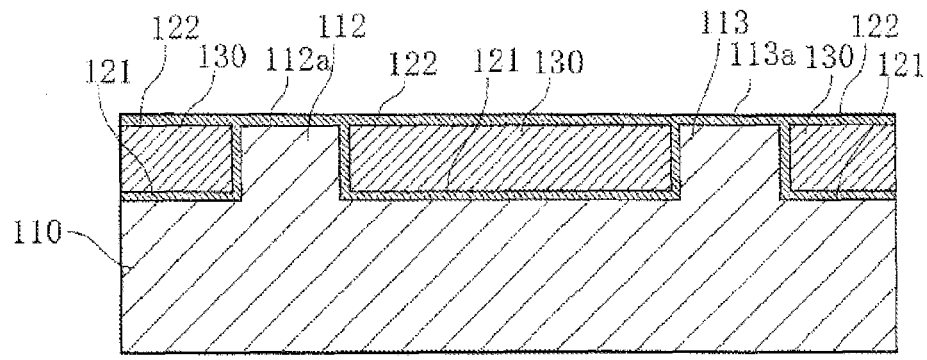
FIG. 81 is a sectional view showing a step subsequent to the step of FIG. 80.

In the next step, as shown in FIG. 81, the surface of the semiconductor layer 130 is thermally oxidized to form an oxide layer 122.

Figure 82:
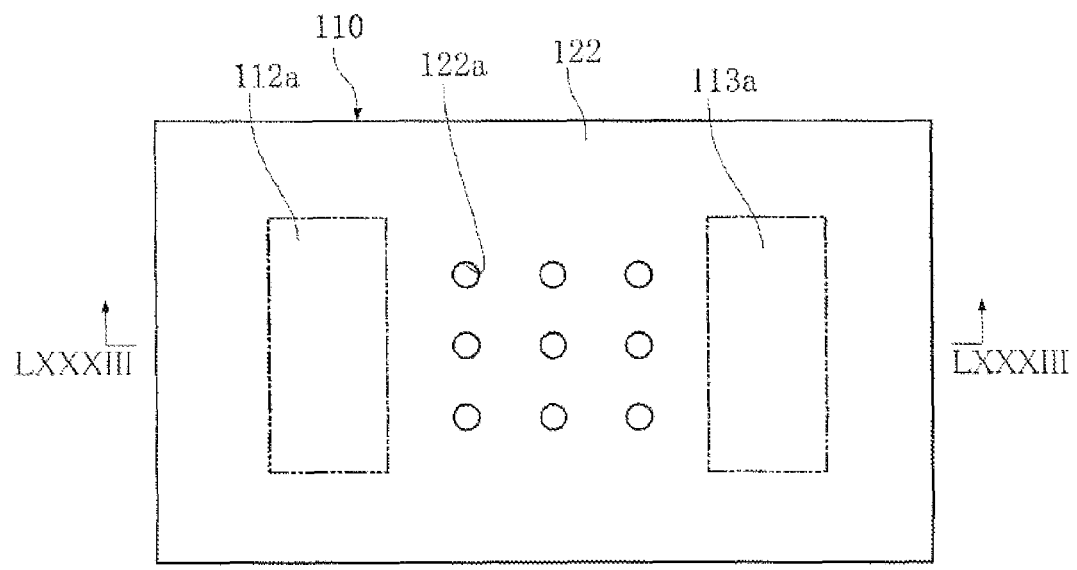
FIG. 82 is a plan view showing a step subsequent to the step of FIG. 81.
Figure 83:
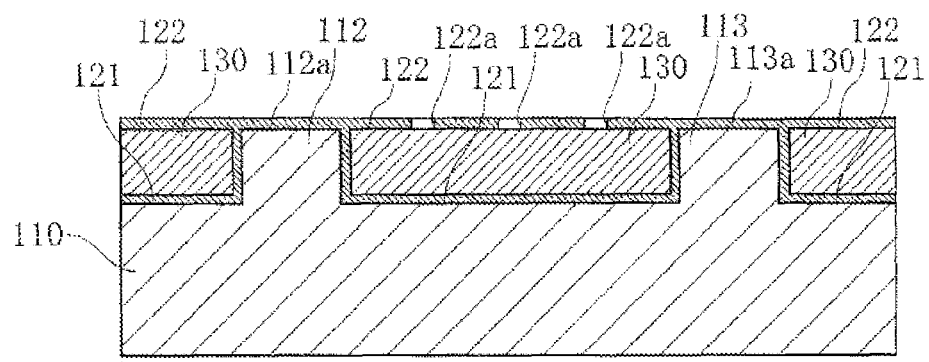
FIG. 83 is a sectional view taken along lines LXXXIII-LXXXIII in FIG. 82.
Figure 84:
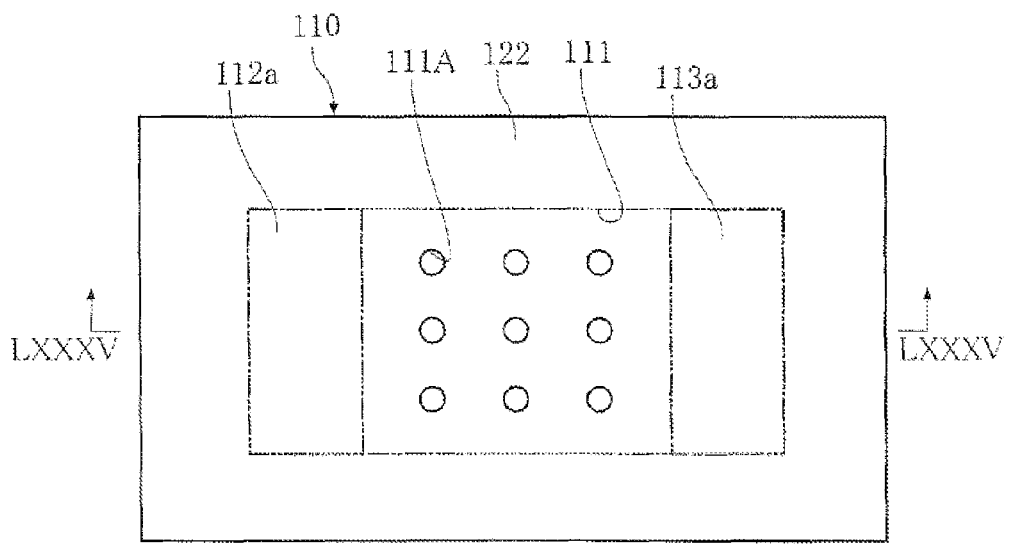
FIG. 84 is a plan view showing a step subsequent to the step of FIG. 82.
Figure 85:
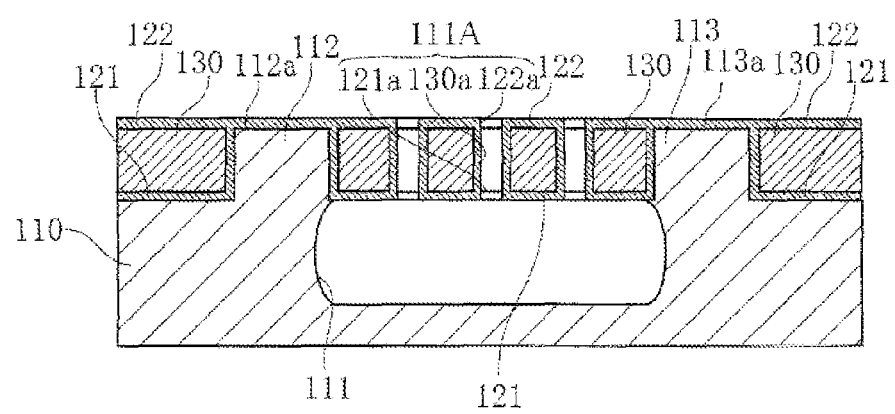
FIG. 85 is a sectional view taken along lines LXXXV-LXXXV in FIG. 84.

In the next step, as shown in FIGS. 82 and 83, through-holes 122*a* are formed in the oxide layer 122. Then, as described above by referring to FIGS. 59-63 with respect to the fourth embodiment, the step of forming through-holes 130*a*, the step of oxidizing the inner circumferential surfaces of the through-holes 130*a*, the step of forming vent holes 111A and the step of forming cavity portion 111 are performed, whereby the state shown in FIGS. 84 and 85 is obtained. Thereafter, the step of sealing the vent holes 111A, the step of removing the oxide layer 122 on the semiconductor layer 130 and the oxide layers 112*a*, 113*a*, the step of forming piezoresistors 175, 176, 177, 178 and the step of forming a bridge circuit are performed, whereby the pressure sensor 104 shown in FIGS. 75 and 76 is completed.

The step of forming piezoresistors 175, 176, 177, 178 can be performed by e.g. doping the material for the piezoresistors 175, 176, 177, 178 in the surface the semiconductor layer 130 and diffusing the material.

In the pressure sensor 104, similarly to the pressure sensor 101, the cavity portion 111 and the movable portion 161 are formed by making vent holes 111A in the semiconductor layer 130 and etching the semiconductor substrate 110 through the vent holes 111A. Thus, unlike the conventional method which uses a plurality of semiconductor substrates, the pressure sensor 104 is produced from a single semiconductor substrate 110. Thus, the pressure sensor 104 realizes a simple manufacturing process and a low manufacturing cost.

The pressure sensor according to the present invention is not limited to the foregoing embodiments. The specific structure of each part of the pressure sensor according to the present invention can be varied in design in many ways. For instance, although the pressure sensor 103 has a structure based on the pressure sensor 101, it may have a structure based on the pressure sensor 102. The sealing members 141 may fill the entirety of the through-holes 130*a* and may further extend into the through-holes 121*a*.

The pressure sensor 104 may be provided with an opening 111*a*, a pipe 163 and a gas supply chamber 162, similarly to the pressure sensor 103. The piezoresistors 175, 176, 177, 178 shown for the pressure sensor 104 may be provided in the pressure sensors 101 and 102, instead of the piezoresistors 171, 172, 173, 174. Conversely, the piezoresistors 171, 172, 173, 174 shown for the pressure sensor 102 may be used for the pressure sensor 104, instead of the piezoresistors 175, 176, 177, 178.

For instance, although the semiconductor substrate 110 is made of single-crystal silicon Si in the foregoing embodiments, polycrystalline silicon may be used instead.

Figure 86:
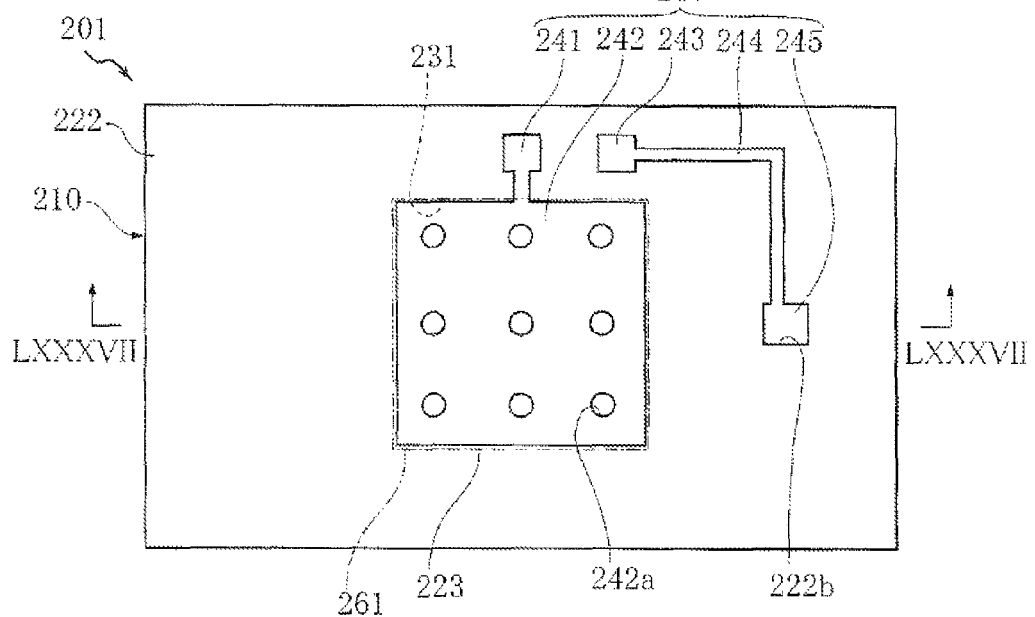
FIG. 86 is a plan view showing a pressure sensor according to an eighth embodiment of the present invention.
Figure 87:
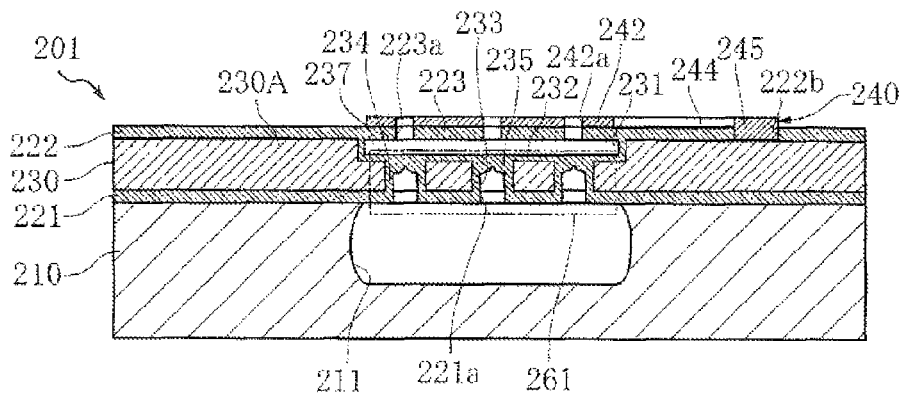
FIG. 87 is a sectional view taken along lines LXXXVII-LXXXVII in FIG. 86.

FIGS. 86 and 87 show a pressure sensor according to an eighth embodiment of the present invention. The pressure sensor 201 of this embodiment includes a semiconductor substrate 221, a (first) insulating layer 221, an insulating cover 222, a (third) insulating cover 223, an intermediate layer 230 and an electrode layer 240.

The semiconductor substrate 210 is e.g. a single-crystal silicon (Si) substrate having a thickness of about 300 μm in the lamination direction (vertical direction in FIG. 87) and includes a cavity portion 211 the inside of which is in a vacuum state or at a given pressure. The cavity portion 211 is open to the obverse surface of the semiconductor substrate 210 and its depth in the lamination direction is e.g. 5 to 100 μm. As viewed in the lamination direction, the cavity portion 211 is in the form of a square, an elongated rectangle, a circle or an oval and has a length of e.g. 50 μm to several millimeters in the horizontal direction in FIG. 86.

The intermediate layer 230 is formed on the semiconductor substrate 210 and has a thickness of about 1 to 50 μm. The intermediate layer comprises a semiconductor layer 230A, a recess 231, a (second) insulating layer 232, a plurality of through-holes 223 formed in the semiconductor layer 230A, a protective film 234, a sealing member 235 and a cavity portion 237. The semiconductor layer 230A, which is made of polycrystalline silicon, constitutes most part of the intermediate layer 230. The remaining part of the intermediate layer is formed by processing the semiconductor layer 230A, as described later in explaining the manufacturing method.

The recess 231 is provided at a position overlapping the cavity portion 211 as viewed in the lamination direction. The recess 231 extends e.g. about 2 µm inward from the surface of the intermediate layer 230 in the lamination direction. The cavity portion 237 is defined in the recess 231.

The insulating layer 232 covers the surface of the recess 231. The thickness of the insulating layer 232 is e.g. about 1.0 µm. For instance, the insulating layer 232 is made of e.g. silicon dioxide ($SiO_2$).

The through-holes 233 are formed in an area overlapping the recess 231 as viewed in the lamination direction and extend from the surface of the intermediate layer 230 toward the recess 231 in the lamination direction. As viewed in the lamination direction, each of the through-holes 233 has a circular shape with a diameter of 0.5 to 5.0 µm or an oval shape having a similar size.

The protective film 234 is a $SiO_2$ film having a thickness of about 0.2 µm formed on the inner circumferential surface of each of the through-holes 233.

The sealing member 235 is made of e.g. $SiO_2$ and seals the upper end of each of the through-holes 233 in the lamination direction. The sealing member 235 is integral with the insulating layer 232 and the protective film 234.

The insulating layer 221 is provided between the semiconductor substrate 210 and the intermediate layer 230 and made of e.g. $SiO_2$. The thickness of the insulating layer 221 is e.g. 0.1 to 1.0 µm. The insulating layer 221 has through-holes 221a connected to the through-holes 233.

The insulating cover 222 covers the surface of the intermediate layer 230 except the surface of the recess 231, and is made of e.g. $SiO_2$. The thickness of the insulating cover 222 is e.g. 0.1 to 1 µm. The insulating cover 222 has an opening 222b exposing the semiconductor layer 230A. For instance, the opening 222b is provided at the right end in FIG. 86.

The insulating cover 223 is made of e.g. $SiO_2$ and provided to close the cavity portion 237. The thickness of the insulating cover 223 is e.g. 0.1 to 1.0 µm. The shape of the insulating cover 223 as viewed in the lamination direction is the same as that of the bottom surface of the recess 231 and the edges of the insulating cover is integral with the insulating cover 222 and the insulating layer 232. The insulating cover 223 has a plurality of through-holes 223a reaching the hollow portion 237 at the lower ends in the lamination direction.

The electrode layer 240 is formed on the insulating cover 222 or the insulating cover 223 and includes a fixed electrode terminal 241, a fixed electrode 242, a movable electrode terminal 243, a connection line 244 and a filling portion 245. The electrode layer 240 is made of e.g. aluminum (Al).

The fixed electrode terminal 241 is provided at an appropriate portion on the insulating cover 222 and used for electrical connection to the outside, for example. The fixed electrode 242 is formed on the insulating cover 223 and electrically connected to the fixed electrode terminal 241. The fixed electrode 242 has a plurality of through-holes 242a respectively connected to the through-holes 223a at the lower ends in the lamination direction. The fixed electrode 242 covers the entirety of the insulating cover 223.

The movable electrode terminal 243 is electrically insulated from the fixed electrode terminal 241 and the fixed electrode 242 and provided on the insulating cover 222 to be electrically connected to the filling portion 245 via the connection line 244. The filling portion 245 fills the opening 222b and is in contact with the semiconductor layer 230A. Thus, the movable electrode terminal 243 is electrically connected to the semiconductor layer 230A via the connection line 244 and the filling portion 245.

The operation and advantages of the pressure sensor 201 are described below.

In the pressure sensor 201, the portion sandwiched between the cavity portions 211 and 237 in the lamination direction serves as a deformable movable portion 261. With the above-described arrangement, since the insulating cover 223 and the fixed electrode 242 have the through-holes 223a, 242a, the cavity portion 237 is filled with gas flowing from the outside. On the other hand, as noted before, the cavity portion 211 is in a vacuum state or at a given pressure. Thus, the movable portion 261 is pressed by the gas flowing into the cavity portion 237 and is hence deformed. Since part of the semiconductor layer 230A is included in the movable portion 261, when the movable portion 261 is deformed, the capacitance between the fixed electrode 242 and the semiconductor layer 230A changes. As noted before, the semiconductor layer 230A is electrically connected to the movable electrode terminal 243, and the fixed electrode 242 is electrically connected to the fixed electrode terminal 241. Thus, in the pressure sensor 201, the semiconductor layer 230A in the movable portion 261 functions as a movable electrode, and changes in capacitance between the movable portion 261 and the fixed electrode 242 is outputted through the fixed electrode terminal 241 and the movable electrode terminal 243, whereby the absolute pressure of the gas flowing into the cavity portion 237 is measured.

A method for manufacturing the pressure sensor 201 is described with reference to FIGS. 88 to 106.

Figure 88:
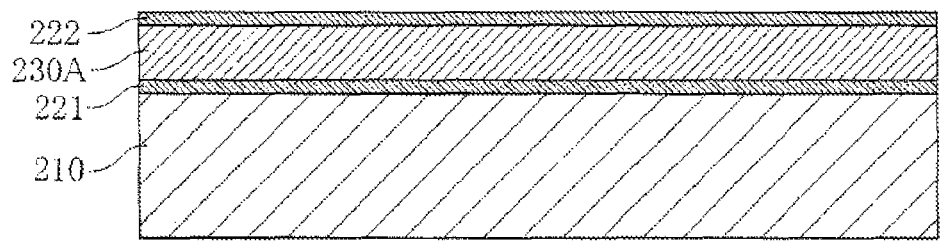
FIG. 88 is a sectional view showing a step subsequent to the step of FIG. 87.

First, the state shown in FIG. 88 is obtained by performing the step of preparing a semiconductor substrate 210 in the form of a flat plate, the step of forming an insulating layer 221 on the surface of the semiconductor substrate 210, the step of forming a semiconductor layer 230A on the insulating layer 221 and the step of forming an insulating cover 222 on the semiconductor layer 230A. The step of forming the insulating layer 221 is performed by e.g. thermally oxidizing the surface of the semiconductor substrate 210. The step of forming the semiconductor layer 230A is performed by causing polycrystalline silicon to grow by e.g. chemical vapor deposition (CVD). The step of forming the insulating cover 222 is performed by thermally oxidizing the surface of the semiconductor layer 230A.

Figure 89:
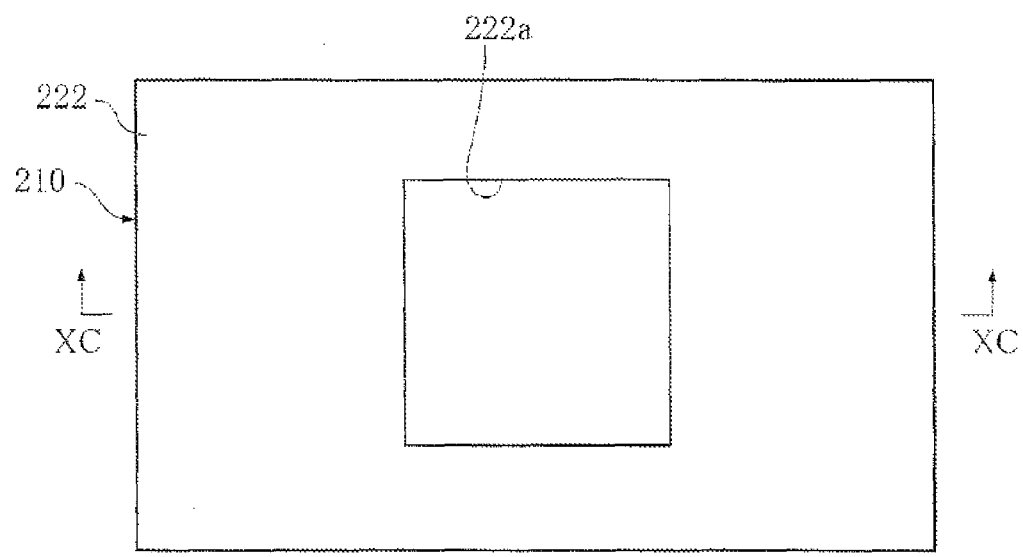
FIG. 89 is a plan view showing a step subsequent to the step of FIG. 88.
Figure 90:
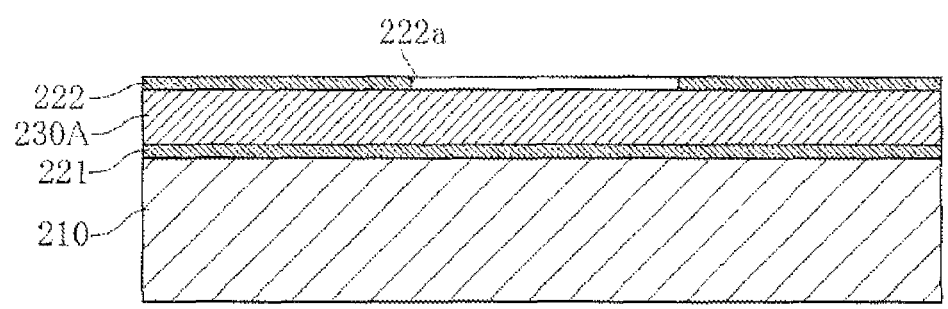
FIG. 90 is a sectional view taken along lines XC-XC in FIG. 89.

In the next step, as shown in FIGS. 89 and 90, an opening 222a is formed in the insulating cover 222. The opening 222a is formed to expose the portion of the semiconductor layer 230A where the recess 231 is to be formed. This step is performed by providing a resist of resin which exposes the portion where the opening 222a is to be formed and performing gas-phase etching using the reaction between fluorine-containing molecular ions ($HF_2^-$) and $SiO_2$. $HF_2^-$ can be obtained by reacting hydrogen fluoride (HF) with water vapor. For instance, HF can be obtained by reacting atomic fluorine (F) and molecular fluorine ($F_2$), which is obtained by decomposing e.g. $CHF_3$ gas, with water vapor. Since Si which is not oxidized does not easily react with $HF_2^-$, the semiconductor layer 230A is not removed by the etching and hence remains. Instead of the gas-phase etching, wet etching using aqueous solution of hydrogen fluoride (HF) may be performed.

Figure 91:
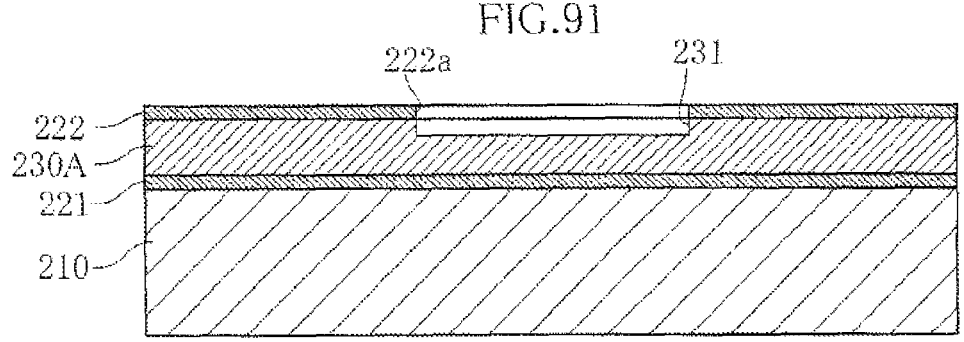
FIG. 91 is a sectional view showing a step subsequent to the step of FIG. 90.

In the next step, a recess 231 is formed, as shown in FIG. 91. This step can be performed by gas-phase anisotropic etching using gas containing HF. The gas containing HF can be prepared by e.g. decomposing by discharge a gas obtained by adding water vapor to $CHF_3$ gas. By performing etching while keeping HF in a dry state and suppressing generation of $HF_2^-$, $SiO_2$ is prevented from being etched away. In this step, therefore, the insulating cover 222 remains.

Figure 92:
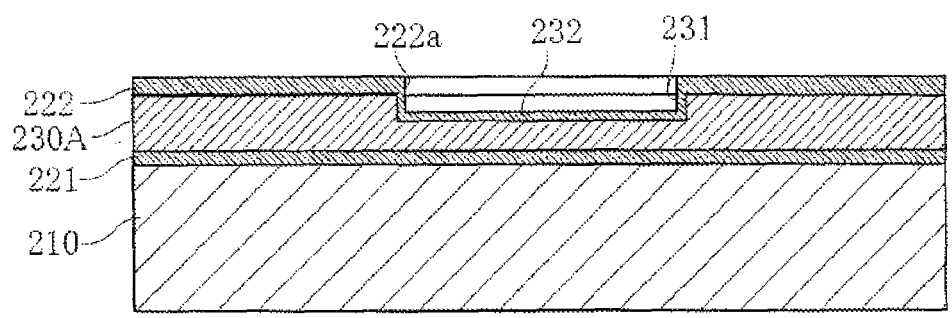
FIG. 92 is a sectional view showing a step subsequent to the step of FIG. 91.

In the next step, as shown in FIG. 92, an insulating layer 232 is formed. This step is performed by thermal oxidization or by causing SiO$_2$ to grow by CVD. In this step, whichever method is used, the insulating cover 222 becomes thicker at the same time as the insulating layer 232 is formed.

Figure 93:
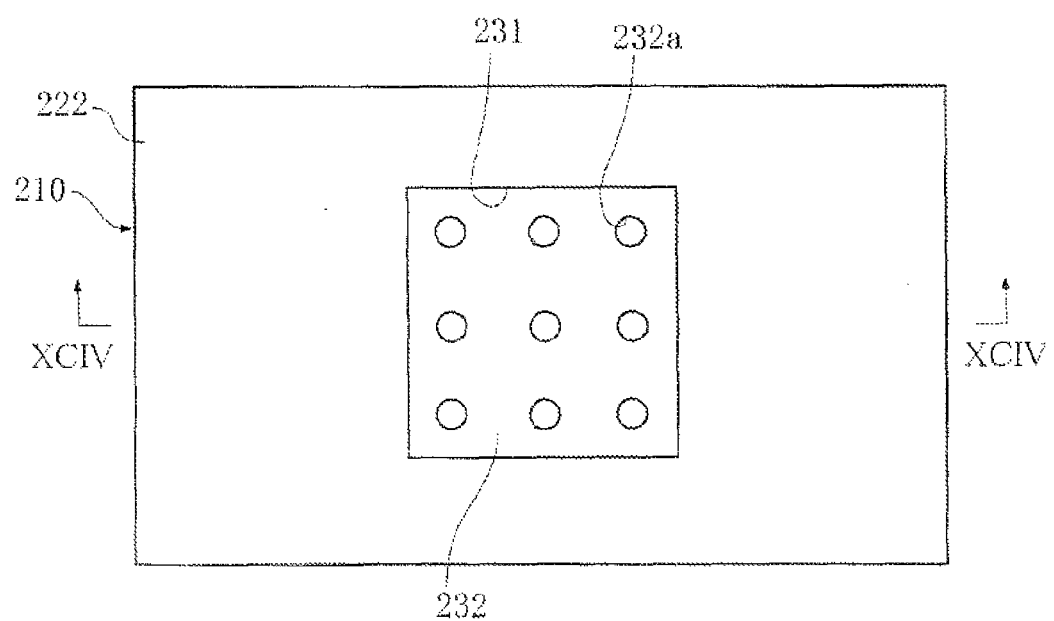
FIG. 93 is a plan view showing a step subsequent to the step of FIG. 92.
Figure 94:
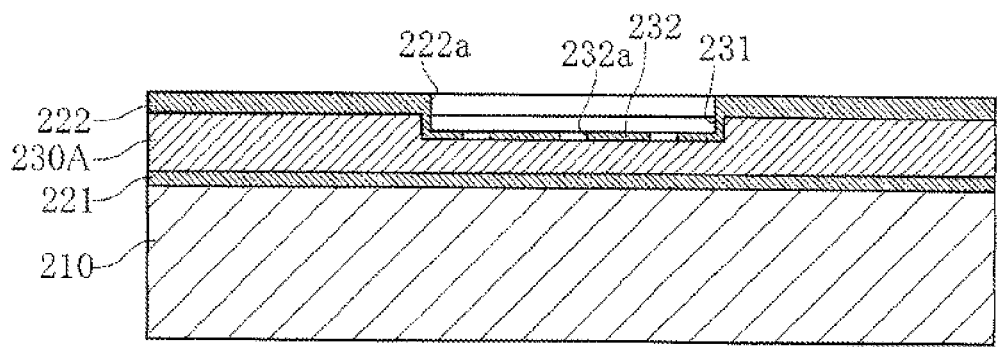
FIG. 94 is a sectional view taken along lines XCIV-XCIV in FIG. 93.

In the next step, a plurality of through-holes 232a are formed, as shown in FIGS. 93 and 94. Each of the through-holes 232a is formed to penetrate the insulating layer 232 in the lamination direction to expose the surface of the semiconductor layer 230A. This step is performed by gas-phase anisotropic etching using the reaction between HF$_2^-$ and SiO$_2$, similarly to the step of forming the opening 222a. In this case, a resist of resin having a plurality of openings corresponding to the through-holes 232a is used.

Figure 95:
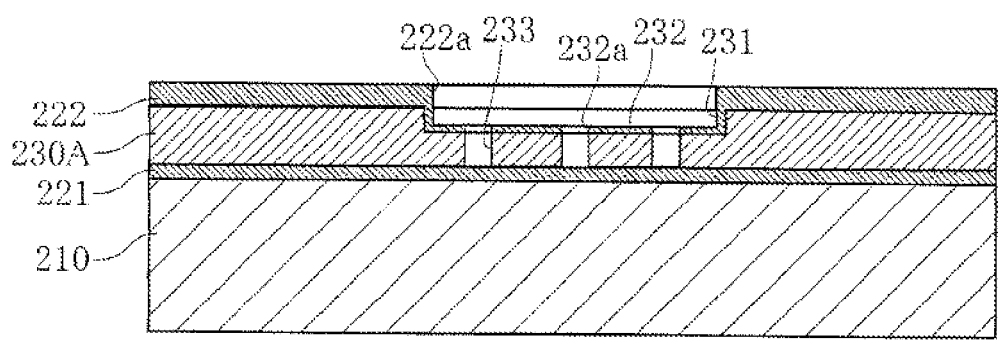
FIG. 95 is a sectional view showing a step subsequent to the step of FIG. 94.

In the next step, a plurality of through-holes 233 are formed, as shown in FIG. 95. This step can be performed by gas-phase anisotropic etching using gas containing HF, similarly to the step of forming the recess 231.

Figure 96:
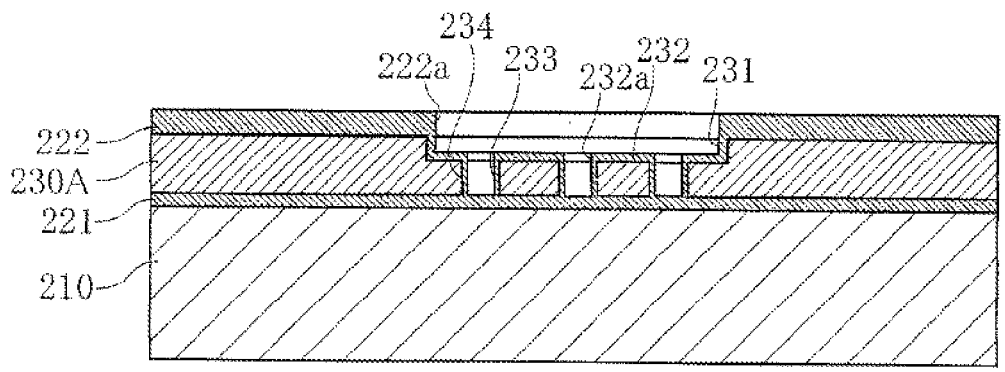
FIG. 96 is a sectional view showing a step subsequent to the step of FIG. 95.

In the next step, a protective film 234 is formed, as shown in FIG. 96. This step is performed by thermal oxidation or by causing SiO$_2$ to grow by CVD.

Figure 97:
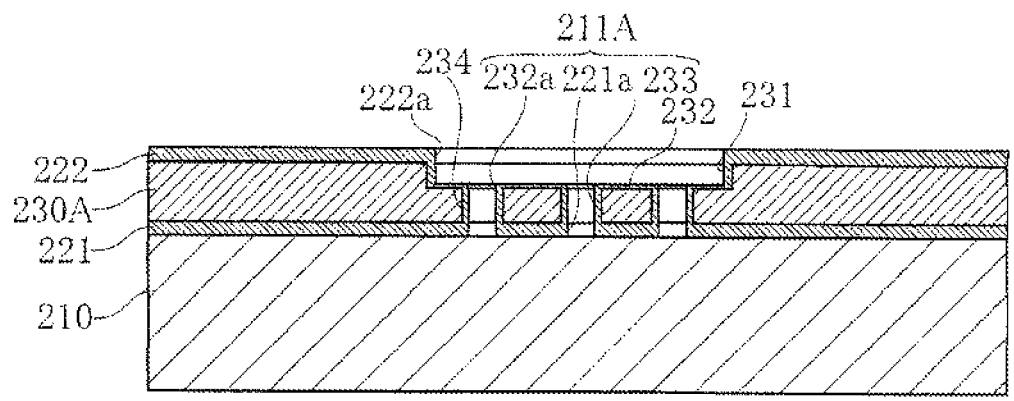
FIG. 97 is a sectional view showing a step subsequent to the step of FIG. 96.

In the next step, a vent hole 211A is formed, as shown in FIG. 97. The vent hole 211A is used to introduce etching gas from the outside to the semiconductor substrate 210 and comprises through-holes 221a, 232a and 233. Since the through-holes 232a and 233 are formed in the previous steps, a plurality of through-holes 221a are formed in this step. This step is performed by gas-phase etching using the reaction between HF$_2^-$ and SiO$_2$. In this step, the insulating cover 222 and part of the insulating layer 232 are also etched to become thinner. When the insulating cover 222 or the insulating layer 232 does not have a sufficient thickness, a resist having the same shape as that used for forming the through-holes 232a can be used.

Figure 98:
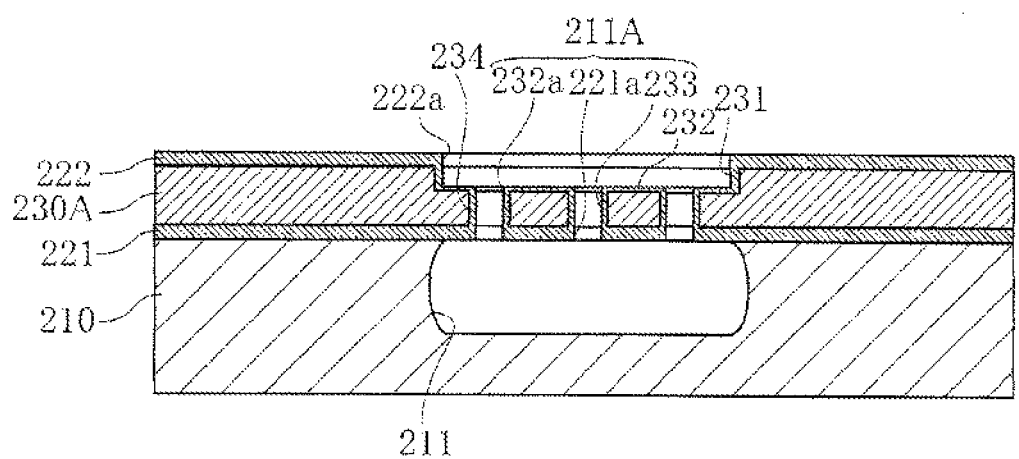
FIG. 98 is a sectional view showing a step subsequent to the step of FIG. 97.

In the next step, a cavity portion 211 is formed, as shown in FIG. 98. This step is performed by gas-phase etching using gas containing atomic fluorine (F). Fluorine (F) easily reacts with silicon (Si) but does not easily react with SiO$_2$. Thus, by sending gas containing F to the semiconductor substrate 210 through the vent holes 211A covered with SiO$_2$, the semiconductor substrate 210 is etched and the cavity portion 211 is formed before the semiconductor layer 230A is etched. The gas containing F can be obtained by decomposing CHF$_3$ gas by discharge.

The step of forming the cavity portion 211 can be performed by etching using xenon fluoride gas. The difference between Si and SiO$_2$ in reactivity with xenon fluoride gas is larger than that in reactivity with CHF$_3$ gas. Thus, the protective film 234 can be made thinner by using xenon fluoride gas.

Figure 99:
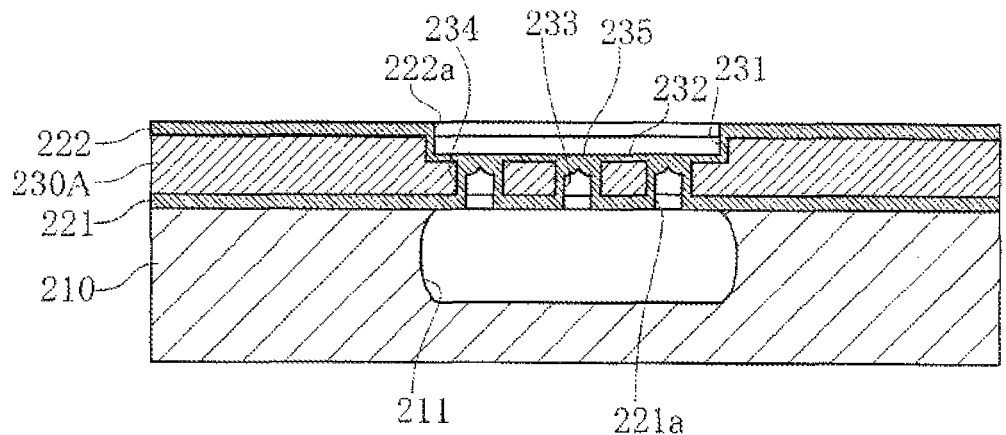
FIG. 99 is a sectional view showing a step subsequent to the step of FIG. 98.

In the next step, the vent hole 211A is sealed, as shown in FIG. 99. By this step, part of the insulating layer 232 becomes thicker, while the sealing member 235 is formed. Specifically, in this step, low pressure chemical vapor deposition (LPCVD) using tetraethoxysilane is performed, whereby SiO$_2$ is deposited on the insulating layer 232 and in the vent holes 211A. By sealing the vent hole 211A in a vacuum state or in an atmosphere of a given pressure, the cavity portion 111 is brought into a vacuum state or at a given pressure.

The sealing of the vent hole 211A can be performed by other methods, such as thermal oxidation to utilize bulging of the oxidized portion or by plasma CVD.

Figure 100:
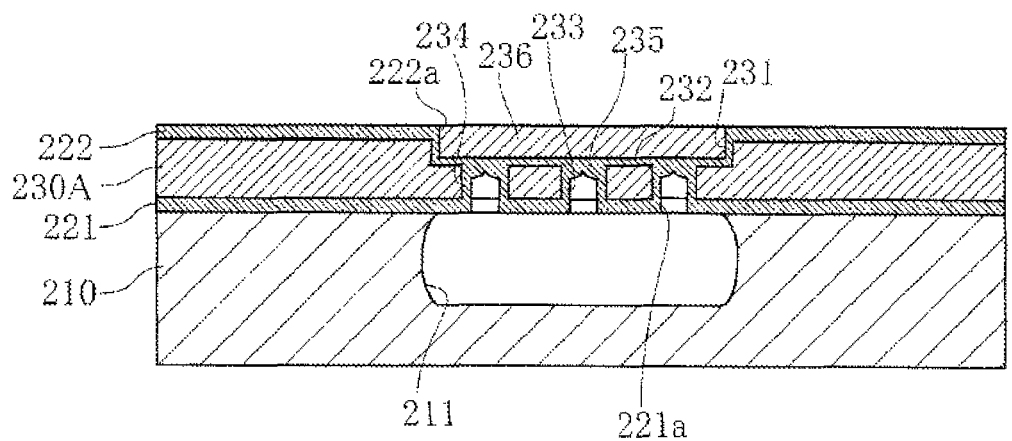
FIG. 100 is a sectional view showing a step subsequent to the step of FIG. 99.

In the next step, a sacrificial layer 236 is formed, as shown in FIG. 100. This step is performed by e.g. embedding polycrystalline silicon in the recess 231 and the opening 222a. In this step, abrading is performed in advance such that the surface of the sacrificial layer 236 is flush with the surface of the insulating cover 222.

Figure 101:
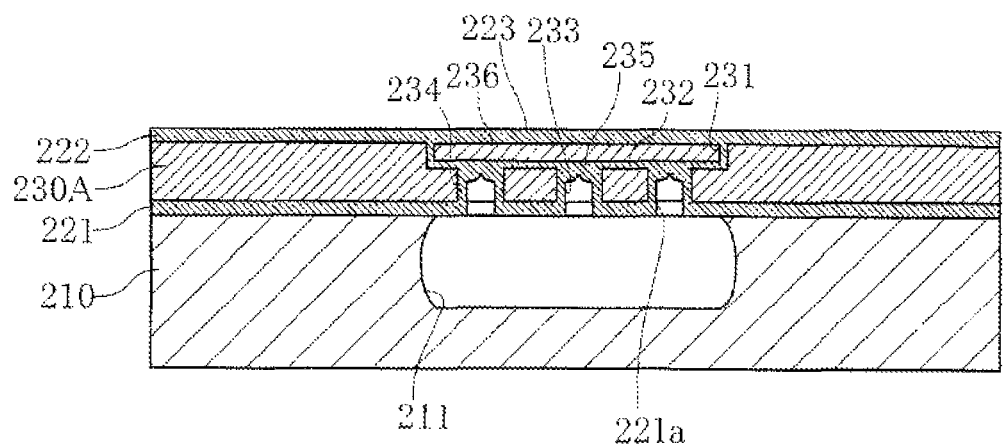
FIG. 101 is a sectional view showing a step subsequent to the step of FIG. 100.

In the next step, an insulating cover 223 is formed, as shown in FIG. 101. This step can be performed by thermally oxidizing the surface of the sacrificial layer 236. The thermal oxidation is performed such that the thickness of the insulating cover 223 becomes substantially equal to that of the insulating cover 222. In the state after this step, the opening 222a is filled with the insulating cover 223, while the recess 231 is filled with the sacrificial layer 236.

Figure 102:
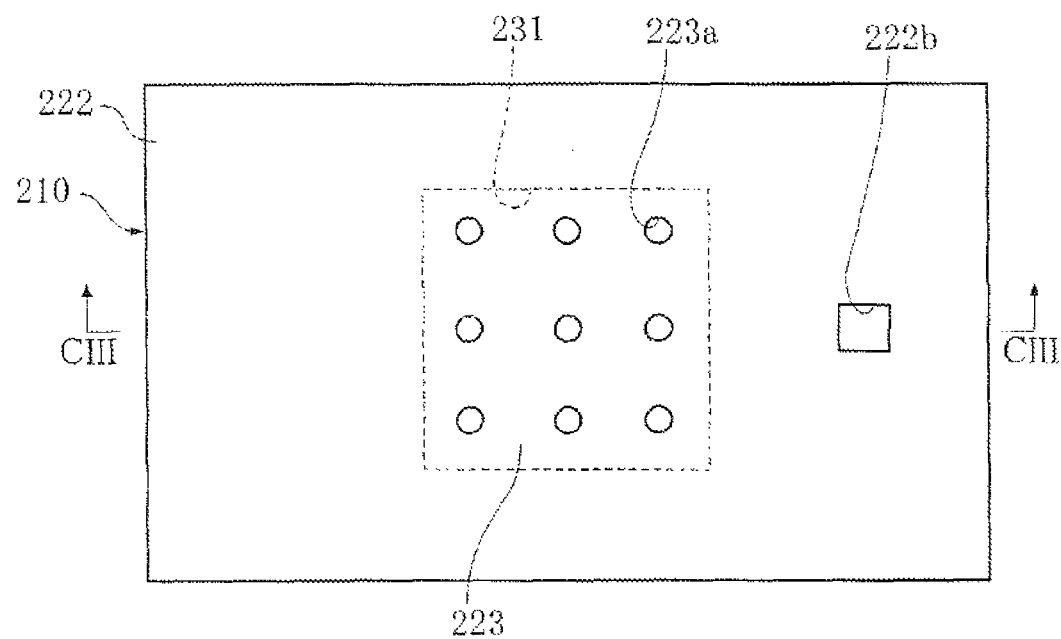
FIG. 102 is a plan view showing a step subsequent to the step of FIG. 101.
Figure 103:
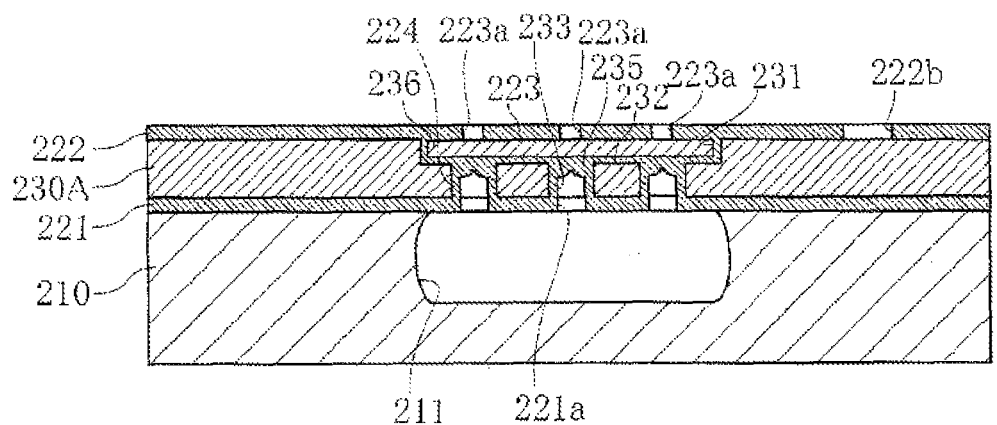
FIG. 103 is a sectional view taken along lines CIII-CIII in FIG. 102.

In the next step, through-holes 223a and an opening 222b are formed, as shown in FIGS. 102 and 103. This step is performed by providing a resist of resin having openings corresponding to the through-holes 223a and the opening 222b and performing gas-phase etching using the reaction between HF$_2^-$ and SiO$_2$.

Figure 104:
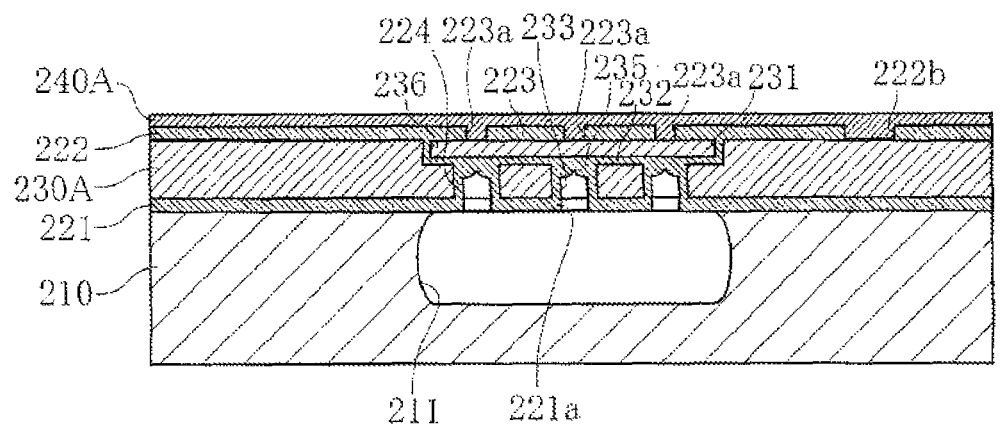
FIG. 104 is a sectional view showing a step subsequent to the step of FIG. 103.

In the next step, a metal layer 240A is formed, as shown in FIG. 104. The metal layer 240A is a layer made of Al and formed to cover the insulating cover 222 and the insulating cover 223. In the through-holes 223a, the metal layer 240A is formed directly on the sacrificial layer 236. In the opening 222b, the metal layer is formed directly on the semiconductor layer 230A. For instance, this step can be performed by depositing Al by CVD.

Figure 105:
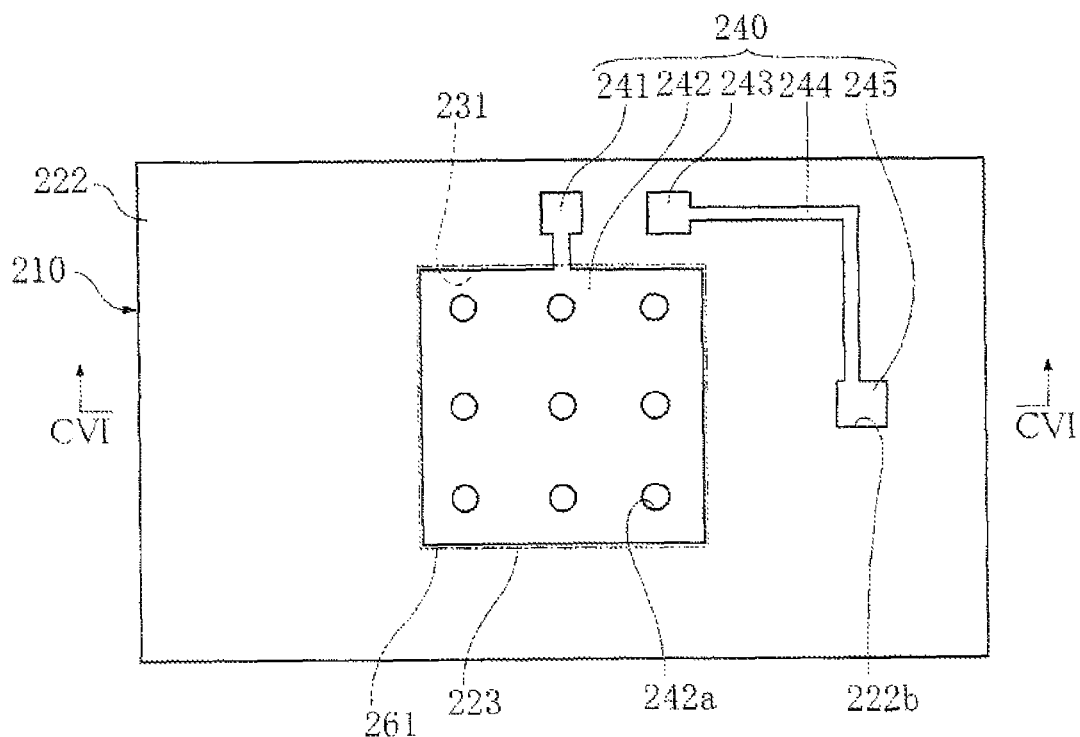
FIG. 105 is a plan view showing a step subsequent to the step of FIG. 104.
Figure 106:
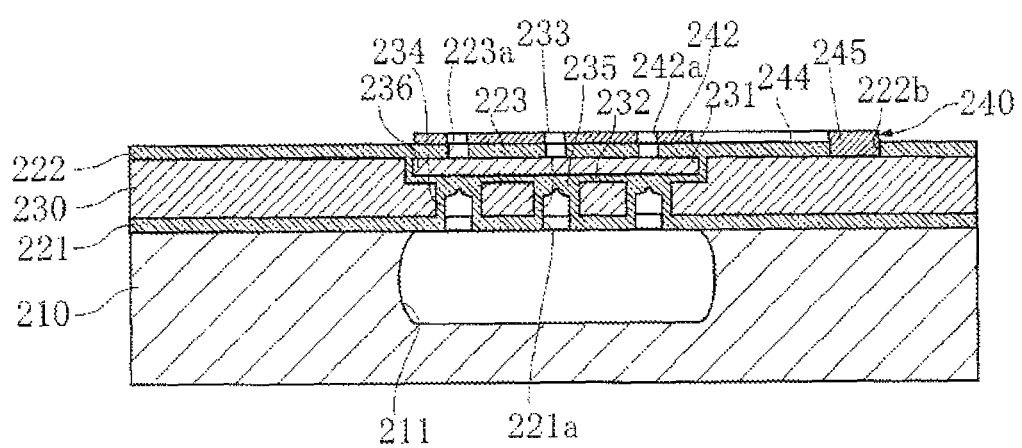
FIG. 106 is a sectional view taken along lines CVI-CVI in FIG. 105.

In the next step, as shown in FIGS. 105 and 106, the metal layer 240A is processed to provide an electrode layer 240. For instance, this step is performed by arranging a resist having the same shape as that of the electrode layer 240 as viewed in the lamination direction and performing gas-phase etching to remove unnecessary portions. The fixed electrode 242 has through-holes 242a overlapping the through-holes 223a as noted before, so that after this step etching of the sacrificial layer 236 by using the through-holes 223a and the through-holes 242a as vent holes is possible. Thus, after this step, the sacrificial layer 236 is removed to form the cavity portion 237. The removal of the sacrificial layer 236 is performed by gas-phase etching using gas containing HF. The intermediate layer 230 is completed by the formation of the cavity portion 237, whereby the pressure sensor 201 shown in FIGS. 86 and 87 is completed.

The operation and advantages of the pressure sensor 201 are described below.

According to the manufacturing method described above, the cavity portion 211 is formed by etching the semiconductor substrate 210 through the vent hole 211A, and the cavity portion 237 is formed by etching the sacrificial layer 236 embedded in the recess 231. Thus, unlike the conventional method which uses a plurality of semiconductor substrates, the pressure sensor 201 is produced from a single semiconductor substrate 210. Thus, the pressure sensor 1 realizes a simple manufacturing process and a low manufacturing cost.

According to this embodiment, the recess 231 is formed by gas-phase etching so that the bottom surface naturally becomes parallel to the surface of the insulating cover 222. Meanwhile, the fixed electrode 242 is formed on the insulating cover 223, which is formed to be flush with the surface of the insulating cover 222. Thus, the reverse surface of the fixed electrode 242 and the bottom surface of the recess 231 which corresponds to the surface of the movable electrode of the pressure sensor 201 naturally become parallel to each other. Moreover, the depth of the recess 231 is easily adjusted by adjusting the etching time. This allows the capacitance between the fixed electrode 242 and the movable portion 261 to be set precisely to a predetermined value. Thus, the pressure sensor 201 ensures more precise pressure measurement.

Moreover, according to the present invention, the recess 231 is covered with the insulating layer 232, and the reverse surface of the fixed electrode 242 is covered with the insulating cover 223. Thus, the capacitance between the fixed electrode 242 and the movable portion 261 is relatively large. A larger capacitance between the fixed electrode 242 and the movable portion 261 allows more sensitive detection of changes in the capacitance. Thus, the pressure sensor 201 ensures more precise pressure measurement.

FIGS. 107-124 show other embodiments of the present invention. In these figures, the elements which are identical or similar to those of the foregoing embodiments are designated by the same reference signs as those used for the foregoing embodiments.

Figure 107:
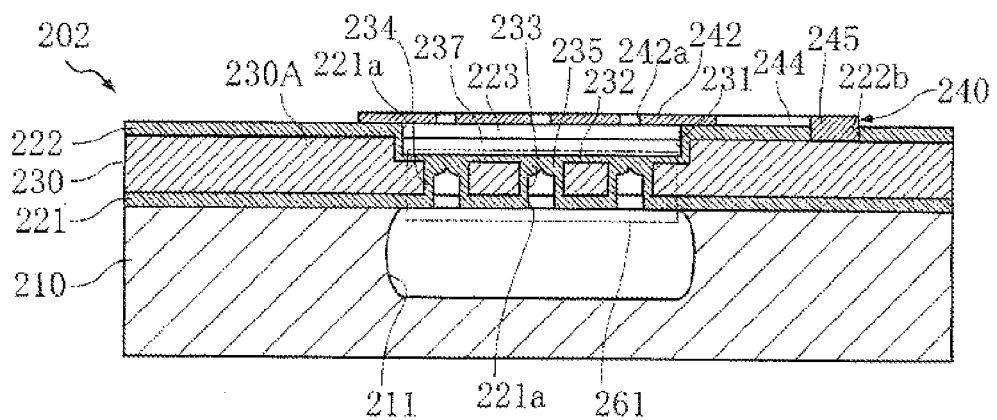
FIG. 107 is a sectional view showing a pressure sensor according to a ninth embodiment of the present invention.

FIG. 107 shows a pressure sensor according to a ninth embodiment of the present invention. The pressure sensor 202 of this embodiment has the same structure as that of the pressure sensor 201 except that it does not have the insulating cover 223 provided in the pressure sensor 201. Since the insulating cover 223 is not provided, the fixed electrode 242 of the pressure sensor 202 is made larger than the recess 231 as viewed in the lamination direction and supported on the insulating cover 222. The pressure sensor 202 is manufactured by omitting the steps of forming the insulating cover 223 and forming through-holes 223a from the method for manufacturing the pressure sensor 201. Thus, the pressure sensor 202 realizes a more simple manufacturing process.

Figure 108:
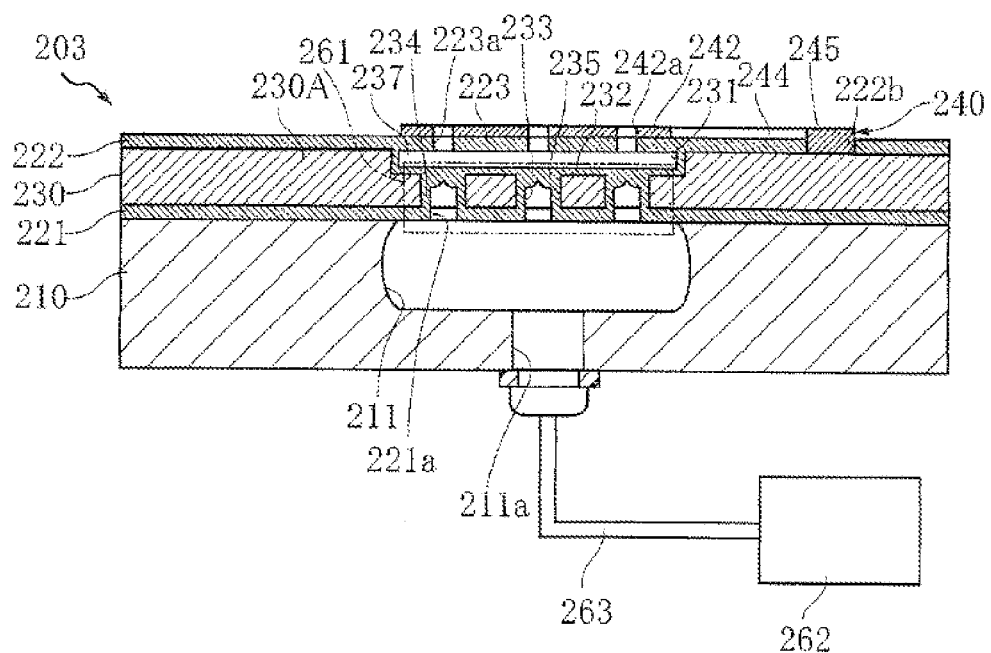
FIG. 108 is a sectional view showing a pressure sensor according to a tenth embodiment of the present invention.

FIG. 108 shows a pressure sensor according to a tenth embodiment of the present invention. In the pressure sensor 203 of this embodiment, the cavity portion 211 is open to the reverse surface of the semiconductor substrate 210, and to the opening 211a is connected a pipe 263. The pipe 263 is connected to a gas supply chamber 262. The structures of the other parts of the pressure sensor 203 are the same as those of the pressure sensor 201.

To form the opening 211a, before the semiconductor layer 230A is formed on the semiconductor substrate 210, etching is performed with respect to the reverse surface of the semiconductor substrate 210 and a recess for connection to the cavity portion 211, which is formed later, is formed.

The gas supply chamber 262 is used to supply gas of a given pressure to the cavity portion 211. Thus, unlike the pressure sensor 201, the inside of the cavity portion 211 of the pressure sensor 203 is filled with a gas of the given pressure. The movable portion 261 receives pressure from each of the gas in the cavity portion 211 and the gas in the cavity portion 237 and is deformed in accordance with the relative pressure. Thus, the pressure sensor 230 can measure the relative pressure between the pressure of the outside gas and the pressure of the gas in the cavity portion 211 which is supplied from the gas supply chamber 262.

When the pressure sensor 203 is placed in a vacuum atmosphere, gas of an unknown pressure can be supplied from the gas supply chamber 262 into the cavity portion 211 so that the absolute pressure of the supplied gas can be measured. Similarly, when the cavity portion 237 is sealed to provide a vacuum after the pressure sensor 203 is completed, the absolute pressure of the gas in the cavity portion 211 can be measured.

Figure 109:
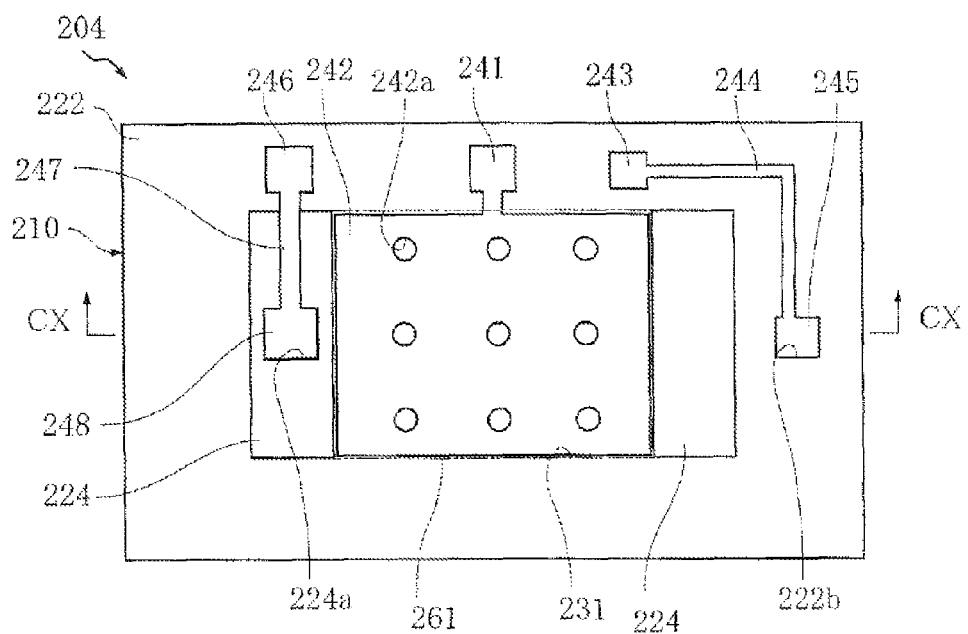
FIG. 109 is a plan view showing a pressure sensor according to an eleventh embodiment of the present invention.
Figure 110:
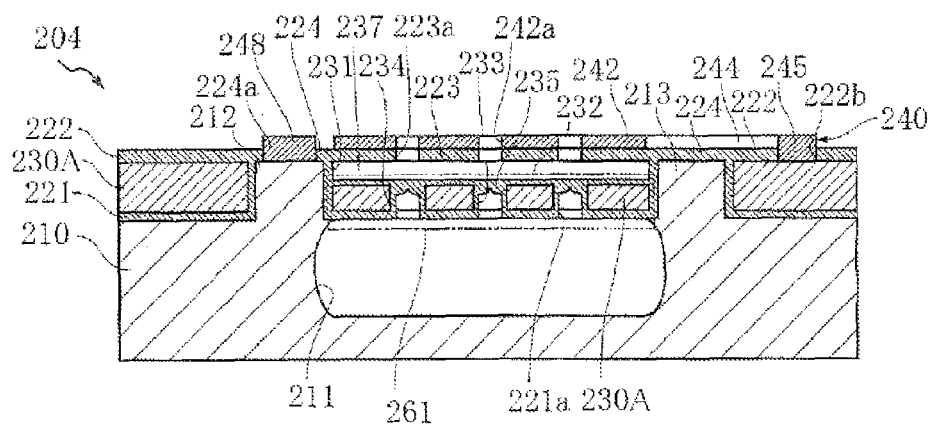
FIG. 110 is a sectional view taken along lines CX-CX in FIG. 109.

FIGS. 109 and 110 show a pressure sensor according to an eleventh embodiment of the present invention. The pressure sensor 204 shown in FIGS. 109 and 110 includes a pair of plate-like members 212, 213, protective layers 224, a ground electrode terminal 246, a connection line 247 and a filling portion 248. The structure of other portions is the same as that of the pressure sensor 201. The ground electrode terminal 246, the connection line 247 and the filling portion 248 are part of the electrode layer 240.

As shown in FIG. 110, the paired plate-like members 212 and 213 project about 7 µm in the lamination direction from the surface of the semiconductor substrate 210. In the horizontal direction in FIG. 110, a movable portion 261 and a cavity portion 237 are provided between the paired plate-like member 212 and 213.

The protective layers 224 cover the top surfaces of the paired plate-like members 212, 213 in the lamination direction. The protective layers 224 are made of e.g. $SiO_2$. The protective layer 224 formed on the plate-like member 212 has an opening 224a. The filling portion 248 is provided to fill the opening 224a.

The ground electrode terminal 246 is a terminal for connection to external ground and provided at an appropriate position on the insulating cover 222. The ground electrode terminal 246 is electrically connected to the filling portion 248 via the connection line 247. The ground electrode terminal 246, the connection line 247 and the filling portion 248 are made of e.g. Al and arranged to be electrically insulated from the fixed electrode terminal 241 and the movable electrode terminal 243.

A method for manufacturing the pressure sensor 204 is described below with reference to FIGS. 111-124, mainly as to the difference from the method for manufacturing the pressure sensor 201.

Figure 111:
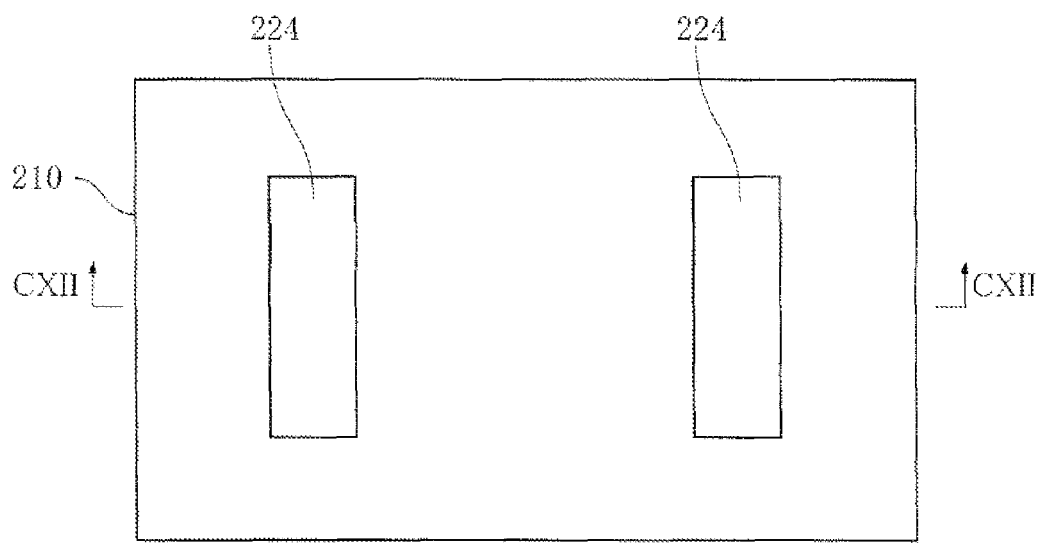
FIG. 111 is a plan view showing a step of a method for manufacturing the pressure sensor shown in FIG. 110.
Figure 112:
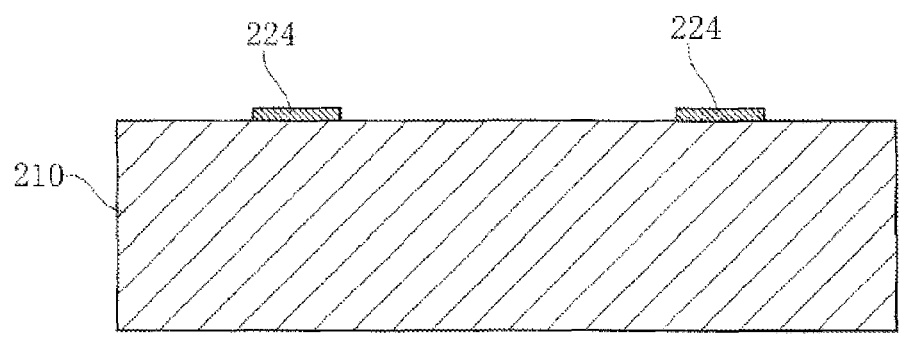
FIG. 112 is a sectional view taken along lines CXII-CXII in FIG. 111.
Figure 113:
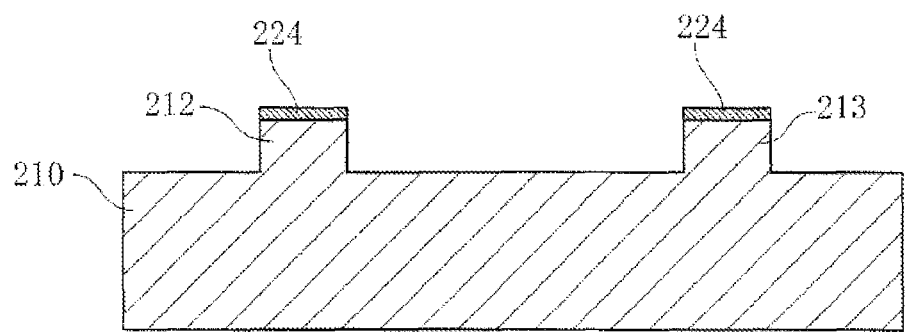
FIG. 113 is a sectional view showing a step subsequent to the step of FIG. 112.

First, a semiconductor substrate 210 in the form of a plate having an uniform thickness of about 100 to 1000 µm is prepared, and the semiconductor substrate 210 is processed to have a pair of plate-like members 212 and 213 described above. In this process, a step of forming protective layers 224 as shown in FIGS. 111 and 112 and a step of thinning the semiconductor substrate 210 in the lamination direction as shown in FIG. 113 are performed. The step of forming the protective layers 224 is performed by forming an $SiO_2$ layer having a thickness of about 0.5 µm on the surface of the semiconductor substrate 210 by CVD or thermal oxidation and then etching away unnecessary portions. The etching may be gas-phase anisotropic etching using the reaction between $HF_2^-$ and $SiO_2$. Thinning the semiconductor substrate 210 in the lamination direction can be performed by gas-phase anisotropic etching using gas containing atomic fluorine.

Figure 114:
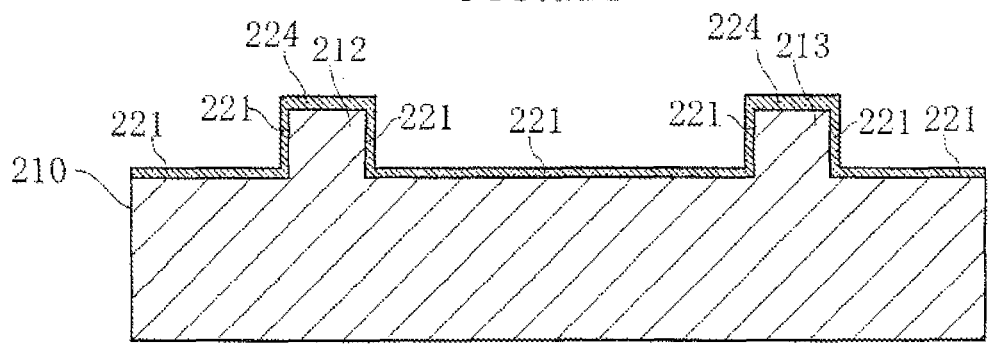
FIG. 114 is a sectional view showing a step subsequent to the step of FIG. 113.

In the next step, an insulating layer 221 is formed, as shown in FIG. 114. This step is performed by e.g. thermally oxidizing the surface of the semiconductor substrate 210. In this step, the insulating layer 221 is formed on the side surfaces of the plate-like members 212, 213 as well.

Figure 115:
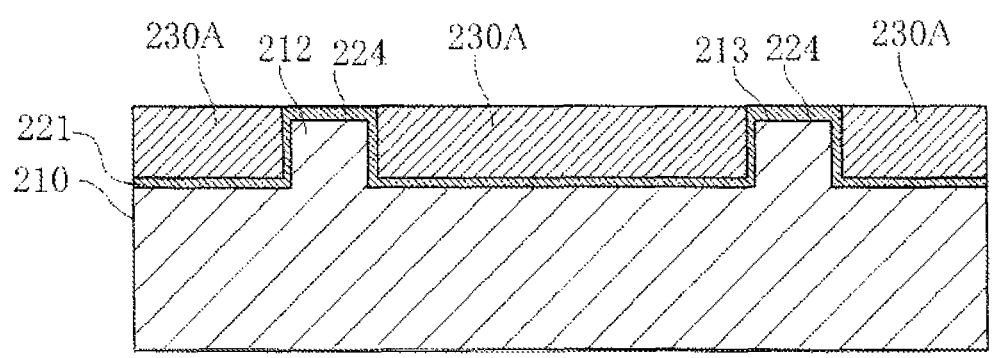
FIG. 115 is a sectional view showing a step subsequent to the step of FIG. 114.

In the next step, a semiconductor layer 230A is formed, as shown in FIG. 115. This step is performed by embedding a polycrystalline silicon material on the semiconductor substrate 210 except the portions where the plate-like members 212, 213 exist, and allowing it to grow. Further, in this step, after the semiconductor layer 230A has grown sufficiently, the surface of the semiconductor layer 230A is flattened by CMP, using the surface of the protective layer 224 as the reference.

Figure 116:
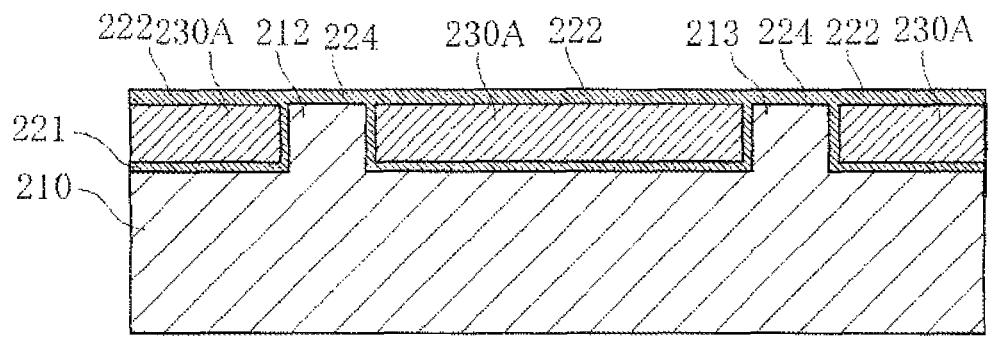
FIG. 116 is a sectional view showing a step subsequent to the step of FIG. 115.

In the next step, an insulating cover 222 is formed, as shown in FIG. 116. For instance, this step is performed by thermally oxidizing the surface of the semiconductor layer 230A. The thickness of the insulating cover 222 formed in this step is e.g. 0.5 µm.

Figure 117:
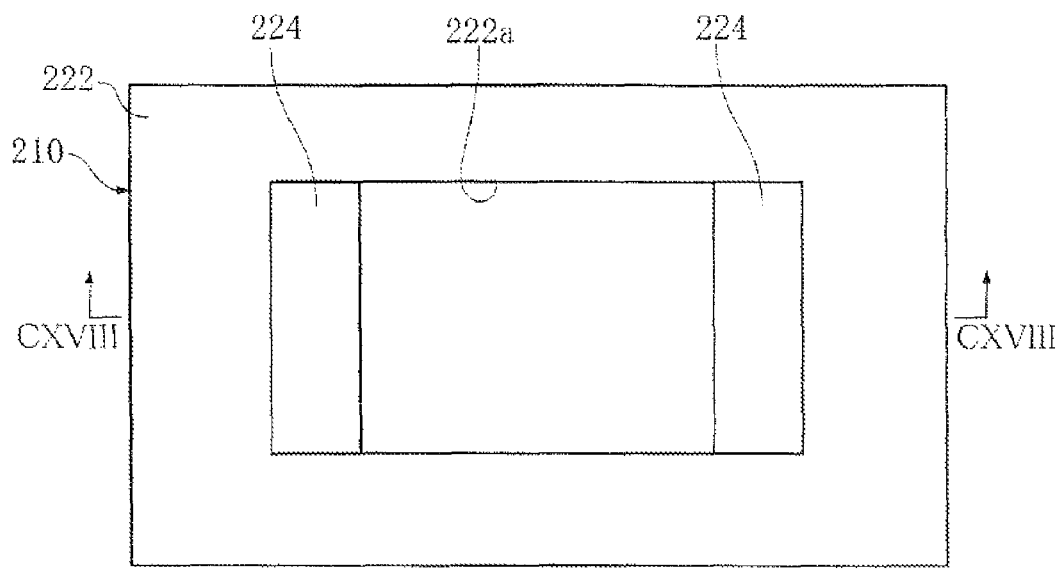
FIG. 117 is a sectional view showing a step subsequent to the step of FIG. 116.
Figure 118:
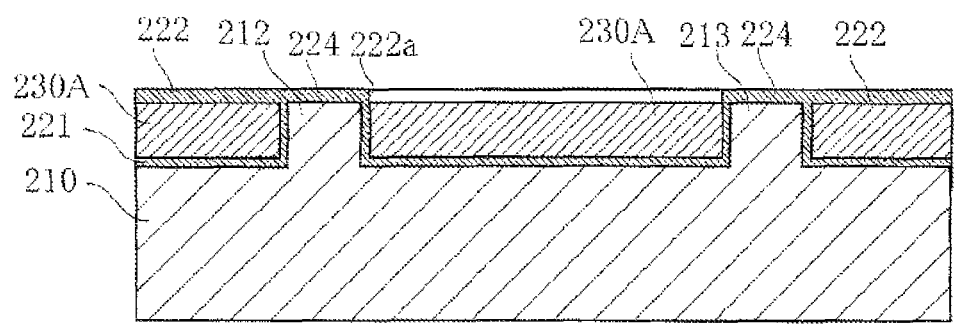
FIG. 118 is a sectional view taken along lines CXVIII-CXVIII in FIG. 117.
Figure 119:
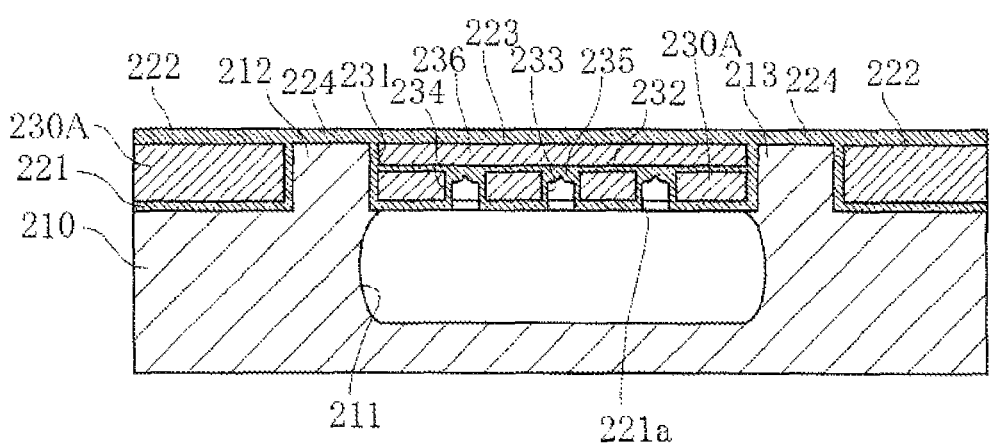
FIG. 119 is a sectional view showing the state after the steps shown in FIGS. 91-101 are performed after the step of FIG. 118.

In the next step, an opening 222a is formed, as shown in FIGS. 117 and 118. The opening 222a is formed to be sandwiched between the protective layers 224 on the paired support members 212 and 213. Thereafter, the steps shown in FIGS. 91-101 of the method for manufacturing the pressure sensor 201 are performed, whereby the state shown in FIG. 119 is obtained.

Figure 120:
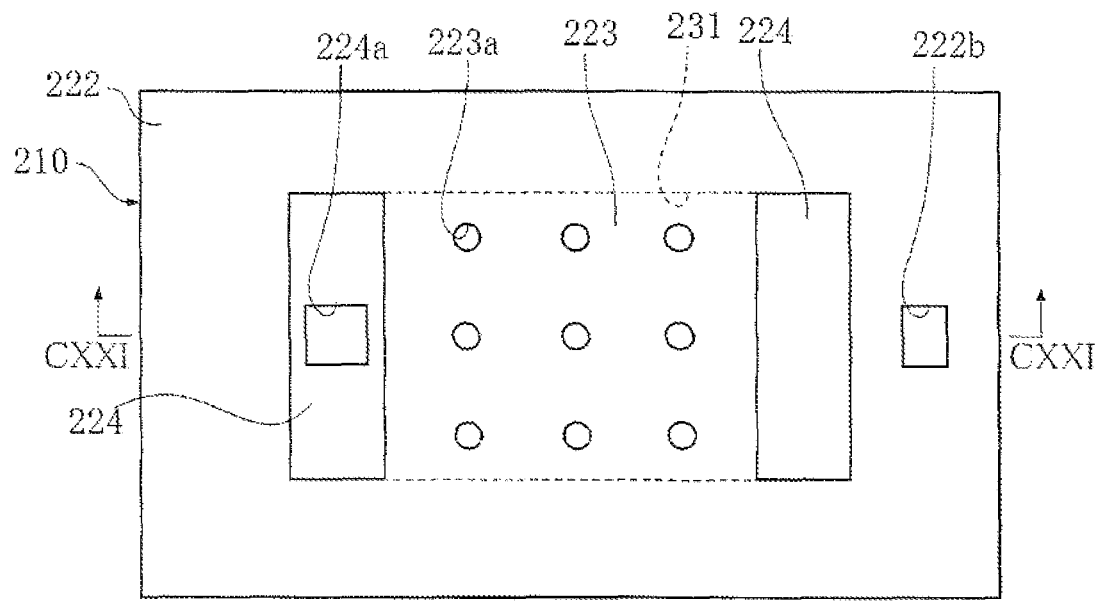
Figure 121:
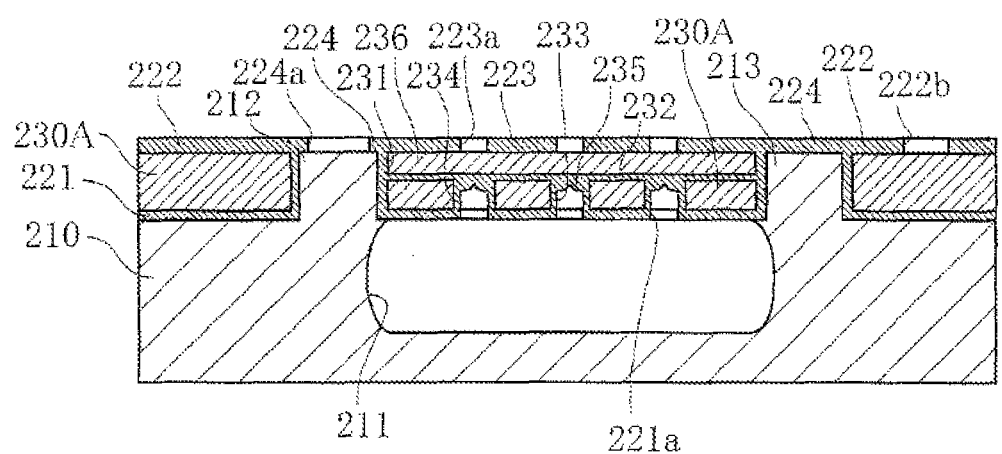

In the next step, through-holes 223a, an opening 222b and an opening 224a are formed, as shown in FIGS. 120 and 121.

This step is performed by arranging a resist of resin having openings corresponding to the through-holes 223a and the openings 222b, 224a and performing gas-phase etching using the reaction between $HF_2^-$ and $SiO_2$.

Figure 122:
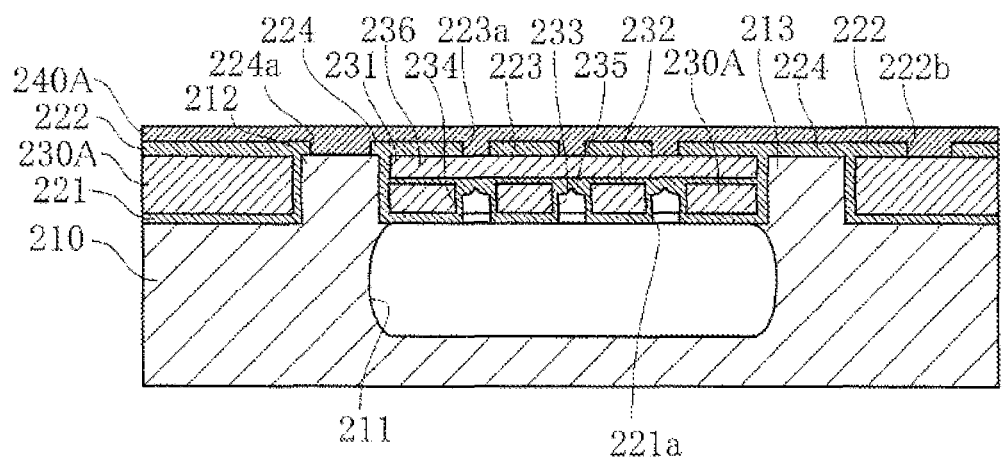

In the next step, a metal layer 240A is formed, as shown in FIG. 122. The metal layer 240A is a layer made of Al and formed to cover the insulating cover 222, the insulating cover 223 and the protective layer 224. In the opening 224a, the metal layer 240A is formed directly on the plate-like member 212. For instance, this step is performed by depositing Al by CVD.

Figure 123:
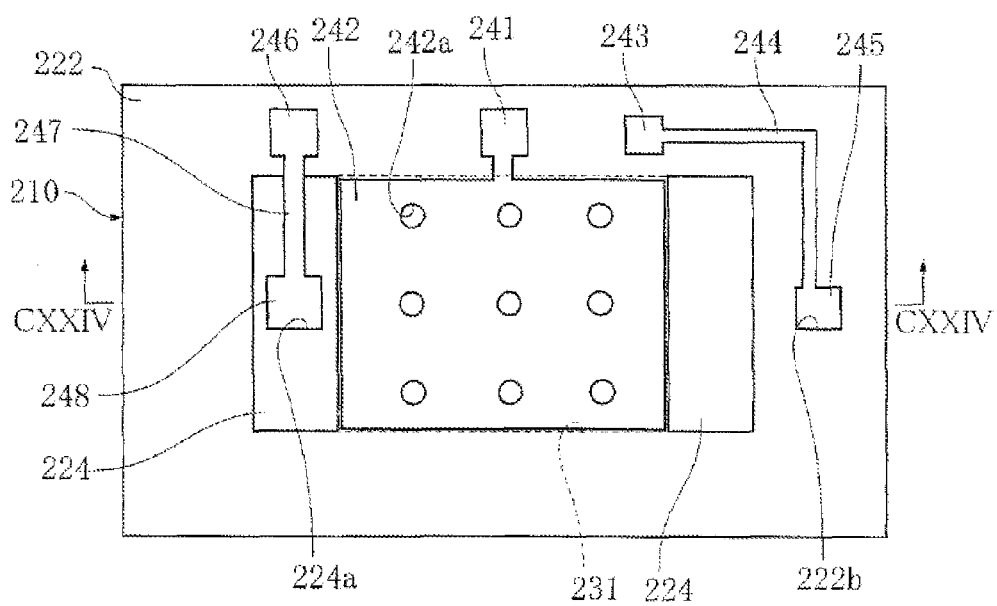
Figure 124:
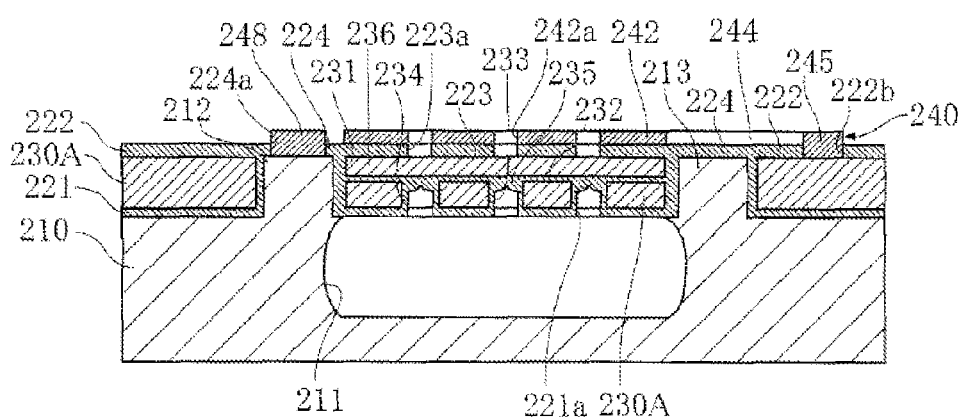

In the next step, the metal layer 240A is processed to provide an electrode layer 240, as shown in FIGS. 123 and 124. For instance, this step is performed by arranging a resist having the same shape as that of the electrode layer 240 as viewed in the lamination direction and removing unnecessary portions by gas-phase etching. Thereafter, the sacrificial layer 236 is removed, whereby the pressure sensor 204 shown in FIGS. 109 and 110 is completed.

In the pressure sensor 204, the semiconductor substrate 210 can be connected to external ground via the ground electrode terminal 246. This arrangement of the pressure sensor 204 allows the capacitance between the fixed electrode 242 and the movable portion 261 to be set precisely to a predetermined value. Thus, the pressure sensor 204 ensures more precise pressure measurement.

Further, the plate-like members 212 and 213 having a relatively high strength are arranged in such a manner as to penetrate the intermediate layer 230 in the lamination direction, so that the strength of the pressure sensor 204 is enhanced. In particular, since the movable portion 261 is held between the plate-like members 212 and 213, the movable portion 261 is not easily deformed improperly even when undesirable pressure is applied to the intermediate layer 230. This arrangement allows the capacitance between the fixed electrode 242 and the movable portion 261 to be set precisely to a predetermined value. Thus, the pressure sensor 204 ensures more precise pressure measurement.

The pressure sensor according to the present invention is not limited to the foregoing embodiments. The specific structure of each part of the pressure sensor according to the present invention can be varied in design in many ways. For instance, although the pressure sensors 202 and 203 have a structure based on the pressure sensor 201, they may have a structure based on the pressure sensor 204.

In the foregoing embodiment, the semiconductor substrate 210 is made of single-crystal silicon, whereas the semiconductor layer 230A is made of polycrystalline silicon. Unlike this, however, the semiconductor substrate 210 may be made of polycrystalline silicon, whereas the semiconductor layer 230A may be made of single-crystal silicon. Moreover, the sacrificial layer 236 may be made of single-crystal silicon or a resin having a low reactivity with $HF_2^-$.

Figure 125:
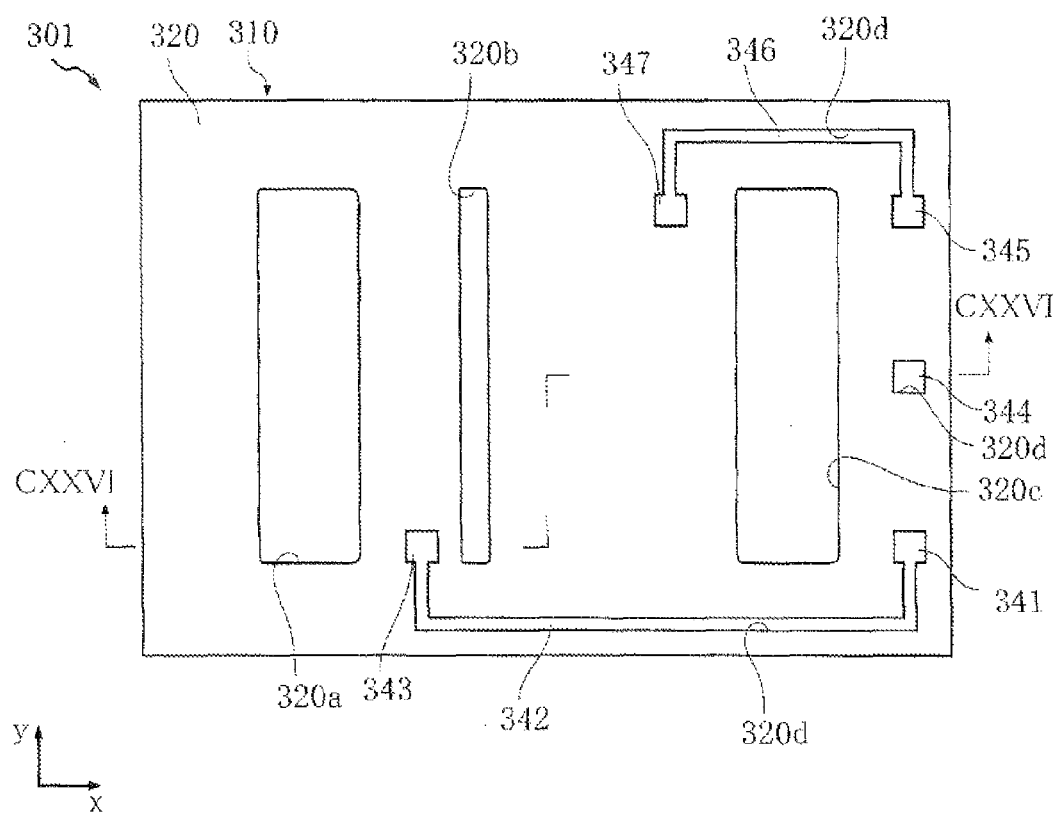
Figure 126:
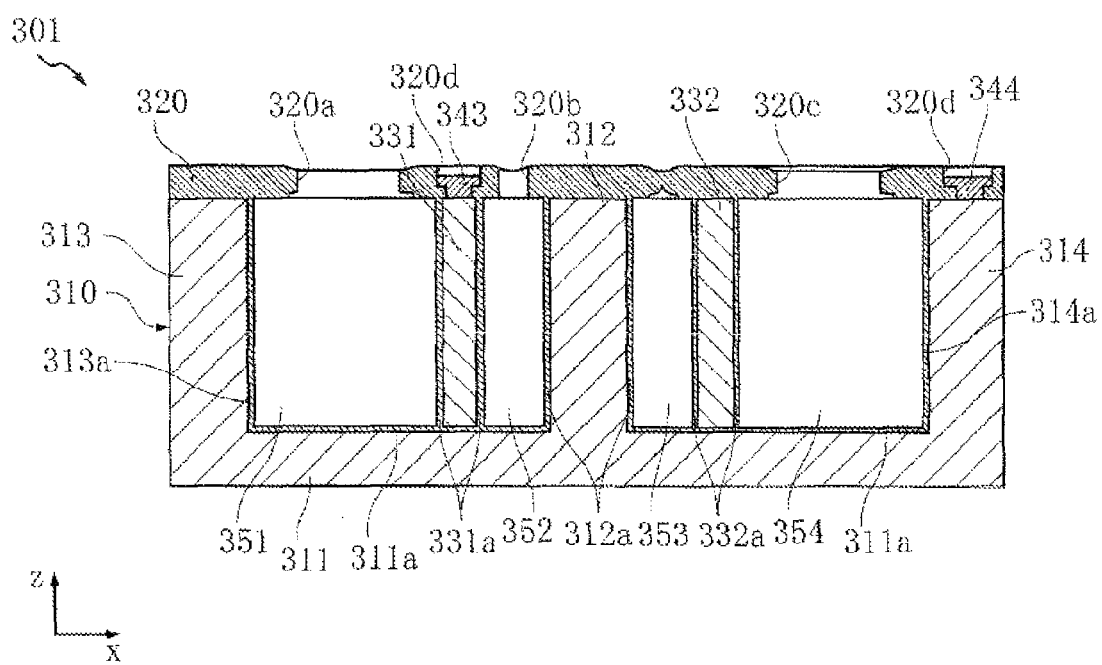

FIGS. 125 and 126 show a pressure sensor according to a twelfth embodiment of the present invention. The pressure sensor 301 of this embodiment includes a semiconductor structure 310, an insulating layer 320, semiconductor films 331, 332, connection terminals 341, 344, 345, connection lines 342, 346, conductive portions 343, 347 and gas supply spaces 351, 352, 354 and a closed space 353. The gas supply spaces 351, 352, 354 are filled with air from the outside of the pressure sensor 301. The closed space 353 is in a vacuum state.

The semiconductor structure 310 is made of e.g. a single semiconductor material made of single-crystal silicon (Si) and comprise a semiconductor substrate 311 in the form of a flat plate, a plate-like member 312 and wall portions 313, 314.

On the surface of the semiconductor substrate 311, an oxide film 311a made of e.g. silicon dioxide ($SiO_2$) and having a thickness of about 0.2 μm is provided. In the description given below, the x direction is one of the in-plane directions of the semiconductor substrate 311, the y direction is the in-plane direction of the semiconductor substrate 311 which is perpendicular to the x direction, and the z direction is the direction perpendicular to both of the x direction and the y direction. As shown in FIG. 125, as viewed in the z direction, the semiconductor structure 310 is in the form of a rectangle elongated in the x direction. As shown in FIG. 126, the z direction corresponds to the lamination direction of the semiconductor substrate 311.

The plate-like member 312 stands vertically in the z direction from the center of the semiconductor substrate 311 in the x direction. The plate-like member 312 extends along the substantially entire length of the semiconductor substrate 311 in the y direction. The dimension of the plate-like member 312 in the direction x is e.g. 10 μm, and that in the z direction is e.g. 100 μm. Oxide films 312a made of e.g. $SiO_2$ and having a thickness of about 0.2 μm are formed on the two side surfaces of the plate-like member 312 which are spaced from each other in the x direction.

The wall portion 313 stands vertically in the direction z from the left end of the semiconductor substrate 311 in the x direction in FIG. 126. The wall portion 313 extends along the substantially entire length of the semiconductor substrate 311 in the y direction. An oxide film 313a made of e.g. $SiO_2$ and having a thickness of about 0.2 μm is formed on the right side surface of the wall portion 313 in the x direction.

The wall portion 314 projects vertically in the direction z from the right end of the semiconductor substrate 311 in the x direction in FIG. 126. The wall portion 314 extends along the substantially entire length of the semiconductor substrate 311 in the y direction. An oxide film 314a made of e.g. $SiO_2$ and having a thickness of about 0.2 μm is formed on the left side surface of the wall portion 314 in the x direction.

Though not shown in FIGS. 125 and 126, the semiconductor substrate 311 have wall portions similar to the wall portions 313, 314 at the ends spaced from each other in the y direction. Thus, the semiconductor structure 310 has two hollow portions partitioned by the plate-like member 312 in an area surrounded by the four wall portions. The semiconductor film 331 and the gas supply spaces 351, 352 are positioned in the hollow portion sandwiched between the plate-like member 312 and the wall portion 313 in the x direction. The semiconductor film 332, the closed space 353 and the gas supply space 354 are positioned in the hollow portion sandwiched between the plate-like member 312 and the wall portion 314 in the x direction.

The semiconductor film 331 is a film made of polycrystalline silicon and having a thickness of about 4 μm in the x direction. The semiconductor film 331 has a length of e.g. 10 μm in the z direction and extends along the substantially entire length of the semiconductor substrate 311 in the y direction. Oxide films 331a made of e.g. $SiO_2$ and having a thickness of about 0.2 μm are formed on the two side surfaces of the semiconductor film 331 which are spaced from each other in the x direction. The semiconductor film 331 is positioned between the plate-like member 312 and the wall portion 313 in the x direction. The right side surface of the semiconductor film 331 in the x direction in FIG. 126 is parallel to the left side surface of the plate-like member 312, and the distance between these two surfaces is e.g. 2 μm. The distance between the left side surface of the semiconductor film 331 and the right side surface of the wall portion 313 is e.g. 3 to 8 μm.

The semiconductor film 331 partitions one of the above-described hollow portions into two spaces, i.e., the gas supply space 351 between the wall portion 313 and the semiconductor film 331 and the gas supply space 352 between the semiconductor film 331 and the plate-like member 312.

The semiconductor film 332 is a film made of polycrystalline silicon and having a thickness of about 4 μm in the x direction. The semiconductor film 332 has a length of e.g. 10 μm in the z direction and extends along the substantially entire length of the semiconductor substrate 311 in the y direction. Oxide films 332a made of e.g. $SiO_2$ and having a thickness of about 0.2 μm are formed on the two side surfaces of the semiconductor film 331 which are spaced from each other in the x direction. The semiconductor film 332 is positioned between the plate-like member 312 and the wall portion 314 in the x direction. The left side surface of the semiconductor film 332 in the x direction in FIG. 126 is parallel to the right side surface of the plate-like member 312, and the distance between these two surfaces is e.g. 2 μm. The distance between the right side surface of the semiconductor film 332 and the left side surface of the wall portion 314 is e.g. 3 to 8 μm.

The semiconductor film 332 partitions the other one of the above-described hollow portions into two spaces, i.e., the closed space 353 between the semiconductor film 332 and the plate-like member 312 and the gas supply space 354 between the semiconductor film 332 and the wall portion 314.

The insulating layer 320 is made of e.g. $SiO_2$ and formed on the semiconductor structure 310. The insulating layer 320 has openings 320a, 320b and 320c above the gas supply spaces 351, 352 and 354. Outside air can flow into the gas supply spaces 351, 352, 354 through the openings 320a, 320b, 320c. The insulating layer 320 further has openings 320d that expose the connection terminals 341, 344, 345, the connection lines 342, 346 and the conductive portions 343, 347.

The connection terminal 341 is a terminal used for electrical connection to the outside and connected to the conductive portion 343 via the connection line 342. The conductive portion 343 is electrically connected to the semiconductor film 331.

The connection terminal 344 is a terminal used for electrical connection to the outside and electrically connected to e.g. the upper end of the wall portion 314 in the z direction Since the semiconductor structure 310 is formed as a single integral unit, the connection terminal 344 is electrically connected to the plate-like member 312 as well.

The connection terminal 345 is a terminal used for electrical connection to the outside and connected to the conductive portion 347 via the connection line 346. The conductive portion 347 is electrically connected to the semiconductor film 332.

The operation and advantages of the pressure sensor 301 are described below.

In the pressure sensor 301, the semiconductor films 331 and 332 are not fixed in the x direction but are deformable due to the small thickness in the x direction, thereby functioning as movable electrodes. Since the semiconductor film 331 is closer to the plate-like member 312 than to the wall portion 313, the left side surface of the plate-like member 312 in the x direction functions as the fixed electrode relative to the semiconductor film 331. Similarly, since the semiconductor film 332 is closer to the plate-like member 312 than to the wall portion 314, the right side surface of the plate-like member 312 in the x direction functions as the fixed electrode relative to the semiconductor film 332. The plate-like member 312 is electrically connected to the connection terminal 344, and the semiconductor films 331 and 332 are electrically connected to the connection terminals 341 and 345, respectively. This arrangement allows proper detection of capacitance between each of the fixed electrodes and each of the movable electrodes.

As described above, the distance between the left side surface of the plate-like member 312 in the x direction and the semiconductor film 331 and the distance between the right side surface of the plate-like member 312 in the x direction and the semiconductor film 332 are equal to each other, and the semiconductor films 331 and 332 have the same size and shape as viewed in the x direction. Thus, when the semiconductor films 331 and 332 are not deformed, the output values from the connection terminal 341 and the connection terminal 342 are substantially the same.

The semiconductor film 331 receives pressure in the x direction from both of the gas introduced into the gas supply space 351 and the gas introduced into the gas supply space 352. In this embodiment, the same outside air is introduced into the two gas supply spaces 351 and 352, so that the pressure applied to the semiconductor film 331 is balanced. Thus, the capacitance between the semiconductor film 331 and the plate-like member 312 does not change, so that the output from the connection terminal 341 serves as a constant reference value.

On the other hand, the semiconductor film 332 is sandwiched in the x direction between the vacuum closed space 353 and the gas supply space 354 in which outside air is introduced. Thus, the semiconductor film 332 receives, from the outside air introduced into the gas supply space 354, a pressure corresponding to the pressure of the outside air, and is hence deformed. Thus, the capacitance between the semiconductor film 332 and the plate-like member 312 changes in accordance with the pressure of the outside air, and the output from the connection terminal 345 is a value corresponding to the changing capacitance. By comparing this value with the reference value obtained through the connection terminal 341, the change in capacitance between the semiconductor film 332 and the plate-like member 312 is calculated, and based on the change in capacitance, the pressure of the outside air is calculated. Thus, the pressure sensor 301 is suitable for measuring the absolute pressure of the outside air.

A method for manufacturing the pressure sensor 301 is described below with reference to FIGS. 127-145.

First, a semiconductor material 310A made of a single-crystal silicon and in the form of a rectangular parallelepiped is prepared, and the semiconductor material 310A is processed to provide a semiconductor structure 310.

To process the semiconductor material 310A, an insulating layer 321 of $SiO_2$ is formed on the surface of the semiconductor material 310A. This step can be performed by thermally oxidizing the surface of the semiconductor material 310A. Alternatively, chemical vapor deposition (CVD) may be employed.

Figure 127:
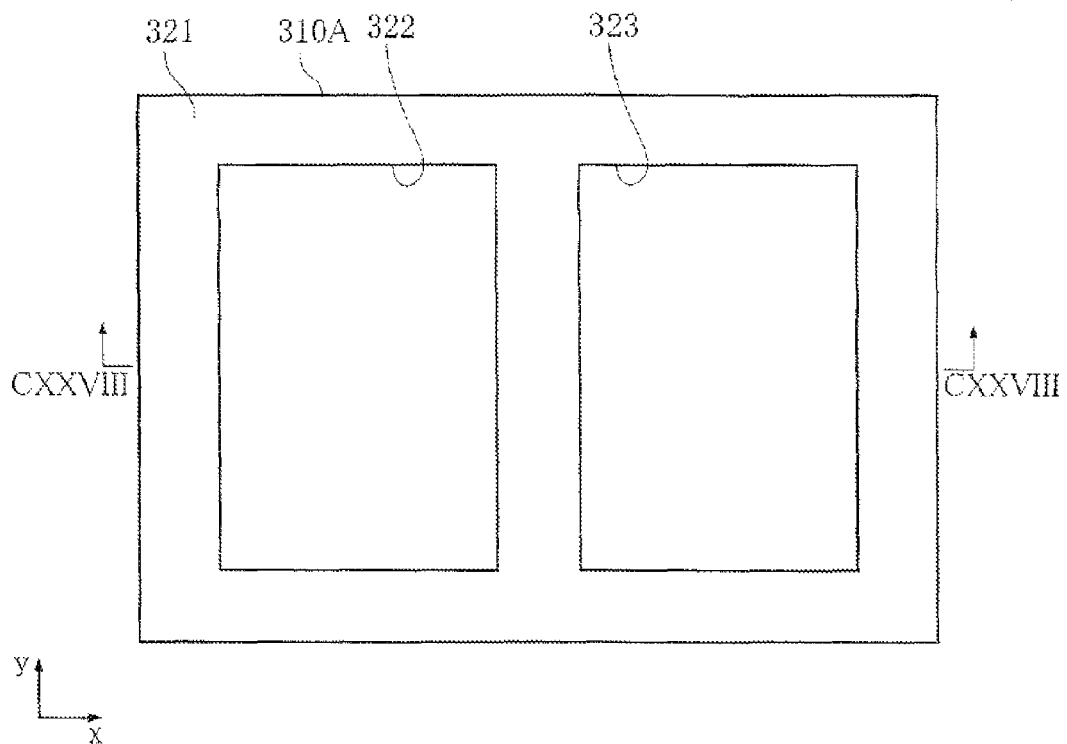
Figure 128:
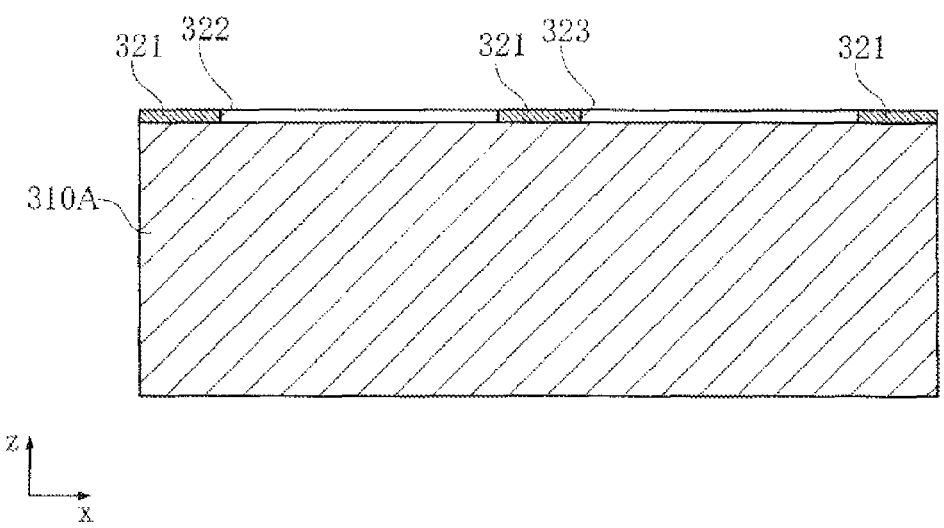

In the next step, as shown in FIGS. 127 and 128, openings 322 and 323 are formed in the insulating layer 321 to expose the surface of the semiconductor material 310A. The opening 322 is formed in an area that overlaps the area where the gas supply spaces 351, 352 and the semiconductor film 331 are to be formed, as viewed in the z direction. The opening 323 is formed in an area that overlaps the area where the closed space 353, the gas supply space 354 and the semiconductor film 332 are to be formed, as viewed in the z direction. For instance, this step is performed by providing a resist of resin which exposes the portions where the openings 322 and 323 are to be formed and performing gas-phase etching using the reaction between fluorine-containing molecular ions ($HF_2^-$) and $SiO_2$. For instance, $HF_2^-$ can be obtained by reacting hydrogen fluoride (HF) with water vapor. For instance, HF can be obtained by reacting atomic fluorine (F) or molecular fluorine ($F_2$), which is obtained by e.g. decomposing carbon tetrafluoride ($CF_4$) gas or trifluoromethane ($CHF_3$) gas, with water vapor. Since Si which is not oxidized does not easily react with $HF_2^-$, the semiconductor layer 310A is not removed by the etching and hence remains. Instead of the gas-phase etching, wet etching using aqueous solution of hydrogen fluoride (HF) may be performed.

Figure 129:
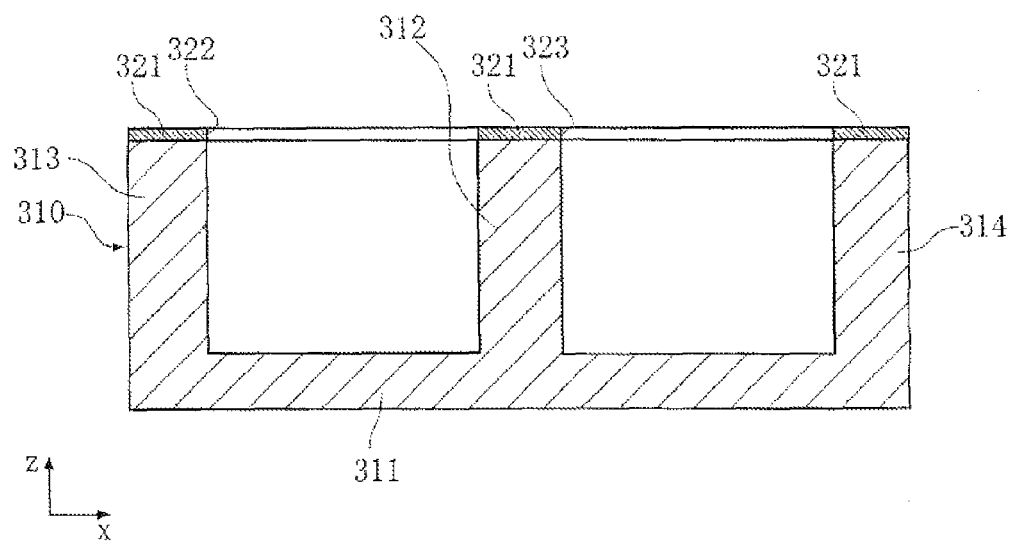

In the next step, etching in the z direction is performed with respect to the semiconductor material 310A, as shown in FIG. 129. Through this step, the semiconductor structure 310 is obtained as a remaining portion of the semiconductor material 310A. This step can be performed by Si-DRIE (deep reactive ion etching) utilizing the Bosch (registered trademark) process. The Bosch process is a process in which etching and side wall protection are performed repeatedly and which allows etching with a high aspect ratio. As a result of this step, the portions of the semiconductor material 310A which are covered with the insulating layer 321 remain, whereby the plate-like member 312, the wall portions 313, 314 and the wall portions spaced in the y direction are provided. The etching time is adjusted so as not to penetrate the semiconductor material 310 in the z direction, so that the bottom of the semiconductor material 310A remains to become the semiconductor substrate 311.

Figure 130:
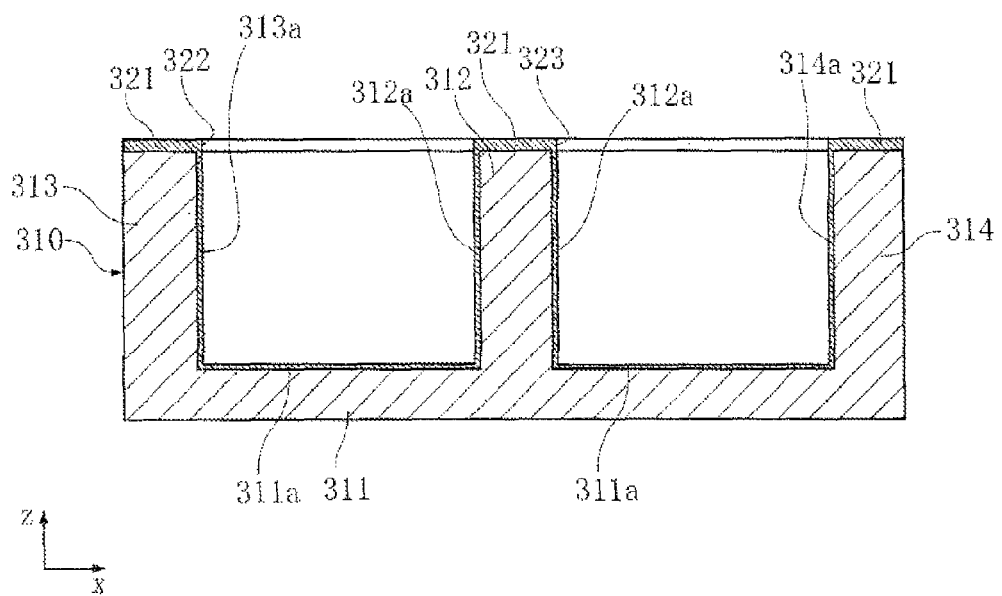

In the next step, oxide films 311a, 312a, 313a and 314a are formed, as shown in FIG. 130. This step can be performed by thermally oxidizing the surface of the semiconductor structure 310. The films can be formed by depositing $SiO_2$ by CVD.

In the next step, a semiconductor layer 331A and a semiconductor layer 332A are formed, as shown in FIG. 131. The semiconductor layer 331A is made of polycrystalline silicon and formed to fill the space between the wall portion 313 and the plate-like member 312. The semiconductor layer 332A is made of polycrystalline silicon and formed to fill the space between the wall portion 314 and the plate-like member 312. This step is performed by e.g. epitaxial growth of polycrystalline silicon on the semiconductor substrate 311 by CVD. Also in this step, the surfaces of the semiconductor layers 331A and 332A are flattened. The flattening can be performed by e.g. chemical mechanical polishing (CMP).

In the next step, as shown in FIG. 132, an insulating layer 324A is formed on the surface of the semiconductor layer 331A, and an insulating layer 325A is formed on the surface of the semiconductor layer 332A. The insulating layer 324A is formed to cover the entire portion of the semiconductor layer 331A which is not covered with the insulating layer 321. The insulating layer 325A is formed to cover the entire portion of the semiconductor layer 332A which is not covered with the insulating layer 321. The insulating layers 324A and 325A are made of $SiO_2$ and have a thickness of e.g. about 0.8 µm. This step can be performed by thermal oxidation or CVD. By this step, the openings 322 and 323 are closed by the insulating layers 324A and 325A.

In the next step, insulating layers 324, 325 and openings 322a, 322b, 323a, 323b are formed, as shown in FIGS. 133 and 134. The insulating layer 324 is formed in an area that overlaps the area where the semiconductor film 331 is to be formed, as viewed in the z direction. The insulating layer 325 is formed in an area that overlaps the area where the semiconductor film 332 is to be formed, as viewed in the z direction. The opening 322a is formed to expose the semiconductor layer 331A in an area that overlaps the area where the gas supply space 352 is to be formed, as viewed in the z direction. The opening 322b is formed to expose the semiconductor layer 331A in an area that overlaps the area where the gas supply space 351 is to be formed, as viewed in the z direction. The opening 323a is formed to expose the semiconductor layer 332A in an area that overlaps the area where the closed space 353 is to be formed, as viewed in the z direction. The opening 323b is formed to expose the semiconductor layer 332A in an area that overlaps the area where the gas supply space 354 is to be formed, as viewed in the z direction. This step can be performed by the same technique as that used for forming the openings 322 and 323.

In the next step, a semiconductor film 331 and a semiconductor film 332 are formed, as shown in FIG. 135. In this step, etching in the z direction is performed with respect to the semiconductor layers 331A and 332A. For instance, the etching in this step can be performed by Si-DRIE utilizing the Bosch (registered trademark) process. In this step, the semiconductor layer 30 under the insulating layers 324, 25 remains, whereby semiconductor films 331, 332 are provided.

In the next step, oxide films 331a, 32a are formed, as shown in FIG. 136. For instance, this step can be performed by thermal oxidation or CVD.

In the next step, sacrificial layers 326A, 327A, 328A and 329A are formed, as shown in FIG. 137. For instance, the sacrificial layers 326A, 327A, 328A and 329A are made of polycrystalline silicon or a resin such as polyimide. The sacrificial layer 326A is formed to fill the space where the gas supply space 351 is to be formed. The sacrificial layer 327A is formed to fill the space where the gas supply space 352 is to be formed. The sacrificial layer 328A is formed to fill the space where the closed space 353 is to be formed. The sacrificial layer 329A is formed to fill the space where the gas supply space 354 is to be formed.

In the next step, insulating layers 326, 327, 328 and 329 are formed on the surfaces of the sacrificial layers 326A, 327A, 328A and 329A as shown in FIG. 138. This step can be performed by thermal oxidation or CVD.

In the next step, as shown in FIGS. 139 and 140, openings 326a, 327a, 328a and 329a are formed in the insulating layers 326, 327, 328 and 329, an opening 324a is formed in the insulating layer 324, an opening 325a is formed in the insulating layer 325, and an opening 321a is formed in the insulating layer 321. This step is performed by gas-phase etching using the reaction between $HF_2^-$ and $SiO_2$ by using a resist of resin having openings corresponding to the openings 321a, 324a, 325a, 326a, 327a, 328a and 329a.

In the next step, a metal layer 340 is formed, as shown in FIG. 141. The metal layer 340 is made of e.g. Al and formed to cover the insulating layers 321, 324, 325, 326, 327, 328 and 329. For instance, this step can be performed by depositing Al by CVD.

In the next step, as shown in FIGS. 142 and 143, the metal layer 340 is processed to provide connection terminals 341, 344, 345, connection lines 342, 346 and conductive portions 343, 347. For instance, this step is performed by arranging a resist having a shape corresponding to the shapes of the connection terminals 341, 344, 345, connection lines 342, 346 and conductive portions 343, 347 and removing unnecessary portions of the Al metal layer by gas-phase etching.

In the next step, sacrificial layers 326A, 327A, 328A and 329A are removed, as shown in FIG. 144. For instance, this step can be performed by gas-phase etching using gas containing xenon fluoride ($XeF_2$). By the removal of the sacrificial layers 326A, 327A, 328A and 329A, cavity portions 351A, 352A, 353A and 354A are provided.

In the next step, openings 326a, 327a, 328a and 329a are sealed, and an insulating layer 320 is formed, as shown in FIG. 145. This step is performed by depositing $SiO_2$ on the insulating layers 321, 324, 325, 326, 327, 328 and 329 by low pressure chemical vapor deposition (LPCVD) or plasma CVD in a vacuum atmosphere. In this step, $SiO_2$ grows from the edges of the openings 326a, 327a, 328a and 329a toward the center, so that the sealing portion formed in this step tends to be thin at the center. In this embodiment, the insulating layer 320 is deposited to a thickness sufficient to cover the connection terminals 341, 344, 345, the connection lines 342, 346 and the conductive portions 343, 347. When a mask is used, $SiO_2$ may not be deposited on the connection terminals 341, 344, 345, the connection lines 342, 346 and the conductive portions 343, 347.

In the next step, openings 320a, 320b, 320c and 320d are formed, whereby the pressure sensor 301 shown in FIGS. 125 and 126 is completed. The step of forming the openings 320a, 320b, 320c and 320d is performed by gas-phase etching using the reaction between $HF_2^-$ and $SiO_2$ by using a resist of resin having openings corresponding to the openings 320a, 320b, 320c and 320d. In this embodiment, $SiO_2$ is deposited on the connection terminals 341, 344, 345, the connection lines 342, 346 and the conductive portions 343, 347 in the previous step. Thus, by forming the opening 320d, the connection terminals 341, 344, 345 are exposed outside the insulating layer 320. According to this manufacturing method, as shown in FIG. 126, the surfaces of the connection terminals 341, 344, 345, the connection lines 342, 346 and the conductive portions 343, 347 become lower than the surface of the insulating layer 320. When a mask is provided on the connection terminals 341, 344, 345, the connection lines 342, 346 and the conductive portions 343, 347 in the previous step, $SiO_2$ may not be deposited on the connection terminals 341, 344, 345, the connection lines 342, 346 and the conductive portions 343, 347. In this case, opening 320d may not need to be formed.

The operation and advantages of the pressure sensor 301 are described below.

As noted before, in the pressure sensor 301, the right and left side surfaces, which are spaced from each other in the direction x, of the plate-like member 312 standing from the surface of the semiconductor substrate 311 function as fixed electrodes, whereas the side surfaces of the semiconductor films 331, 332 which face the plate-like member 312 in the x direction function as movable electrodes. In this way, in the pressure sensor 301, the fixed electrodes and the movable electrodes stand on the semiconductor substrate 311 in the z direction. With this arrangement, fixed electrodes and movable electrodes can be made in a relatively small area of the semiconductor substrate 311, as viewed in the z direction. Accordingly, the area of the pressure sensor 301 as viewed in the z direction can be made smaller, which leads to size reduction of the pressure sensor 301. Thus, the pressure sensor can be set in a small area in e.g. an electronic device.

According to the manufacturing method of this embodiment, the plate-like member 312 standing in the z direction is formed easily by performing etching in the z direction with respect to the semiconductor material 310A. Moreover, the semiconductor films 331 and 332 are formed easily by performing etching in the z direction with respect to the semiconductor layers 331A, 332A.

In the foregoing embodiment, the space between the plate-like ember 312 and the semiconductor film 332 is the closed space 353, whereas the space between the semiconductor film 332 and the wall portion 314 is the gas supply space 354. However, these may be replaced with each other. The pressure sensor may be designed to enclose gas of a given pressure in the closed space 353 and measure the relative pressure between the gas and the pressure of the outside air.

FIGS. 146-153 show other embodiments of the present invention. In these figures, the elements which are identical or similar to those of the foregoing embodiments are designated by the same reference signs as those used for the foregoing embodiments.

FIGS. 146 and 147 show a pressure sensor according to a thirteenth embodiment of the present invention. The pressure sensor 302 of this embodiment includes a gas supply space 353' instead of the closed space 353, and openings 320e, 320f instead of the openings 320a, 320b, 320c. The structures of other parts of the pressure sensor 302 are the same as those of the pressure sensor 301.

The openings 320e are provided between the wall portion 313 and the semiconductor film 331 and between the plate-like member 312 and the semiconductor film 332 in the x direction. The opening 320e is connected via e.g. a pipe to a gas source capable of supplying gas of a given pressure. Thus, the gas supply spaces 351 and 353' are filled with the gas of a given pressure supplied from the gas source.

The openings 320f are provided between the semiconductor film 331 and the plate-like member 312 and between the semiconductor film 332 and the wall portion 314. Outside air is taken in through the openings 320f, so that outside air whose pressure is to be measured is introduced into the gas supply spaces 352, 354.

In the pressure sensor 302, the semiconductor film 331 is deformed due to the pressure difference between the gas of a given pressure introduced into the gas supply space 351 and the outside air introduced into the gas supply space 352. The deformation causes a change in capacitance between the semiconductor film 331 and the plate-like member 312, and the change is detected through the connection terminal 341. On the other hand, the semiconductor film 332 is deformed due to the pressure difference between the gas of a given pressure introduced into the gas supply space 353' and the outside air introduced into the gas supply space 354. The deformation causes a change in capacitance between the semiconductor film 332 and the plate-like member 312, and the change is detected through the connection terminal 345.

For instance, when the pressure of the gas from the gas source is higher than the pressure of the outside air, the semiconductor film 331 is deformed toward the plate-like member 312 in the x direction, whereas the semiconductor film 332 is deformed to be away from the plate-like member 312. Thus, the capacitance between the semiconductor film 331 and the plate-like member 312 increases in accordance with the pressure difference between the gas from the gas source and the outside air, whereas the capacitance between the semiconductor film 332 and the plate-like member 312 decreases in accordance with the pressure difference. The capacitances show the opposite behavior when the pressure of the gas from the gas source is lower than the pressure of the outside air.

Thus, the difference between the change in capacitance detected through the connection terminal 341 and that detected through the connection terminal 345 is twice the change in capacitance at one of the semiconductor films 331 and 332. In the pressure sensor 302, therefore, the difference between the changes in capacitance detected respectively through the connection terminal 341 and the connection terminal 345 is halved, and the pressure of the outside air relative to the pressure of the gas from the gas supply is calculated based on the halved value.

In the pressure sensor 302 having the above-described structure, a change in capacitance, which is usually of a small value, is detected as doubled, which allows more precise measurement.

Unlike the above, outside air may be introduced through the openings 320e, while gas of a given pressure may be introduced through the openings 320f.

FIG. 148 shows a pressure sensor according to a fourteenth embodiment of the present invention. In the pressure sensor 303 of this embodiment, the plate-like member 312 does not comprise part of the semiconductor structure 310, but is made of polycrystalline silicon. The structures of the other parts of the pressure sensor 303 are the same as those of the pressure sensor 301. In the pressure sensor 303, the plate-like member 312 is not electrically connected to the wall portion 314. Thus, the connection terminal 344 is formed directly on the plate-like member 312 in the z direction for electrical connection to the plate-like member 312.

In the process of manufacturing the pressure sensor 303, etching of the semiconductor material 310A is performed such that the portion between the wall portion 313 and the wall portion 314 in the x direction is entirely etched away. Thereafter, a semiconductor layer 330A is formed to fill the space between the wall portion 313 and the wall portion 314, and an insulating layer 321' is formed, along with insulating layers 324, 325, on the semiconductor layer 330A, as shown in FIG. 149. Thereafter, etching in the z direction is performed with respect to the semiconductor layer 330A, whereby the plate-like member 312 as well as the semiconductor films 331, 332 are provided as remaining portions of the semiconductor layer 330A.

With this pressure sensor 303, movable electrodes and fixed electrodes, which require precise processing, are formed at the same time. Thus, the manufacturing process is simple.

FIG. 150 shows a pressure sensor according to a fifteenth embodiment of the present invention. In the pressure sensor 304 shown in FIG. 150, the plate-like member 312 and the wall portions 313, 314 are made of polycrystalline silicon, and the connection terminal 344 is formed directly on the plate-like member 312 in the z direction for electrical connection to the plate-like member 312. In the pressure sensor 304, the wall portions provided at the ends spaced in the y direction in the pressure sensor 301 are not provided, to insulate the plate-like member 312 from the semiconductor films 331, 332. The structures of the other parts of the pressure sensor 304 are the same as those of the pressure sensor 301.

The pressure sensor 304 is made of the semiconductor material 310B shown in FIG. 151, instead of the semiconductor material 310A of single-crystal silicon shown in FIG. 128. The semiconductor material 310B comprises a semiconductor substrate 311 in the form of a flat plate, an oxide film 311a formed on the semiconductor substrate 311, and a semiconductor layer 330A formed on the oxide film 311a.

To manufacture the pressure sensor 304, an insulating layer 321 as shown in FIGS. 152 and 153 is formed, and etching in the z direction is performed with respect to the semiconductor layer 330A. The insulating layer 321 of this embodiment has openings 322c, 322d, 323c and 323d penetrating in the y direction, instead of the openings 322a, 322b, 323a, 323b. Thus, by the etching, the semiconductor films 331, 332, the plate-like member 312 and the wall portions 313, 314 are formed at one time, as remaining portions of the semiconductor layer 330A. The subsequent steps are the same as those for manufacturing the pressure sensor 301. In this embodiment, however, in or before forming the insulating layer 320, the space between the semiconductor film 332 and the plate-like member 312 are closed by an insulating material at the ends spaced from each other in the y direction to form the closed space 353.

As compared with the pressure sensor 301, the pressure sensor 304 can be manufactured through a smaller number of etching steps and hence realizes a simple manufacturing process.

A pressure sensor similar to the pressure sensors 301, 303 can be manufactured by processing the semiconductor material 310B in a manner similar to the semiconductor material 310A. In this case, in forming the semiconductor structure 310, the step of etching the semiconductor material 310A using gas containing F is replaced with the step of etching the semiconductor material 310B using gas containing HF.

The pressure sensor according to the present invention is not limited to the foregoing embodiments. The specific structure of each part of the pressure sensor and the specific way of each step of its manufacturing method according to the present invention can be varied in design in many ways. For instance, although the pressure sensors 303 and 304 have a structure based on the pressure sensor 301, it may have a structure based on the pressure sensor 302.

Although the pressure sensor 301 includes a semiconductor film 331 for outputting a reference value, a capacitor capable of outputting the value equal to the reference value may be provided in the circuit in which the pressure sensor is arranged. In this case, the left half in FIG. 126 of the pressure sensor 301 can be omitted.

The invention claimed is:

1. A pressure sensor comprising a movable electrode and a fixed electrode arranged in parallel to each other, further comprising:
   a semiconductor substrate;
   a first insulating layer formed on the semiconductor substrate;
   a semiconductor layer formed on the semiconductor substrate, with the first insulating layer intervening therebetween;
   a second insulating layer formed on the semiconductor layer;
   a first cavity portion formed in the semiconductor substrate;
   a second cavity portion overlapping the first cavity portion as viewed in a lamination direction and formed in contact with the second insulating layer, wherein:
   the fixed electrode faces the second insulating layer across the second cavity portion;
   the movable electrode is provided at a portion of the semiconductor layer which is sandwiched between the first cavity portion and the second cavity portion;
   the movable electrode includes a through-hole penetrating the semiconductor layer in the lamination direction; and
   the pressure sensor further comprises a sealing member which is disposed within the through-hole and seals the through-hole.

2. The pressure sensor according to claim 1, wherein the sealing member is made of a different material from the semiconductor layer.

3. The pressure sensor according to claim 2, wherein the semiconductor layer is made of silicon, whereas the sealing member is made of silicon dioxide.

4. The pressure sensor according to claim 1, further comprising a third insulating layer facing the second insulating layer across the second cavity portion,
   wherein the fixed electrode is provided on the third insulating layer.

5. The pressure sensor according to claim 1, further comprising a vent hole penetrating the fixed electrode in the lamination direction, one end of the vent hole in the lamination direction reaching the second cavity portion.

6. The pressure sensor according to claim 1, further comprising a movable electrode terminal electrically connected to the semiconductor layer.

7. The pressure sensor according to claim 1, wherein the semiconductor substrate is provided with a pair of plate-like members projecting in the lamination direction and facing each other, and
   the movable electrode and the second cavity portion are sandwiched between the paired plate-like members.

8. The pressure sensor according to claim 7, further comprising a protective layer formed on the paired plate-like members and including an opening which exposes a surface of at least one of the plate-like members, and a ground electrode terminal electrically connected to the semiconductor substrate via the opening.

* * * * *